US009418502B2

(12) United States Patent
Yasaka

(10) Patent No.: US 9,418,502 B2
(45) Date of Patent: Aug. 16, 2016

(54) COMMODITY STORAGE DEVICE

(71) Applicant: FUJI ELECTRIC CO., LTD., Kawasaki-shi (JP)

(72) Inventor: Yoshio Yasaka, Mie (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 114 days.

(21) Appl. No.: 14/394,968

(22) PCT Filed: May 28, 2013

(86) PCT No.: PCT/JP2013/064796
§ 371 (c)(1),
(2) Date: Oct. 16, 2014

(87) PCT Pub. No.: WO2013/180138
PCT Pub. Date: Dec. 5, 2013

(65) Prior Publication Data

US 2015/0060479 A1 Mar. 5, 2015

(30) Foreign Application Priority Data

May 30, 2012 (JP) ................................ 2012-123645
May 30, 2012 (JP) ................................ 2012-123646

(51) Int. Cl.
*G07F 11/16* (2006.01)
*G07F 11/60* (2006.01)
(Continued)

(52) U.S. Cl.
CPC ................ *G07F 11/60* (2013.01); *G07F 11/18* (2013.01); *G07F 11/42* (2013.01)

(58) Field of Classification Search
CPC ..... B65G 47/8884; G07F 11/16; G07F 11/42; G07F 11/10; G07F 11/04; G07F 11/40; G07F 11/28; G07F 11/58; G07F 11/64
USPC .......................................................... 221/251
See application file for complete search history.

(56) References Cited

U.S. PATENT DOCUMENTS 5,799,823 A * 9/1998 Feltrin .................... G07F 11/08 221/242
6,073,801 A * 6/2000 McGarrah .......... B65G 47/8884 221/298

(Continued)

FOREIGN PATENT DOCUMENTS

JP H10-283561 A 10/1998
JP 2000-276645 A 10/2000

(Continued)

OTHER PUBLICATIONS

PCT, "International Search Report for International Application No. PCT/JP2013/064796".

(Continued)

*Primary Examiner* — Patrick Mackey
(74) *Attorney, Agent, or Firm* — Manabu Kanesaka

(57) ABSTRACT

A commodity storage device has commodity storage columns defining respective commodity storage passages, in each of which commodities are stored upright in a line. The commodity storage device includes first gate members, each of which is provided turnably in such a manner as to enter and retreat from the corresponding commodity storage passage; second gate members, each of which is provided so as to be able to turn in conjunction with the corresponding first gate member in such a manner as to enter and in conjunction with the corresponding first gate member in such a manner as to enter and retreat from the corresponding commodity storage passage; and flapper members, each of which is provided turnably on a side wall forming the corresponding commodity storage passage in such a manner as to enter and retreat form the commodity storage passage.

9 Claims, 73 Drawing Sheets

(51) Int. Cl.
*G07F 11/18* (2006.01)
*G07F 11/42* (2006.01)

(56) References Cited

U.S. PATENT DOCUMENTS

| | | | | |
|---|---|---|---|---|
| 6,253,954 | B1 * | 7/2001 | Yasaka | G07F 11/42 221/131 |
| 6,321,936 | B1 * | 11/2001 | Feltrin | G07F 11/04 221/251 |
| 6,571,988 | B2 * | 6/2003 | Bowen | G07F 11/10 221/250 |
| 7,549,557 | B2 * | 6/2009 | Lehmann | B65G 47/1471 221/208 |
| 7,604,145 | B2 * | 10/2009 | Percy | G07F 11/42 221/126 |
| 7,784,644 | B2 * | 8/2010 | Albert | G07F 11/16 221/124 |
| 8,087,541 | B2 * | 1/2012 | Valota | G07F 11/42 221/175 |
| 8,973,782 | B2 * | 3/2015 | Klier | A47G 21/12 221/177 |
| 9,082,254 | B2 * | 7/2015 | Carpentier | G07F 11/24 |
| 2004/0056042 | A1 * | 3/2004 | Skavnak | G07F 11/007 221/289 |
| 2004/0251266 | A1 * | 12/2004 | Yuyama | B65G 59/062 221/251 |

FOREIGN PATENT DOCUMENTS

| | | | |
|---|---|---|---|
| JP | 2000-293751 | A | 10/2000 |
| JP | 2001-34830 | A | 2/2001 |
| JP | 2006-164050 | A | 6/2006 |
| JP | 2007-293505 | A | 11/2007 |

OTHER PUBLICATIONS

Japan Patent Office, “Decision of a Patent Grant for JP 2014-518685,” Apr. 28, 2015.

* cited by examiner (a)

(b)

(c)

(d)

(a)

(b)

(c)

(d)

(a)

(b)

(c)

(d)

COMMODITY STORAGE DEVICE

RELATED APPLICATIONS

The present application is National Phase of International Application No. PCT/JP2013/064796 filed May 28, 2013, and claims priority from Japanese Applications No. 2012-123645, filed May 30, 2012 and No. 2012-123646, filed May 30, 2012, the disclosure of which is hereby incorporated by reference herein in its entirety.

TECHNICAL FIELD

The present invention relates to a commodity storage device that is applied to an automatic vending machine selling commodities such as canned beverages and plastic-bottled beverages.

BACKGROUND ART

Among the conventional automatic vending machines selling commodities such as canned beverages and plastic-bottled beverages, an automatic vending machine with a commodity storage device provided with a commodity storage column and a bucket for transporting commodities has been known. The commodity storage column is for storing a plurality of commodities in an arrangement. When a discharge device is driven, the commodity storage column discharges the commodities one by one from its front end portion.

The bucket is designed to receive the commodities discharged from the commodity storage column. The bucket is provided such that it can be moved vertically and crosswise in a front region of the commodity storage column by bucket drive means. The bucket drive means is configured by an X-axis transportation mechanism capable of moving the bucket in the crosswise direction, and a Y-axis transportation mechanism that moves the bucket including the X-axis transportation mechanism in the vertical direction.

In this type of commodity storage device, when a user throws in a certain amount of money or more and then operates a selection button, the bucket drive means is driven accordingly, moving the bucket to the front part of the commodity storage column in which a commodity that the user wishes to purchase is stored. The bucket is then moved to the vicinity of a commodity outlet after the commodity is discharged from the commodity storage column to the bucket. This configuration allows the user to take the commodity out of the commodity outlet (see Patent Document 1, for example).

Patent Document 1: Japanese Patent Application Publication No. 2006-164050

DISCLOSURE OF THE INVENTION

The commodity storage device proposed in Patent Document 1 needs to drive the bucket drive means to move the bucket, in order to discharge a commodity, wherein various control needs to be performed in order to move the bucket. This commodity storage device, therefore, has too many parts and requires expensive sensors and the like, leading to a cost increase.

In view of the circumstances described above, an object of the present invention is to provide a commodity storage device that is designed not only for cost reduction but also to allow commodities stored in a commodity storage column to securely be extracted one by one.

In order to achieve this object, a commodity storage device according to claim 1 of the present invention is a commodity storage device that has commodity storage columns defining respective commodity storage passages in each of which commodities are stored upright in a line, the commodity storage device having: first gate members, each of which is provided turnably in such a manner as to enter and retreat from the corresponding commodity storage passage, restricts extraction of a most downstream commodity on a most downstream side when held in a state of entering the commodity storage passage during a normal state, but retreats from the commodity storage passage to allow the most downstream commodity to be extracted in response to an extraction operation on the most downstream commodity when the state of entering the commodity storage passage is cancelled; second gate members, each of which is provided so as to be able to turn in conjunction with the corresponding first gate member in such a manner as to enter and retreat from the corresponding commodity storage passage, retreats from the commodity storage passage when the first gate member is restricted to the state of entering the commodity storage passage, but enters the commodity storage passage and comes into abutment with an upper portion of a second commodity adjacent to an upstream-side part of the most downstream commodity, to restrict the second commodity from moving to a downstream side when the first gate member retreats from the commodity storage passage; and flapper members, each of which is provided turnably on a side wall forming the corresponding commodity storage passage in such a manner as to enter and retreat from the commodity storage passage, retreats from the commodity storage passage when the first gate member is restricted to the state of entering the commodity storage passage, but enters the commodity storage passage and comes into abutment with a lower portion of the second commodity to restrict the second commodity from moving to the downstream side when the state of the first gate member of entering the commodity storage passage is cancelled.

A commodity storage device according to claim 2 of the present invention, in the foregoing claim 1, further has: slide members, which are located at reference positions to keep the flapper members retreated from the commodity storage passages during the normal state, but cause the flapper members to enter the commodity storage passages when moving from the reference positions; and cam members, which are in non-abutment with the slide members located at the reference positions when in a standby state, and come into abutment with the slide members to move the slide members from the reference positions when a sales command is input.

In a commodity storage device according to claim 3 of the present invention, according to the foregoing claim 1 or 2, the commodity storage columns have: guide members in a reversed C-shape, which extend in a front-back direction and allow upper parts of the commodities to enter the commodity storage columns; and stand portions that extend in the front-back direction and hold the commodities upright, wherein a distance between the guide members and the stand portions can be adjusted arbitrarily.

A commodity storage device according to claim 4 of the present invention, in any one of the foregoing claims 1 to 3, further has: commodity racks, in each of which the commodity storage columns are arranged in parallel; restricting means that is provided in each of the commodity racks, allows any one of the first gate members to be operated, and restricts the other first gate members of the same commodity rack from being operated; and stopper members, each of which is provided on the downstream side of the most downstream commodity in each of the commodity storage columns in such a manner as to be able to enter and retreat from the corresponding commodity storage passage, enters the commodity storage passage in such a manner as to be able to retreat therefrom during the normal state, but enters the commodity storage passage while being restricted from retreating therefrom when extraction of the commodities from the same commodity rack is allowed.

A commodity storage device according to claim 5 of the present invention, in any one of the foregoing claims 1 to 4, further has a pusher member that is provided in each of the commodity storage columns and pushes the commodities stored in the commodity storage column toward the downstream side.

In a commodity storage device according to claim 6 of the present invention, according to the foregoing claim 5, the pusher members each abut with and press the commodities by means of an attachment member that is provided as necessary.

In a commodity storage device according to claim 7, according to any one of the foregoing claims 1 to 6, the commodities are each in the shape of a tube with closed upper and lower surfaces, and the second gate members each have a protruding portion that enters a space between the most downstream commodity extracted through the extraction operation and the second commodity in partial abutment with the most downstream commodity, to come into abutment with the second commodity when the second gate member enters the corresponding commodity storage passage.

In a commodity storage device according to claim 8 of the present invention, according to any one of the foregoing claims 1 to 6, the commodities each have a shape in which an outer diameter thereof gradually increases from a lid mount portion onto which a lid body is mounted detachably toward a body portion, the commodity storage device further comprising a cover member that is mounted on a front end surface of the side wall and has a depressed portion formed at a part corresponding to the body portion of the most downstream commodity.

In a commodity storage device according to claim 9 of the present invention, according to any one of the foregoing claims 4 to 8, the restricting means has a plurality of bridge members accommodated in an accommodation region of a guide member extending in a direction of parallel arrangement of the commodity storage columns, such that the bridge members can slide along a direction of extension of the guide member, and, when a part of the first gate members operated in response to the extraction operation on the commodity enters the accommodation region, the restricting means inhibits a part of other first gate members from entering the accommodation region to restrict operation of the other first gate members.

In the commodity storage device of the present invention, each of the first gate members is held in the corresponding commodity storage passage during the normal state to restrict extraction of the most downstream commodity, and retreats from the commodity storage passage in response to an extraction operation on the most downstream commodity when the state of entering the commodity storage passage is cancelled, to allow the most downstream commodity to be extracted. Each of the second gate members retreats from the corresponding commodity storage passage when the first gate member is restricted to the state of entering the commodity storage passage, but enters the commodity storage passage and comes into abutment with the upper portion of the second commodity to restrict the second commodity from moving to the downstream side when the first gate member retreats from the commodity storage passage. In addition, each of the flapper members retreats from the corresponding commodity storage passage when the first gate member is restricted to the state of entering the commodity storage passage, but enters the commodity storage passage and comes into abutment with the lower portion of the second commodity to restrict the second commodity from moving to the downstream side when the state of the first gate member of entering the commodity storage passage is cancelled. This configuration prevents extraction of the commodities stored in each commodity storage column when the first gate member is held in its state of entering the corresponding commodity storage passage. On the other hand, when the first gate member retreats from the corresponding commodity storage passage, the second gate member enters the commodity storage passage to restrict the second commodity from moving toward the downstream side, whereas the flapper member enters the commodity storage passage and comes into abutment with the lower portion of the second commodity to restrict the second commodity from moving toward the downstream side. This allows the most downstream commodity to be extracted, while the second commodity is restricted from moving toward the downstream side. Letting a user to execute the commodity extraction operation in this manner can accomplish cost reduction without using the buckets or bucket drive means of the conventional automatic vending machines. Even with the first gate member retreated from the corresponding commodity storage passage, the second gate member and the flapper member can enter the commodity storage passage, allowing the commodities to be extracted one by one from the corresponding commodity storage column. The present invention, therefore, brings about the effect of securely extracting commodities of a commodity storage column one by one, while realizing cost reduction.

BEST MODE FOR CARRYING OUT THE INVENTION

Preferred embodiments of a commodity storage device according to the present invention are described hereinafter in detail with reference to the accompanying drawings.

<First Embodiment>

Figure 1:
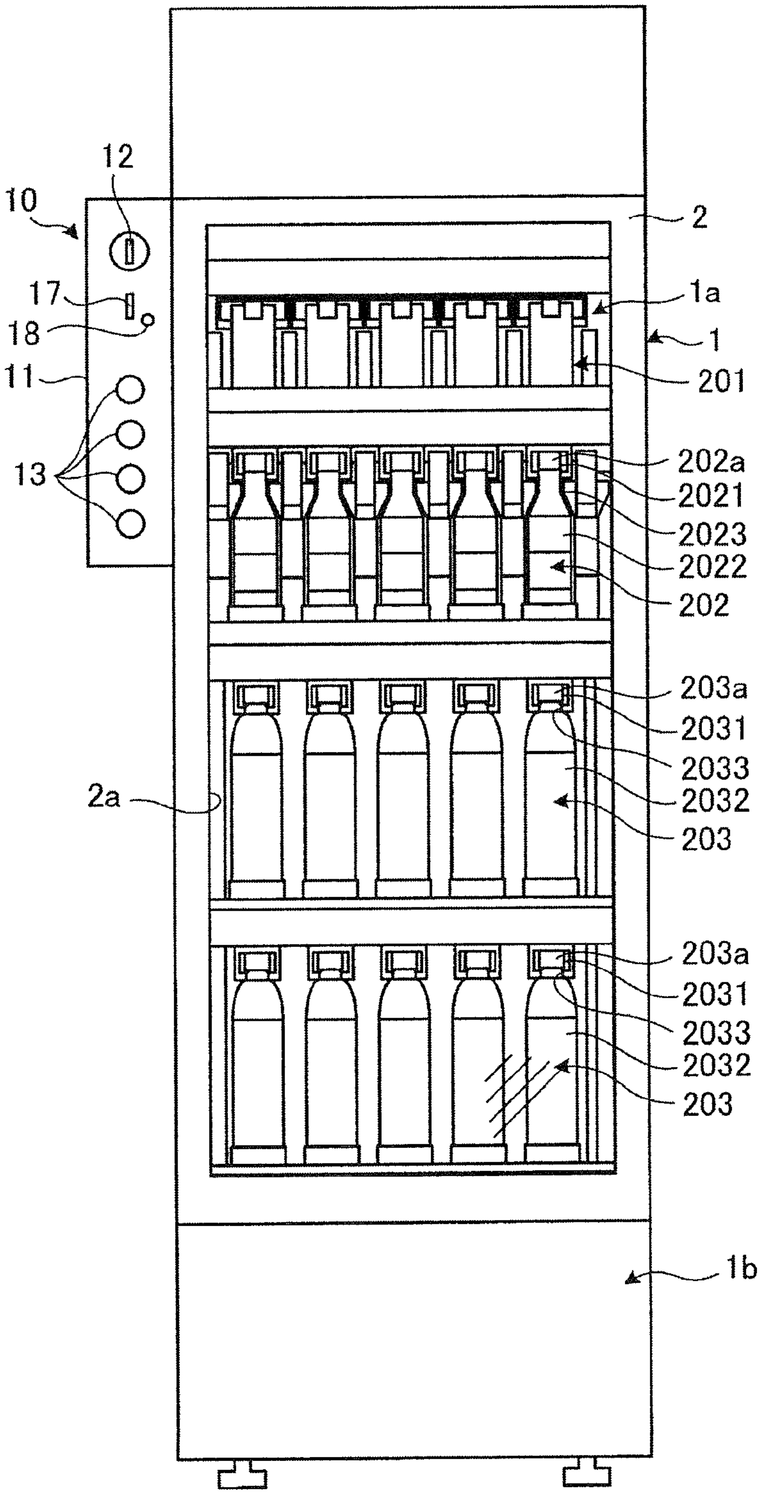
FIG. 1 is a front view showing an automatic vending machine to which a commodity storage device according to Embodiment 1 of the present invention is applied.
Figure 2:
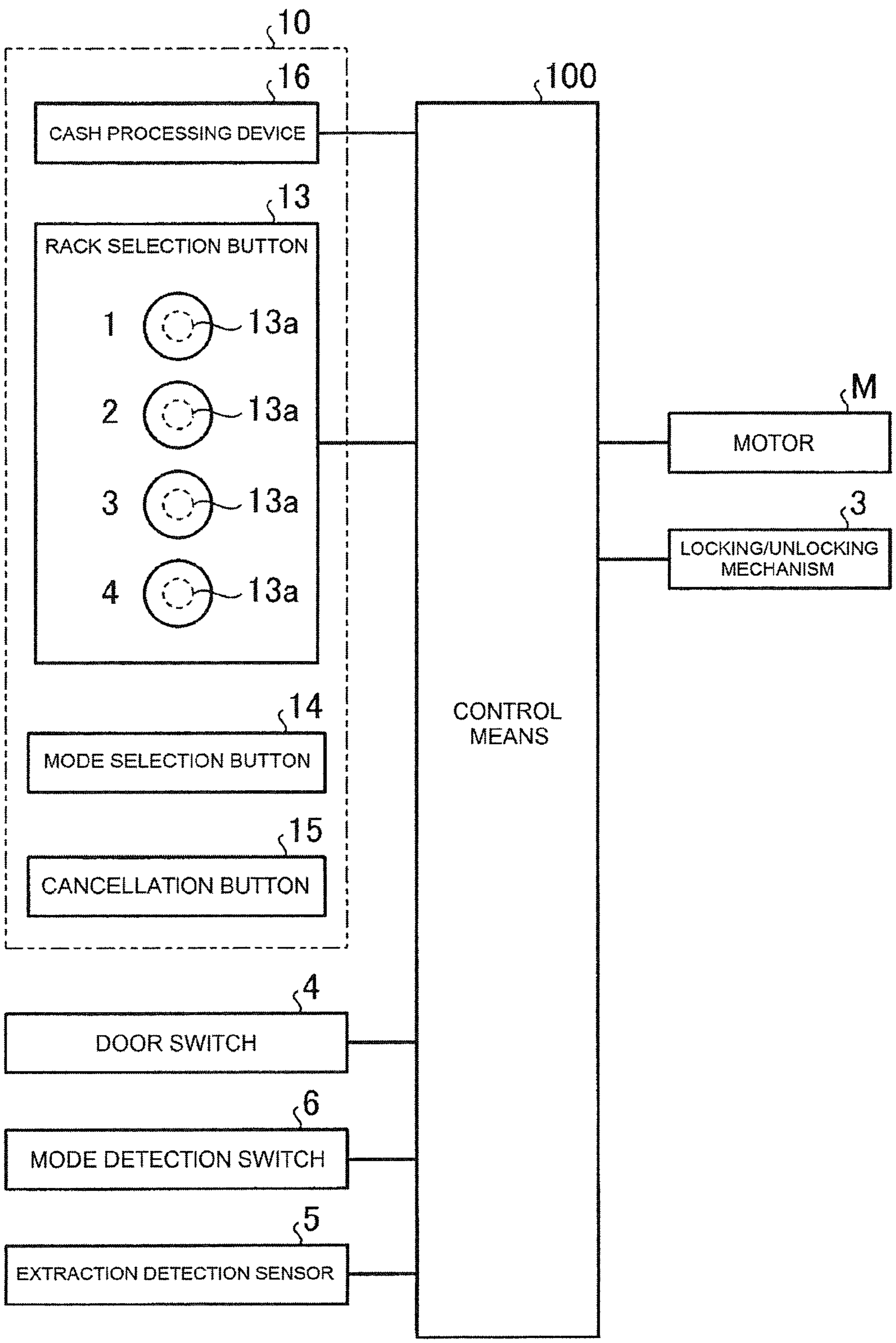
FIG. 2 is a block diagram showing a control system of the automatic vending machine to which the commodity storage device according to Embodiment 1 of the present invention is applied.

FIGS. 1 and 2 each show an automatic vending machine to which a commodity storage device according to Embodiment 1 of the present invention is applied, FIG. 1 being a front view and FIG. 2 a block diagram showing a control system. The automatic vending machine illustrated herein sells, for example, cooled or heated beverage commodities in cans, bottles, and plastic bottles, and has a main cabinet 1.

A canned beverage commodity is a commodity obtained by containing the beverage in a can 201 which is the container, and is in the shape of a cylinder with closed upper and lower surfaces. A bottled beverage commodity has the beverage contained in a bottle 202 which is the container, and is shaped to have a bulging portion 2023, the outer diameter of which increases gradually from a cap mount portion 2021 toward a body portion 2022, the cap mount portion 2021 having a cap 202*a* detachably mounted thereon. In addition, a plastic-bottled beverage commodity has the beverage contained in a plastic bottle 203 which is the container, and is shaped to have a narrow portion 2033 between a cap mount portion 2031 and a body portion 2032, the cap mount portion 2031 having a cap 203*a* detachably mounted thereon.

The main cabinet 1 is a rectangular parallelpiped housing, in which an opening on its front surface is opened/closed by an outer door 2. The outer door 2 is configured appropriately with a heat insulating material and has a window portion 2*a* embedded with a transparent plate material such as a plate of heat insulating glass. Through the window portion 2*a* of the outer door 2, the inside of the automatic vending machine can be visually recognized. A handle, not shown, is provided at the center of a left side surface on the left end side of the outer door 2.

Opening/closing of the outer door 2 is controlled by a locking/unlocking mechanism 3, and the opened/closed state of the outer door 2 is detected by a door switch 4. In its locked state, the locking/unlocking mechanism 3 restricts the outer door 2 from being opened, to keep the front surface opening of the main cabinet 1 closed. In its unlocked state, on the other hand, the locking/unlocking mechanism 3 allows the outer door 2 to be opened/closed. The door switch 4 enters its ON state when the outer door 2 closes the front surface opening of the main cabinet 1. On the other hand, when the outer door 2 opens the front surface opening of the main cabinet 1, the door switch 4 enters its OFF state.

The inside of the main cabinet 1 is divided into two sections: upper and lower sections. The upper side configures a storage room 1*a* and the lower side a machine room 1*b*. The inside of the storage room 1*a* is kept at a predetermined temperature. Wall members configuring the storage room 1*a* are made of heat insulating materials. The storage room 1*a* is also provided with an evaporator or other means (not shown) for cooling the internal air of the storage room 1*a*, and an electric heater or other means (not shown) for heating the internal air of the storage room 1*a*. The machine room 1*b*, on the other hand, is provided with a refrigerating machine (not shown) configuring a refrigerating cycle together with the evaporator, and various control equipment (not shown).

An input processing unit 10 is mounted on an upper section on the left side surface of the main cabinet 1. The input processing unit 10 has a box-shaped unit main body 11. This unit main body 11 has a robust structure. A front surface of the unit main body 11 is provided with a coin slot 12, a rack selection button 13, and the like. The left portion of the unit main body 11 can be opened/closed by a unit door, not shown, which is provided in such a manner that a mode selection button 14 and a cancellation button 15 are exposed when opened. This unit door is constantly restricted by a lock mechanism, not shown, and can only be opened by a manager or the like who can operate the lock mechanism. The inside of the unit main body 11 is also provided with a cash processing device 16.

The coin slot 12 is an opening for dropping coins. There are more than one rack selection buttons 13 (four, in the illustrated example), which are push buttons arranged vertically. The rack selection buttons 13 are associated with commodity racks 30 configuring a commodity storage device 20, as described hereinafter, and send input signals to the control means 100 by being pressed by a user. Each of the rack selection buttons 13 has a built-in light source 13*a* such as an LED. The light sources 13*a* light up in response to lighting commands received from the control means 100.

The mode selection button 14 sends a replenishment signal to the control means 100 by being pressed by the manager. The cancellation button 15 sends a cancellation signal to the control means 100 by being pressed by the manager.

The cash processing device 16 verifies the authenticity and types of the coins dropped into the coin slot 12, to perform a cash process for accommodating the coins according to the types thereof. This cash processing device 16 sends to the control means 100 total amount information on the amount of money dropped into the coin slot 12, and discharges the change. The change is paid through a coin return slot 17. Even when the user operates a return button 18 after dropping coins into the coin slot 12, the cash processing device 16 discharges the coins through the coin return slot 17. The cash processing device 16 also discharges through the coin return slot 17 those coins that could not be verified for their authenticity and type.

Figure 3:
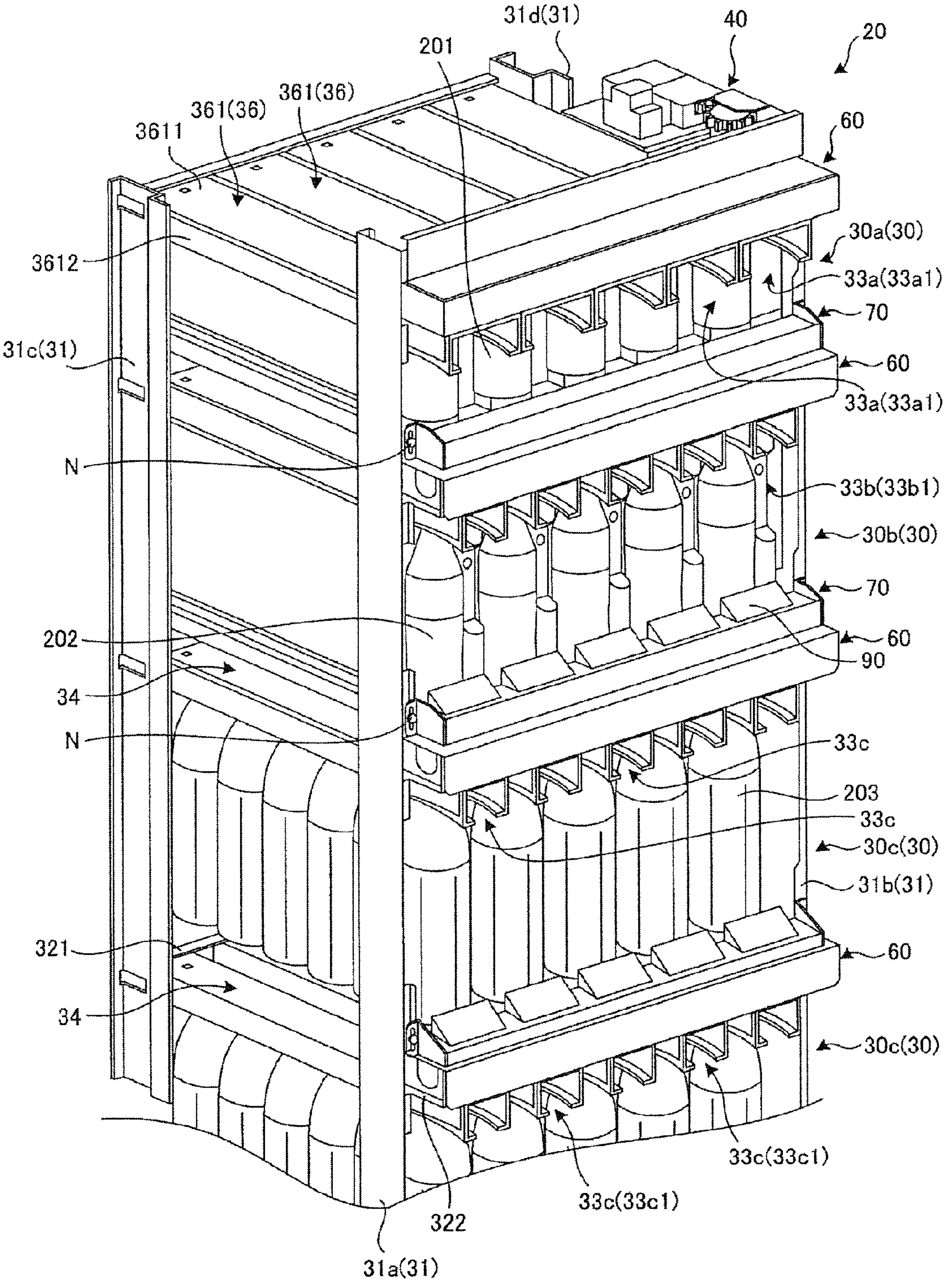
FIG. 3 is a perspective view showing an enlargement of the commodity storage device of the automatic vending machine shown in FIG. 1, with some of the components omitted.
Figure 4:
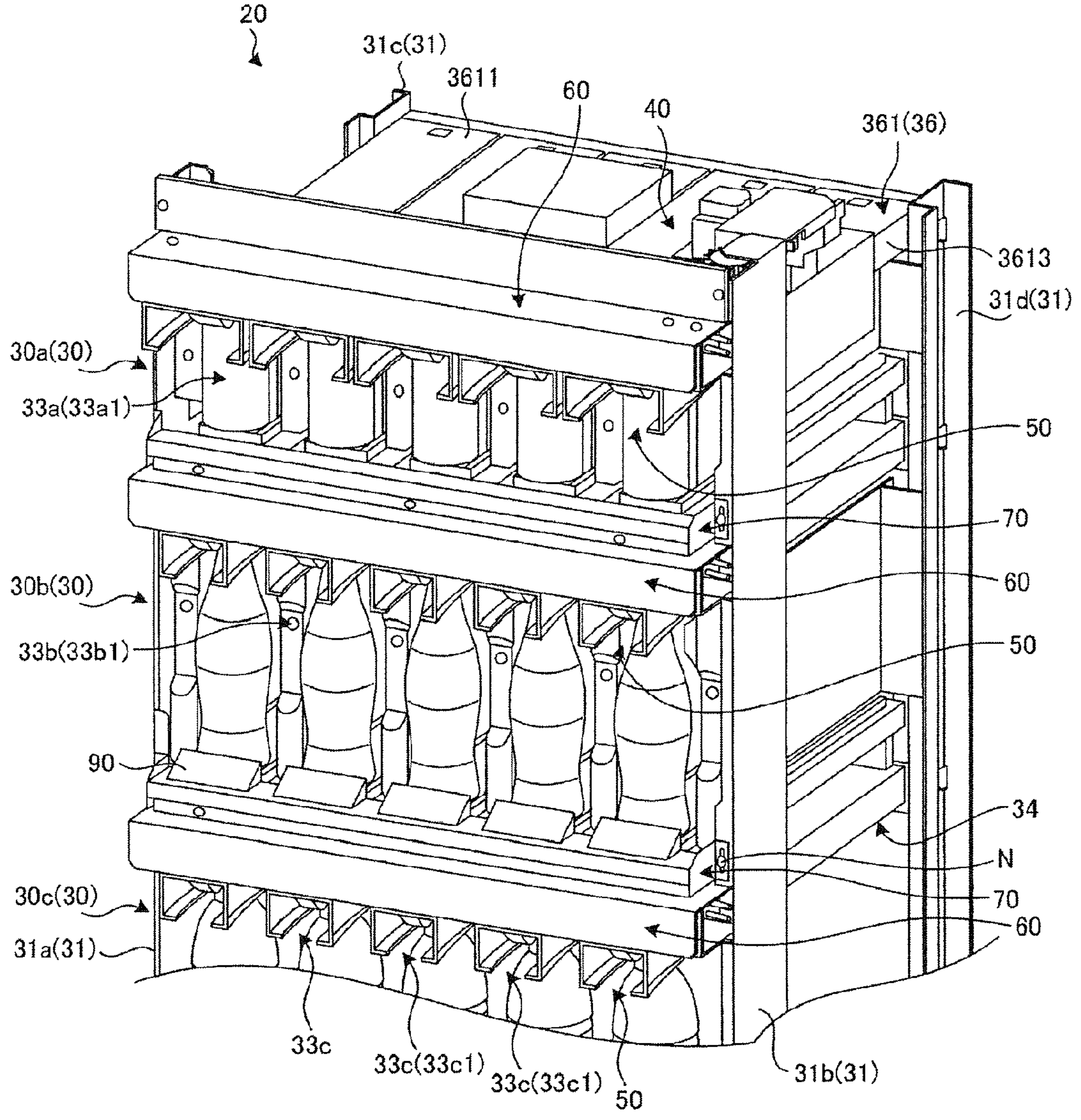
FIG. 4 is a perspective view showing an enlargement of the commodity storage device of the automatic vending machine shown in FIG. 1, with some of the components omitted.

The storage room 1*a* of the main cabinet 1 is provided with the commodity storage device 20. FIGS. 3 and 4 are each a perspective view showing an enlargement of the commodity storage device 20 of the automatic vending machine shown in FIG. 1, with some of the components omitted.

As shown in FIGS. 3 and 4 as well, the commodity storage device 20 has the commodity racks 30, a rack selection mechanism 40, extraction mechanisms 50, restricting means 60, and flapper mechanisms 70.

Figure 5:
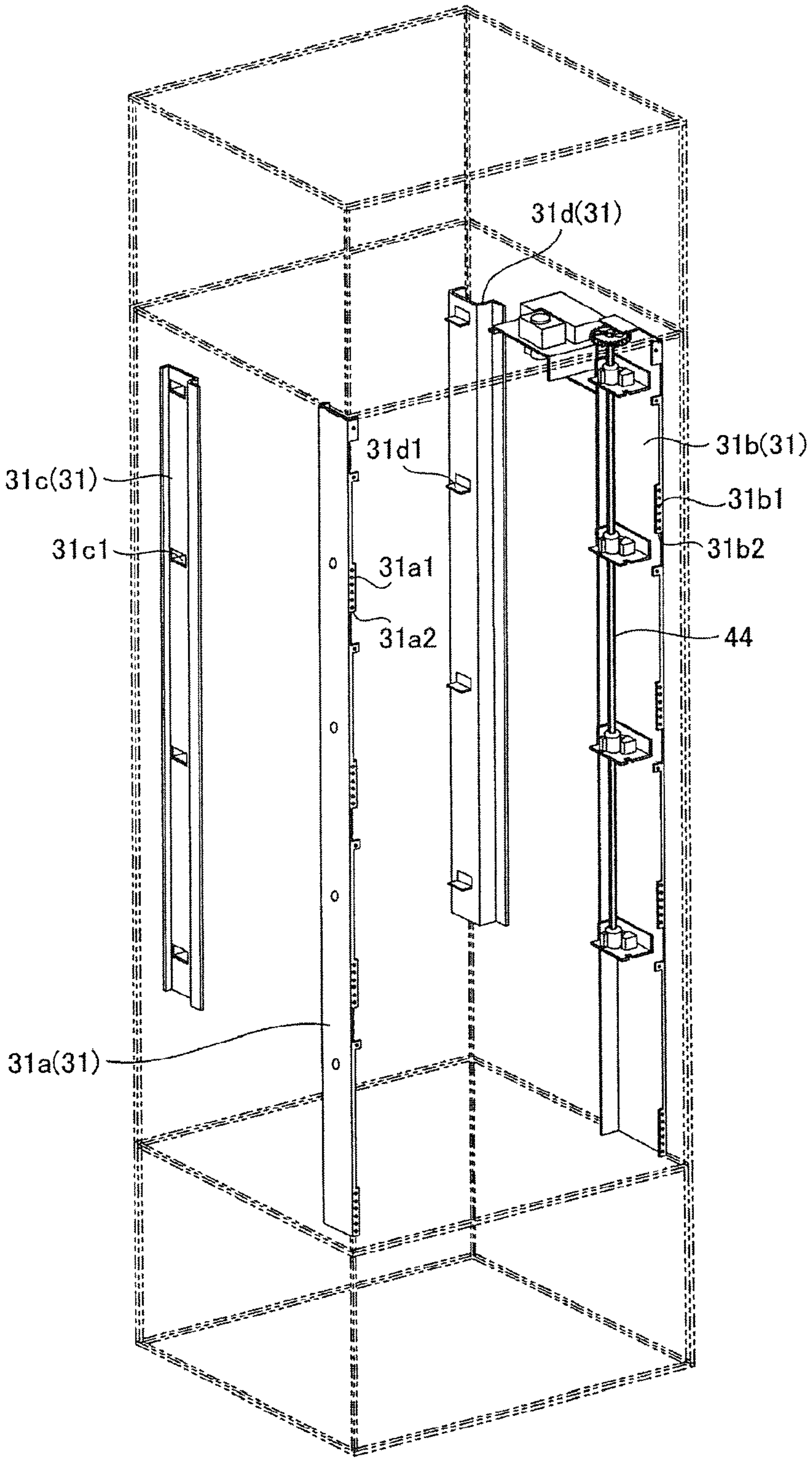
FIG. 5 is an explanation drawing showing rack support side plates provided on the inside of a storage room of a main cabinet.

There are more than one commodity racks 30 (four, in the illustrated example). The commodity racks 30 are provided vertically in a step-like manner in such a manner as to extend between pairs of left and right rack support side plates 31. The rack support side plates 31 are formed by bending a steel plate and are provided in the storage room 1*a* in such a manner as to extend vertically, as shown in FIG. 5. The left front rack support side plate 31*a* and the right front rack support side plate 31*b* form a pair of left and right rack support side plates. Similarly the left rear rack support side plate 31*c* and the right rear rack support side plate 31*d* form another pair of left and right rack support side plates. The left rear rack support side plate 31*c* and the right rear rack support side plate 31*d* are provided with support pieces 31*c*1, 31*d*1 (see FIG. 5) that project from the opposing surfaces of these rack support side plates to support the commodity racks 30. The left front rack support side plate 31*a* and the right front rack support side plate 31*b* have a plurality of fastening holes 31*a*2, 31*b*2 formed thereon to allow fastening members (N) facing the front surfaces 31*a*1, 31*b*1, or the front surface opening of the main cabinet 1, to be inserted therethrough.

The top commodity rack 30 is for storing canned beverage commodities, the second one from the top for storing bottled beverage commodities, and the third one from the top for storing plastic-bottled beverage commodities.

The commodity rack 30 for storing plastic-bottled commodities 203 (also referred to as "plastic-bottled commodity rack 30*c*," hereinafter) is described first.

In the plastic-bottled commodity rack 30*c*, a rear horizontal member 321 configuring the rear section of the plastic-bottled commodity rack 30*c* is engaged with the support pieces 31*c*1, 31*d*1, and a slide base member 322 configuring the front section of the same is mounted on the front surfaces 31*a*1, 31*b*1 of the left front rack support side plate 31*a* and the right front rack support side plate 31*b* by inserting the fastening members N through the predetermined fastening holes 31*a*2, 31*b*2.

The plastic-bottled commodity rack 30*c* is configured by arranging a plurality of commodity storage columns 33*c* (five, in the illustrated example) in a crosswise direction. Each of these commodity storage columns 33*c* has a rail member 34. The rail members 34 each extend in a front-back direction and define commodity storage passages 33*c*1.

Figure 6:
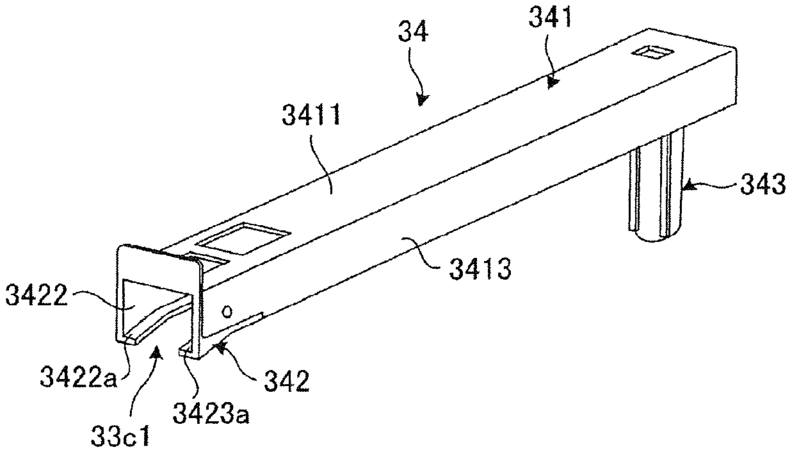
FIG. 6 is a perspective view showing a rail member configuring each commodity storage column shown in FIGS. 1, 3 and 4.
Figure 7:
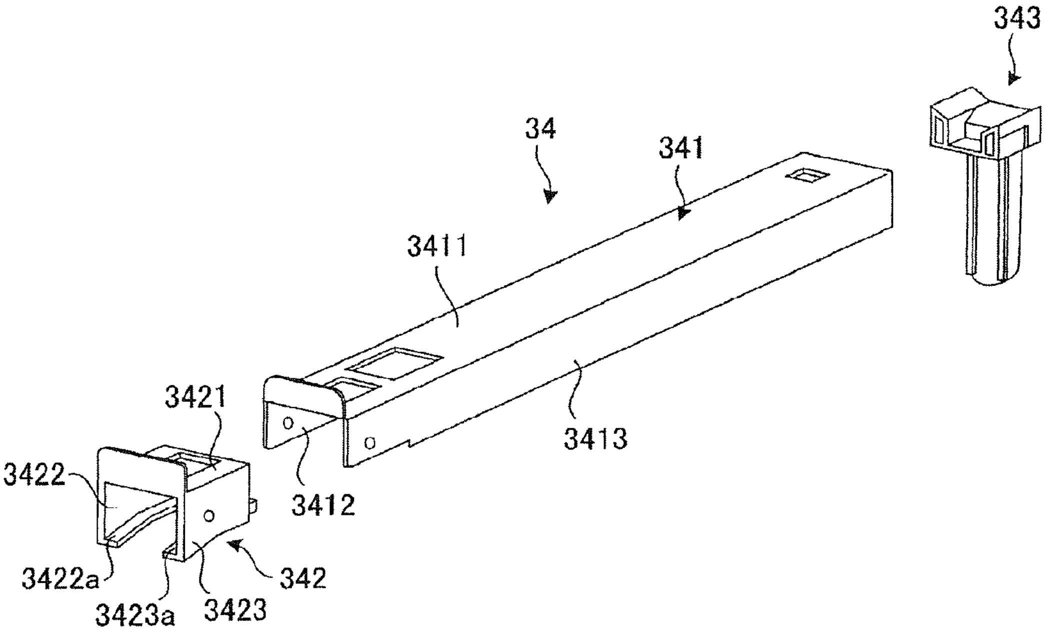
FIG. 7 is an exploded perspective view of the rail member shown in FIG. 6.

FIG. 6 is a perspective view showing one of the rail members configuring the commodity storage columns shown in FIGS. 1, 3 and 4. FIG. 7 is an exploded perspective view of the rail member shown in FIG. 6. As shown in FIGS. 6 and 7, the rail member 34 has a rail substrate 341, a front end rail portion 342, and a pusher member 343.

The rail substrate 341 is formed by appropriately bending a steel plate into a long object whose front-back direction is the longitudinal direction. When viewed from the front, this rail substrate 341 is in an inverted U-shape with a base portion 3411, a lower left extension portion 3412, and a lower right extension portion 3413 integrated with each another.

The base portion 3411 is a horizontal section extending along the front-back direction. This base portion 3411 has its rear end portion supported by the rear horizontal member 321 and its front end portion by the slide base member 322. The lower left extension portion 3412 extends downward from a left end portion of the base portion 3411 and has its extended end portion bent to the right, forming a left-side edge portion 3412*a* (see FIG. 32). Therefore, when viewed from the front, the lower left extension portion 3412 is in an L-shape. The lower right extension portion 3413 extends downward from a right end portion of the base portion 3411 and has its extended end portion bent to the left, forming a right-side edge portion (not shown). Therefore, when viewed from the front, the lower right extension portion 3413 is in an inverted L-shape.

The lower left extension portion 3412 and the lower right extension portion 3413 form a pair to define a part of a commodity storage passage 33*c*1 using the gap therebetween.

The width of the commodity storage passage 33*c*1 (the minimum width between the left-side edge portion 3412*a* and the right-side edge portion) is greater than the maximum width of the narrow portion 2033 of a target commodity (plastic-bottled beverage commodity) 203 but smaller than the maximum width of the cap mount portion 2031 of the commodity 203.

The front end rail portion 342 is made of resin. As with the rail substrate 341, when viewed from the front, the front end rail portion 342 is in an inverted U-shape with a front end base portion 3421, a front end lower left extension portion 3422, and a front end lower right extension portion 3423 integrated with each other.

The front end base portion 3421 is a horizontal section extending along the front-back direction. The front end lower left extension portion 3422 extends downward from a left end portion of the front end base portion 3421 and has its extended end portion bent to the right, forming a left-side front end edge portion 3422*a*. The front end lower right extension portion 3423 extends downward from a right end portion of the front end base portion 3421 and has its extended end portion bent to the left, forming a right-side front end edge portion 3423*a* .

The front end lower left extension portion 3422 and the front end lower right extension portion 3423 form a pair to define a front end portion (downstream end portion) of the commodity storage passage 33*c*1 using the gap therebetween. The width of the commodity storage passage is greater than the maximum width of the narrow portion 2033 of the target commodity (plastic-bottled beverage commodity) 203 but smaller than the maximum width of the cap mount portion 2031 of the commodity 203. The left-side front end edge portion 3422*a* formed in the front end lower left extension portion 3422 and the right-side front end edge portion 3423*a* formed in the front end lower right extension portion 3423 are gradually inclined downward toward the front.

This front end rail portion 342 is sized to be able to enter the front end portion of the rail substrate 341, and has its predetermined section engaged after entering the front end portion, thereby connecting the left-side front end edge portion 3422*a* to the left-side edge portion 3412*a*, and the right-side front end edge portion 3423*a* to the right-side edge portion. Therefore, the rail member 34 is curved where its front end portion (downstream-side end portion) is gradually inclined downward.

The pusher member 343 is incorporated in the commodity storage passage 33*c*1. This pusher member 343 is constantly biased forward by a pair of left and right spring members (not shown). These spiral spring members have tip end portions thereof fixed to the front end section of the rail substrate 341.

In the rail member 34, once the commodity 203 is thrown in upright in a manner that the narrow portion 2033 of the commodity 203 is inserted from the front into the commodity storage passage 33*c*1, a part of the cap mount portion 2031 of the commodity 203 is placed on each of the edge portions. Consequently, the rail member 34 supports the commodity 203, suspended, by supporting the cap mount portion 2031 of the commodity 203, and stores the commodity 203 in the front-back direction in the commodity storage passage 33*c*1. As a result of constantly biasing the pusher member 343 forward by means of the spiral spring members, the commodity 203 stored in the commodity storage passage 33*c*1 is pushed forward.

The commodity storage column 33*c* is provided with an extraction detection sensor 5 (see FIG. 2). The extraction detection sensor 5 is provided at the foremost part of the commodity storage passage 33*c*1. This extraction detection sensor 5 is sort of, for example, an optical sensor that detects the passage of a commodity (203) through a predetermined monitoring region and transmits a detection signal, which is the result of the detection, to the control means 100.

Figure 8:
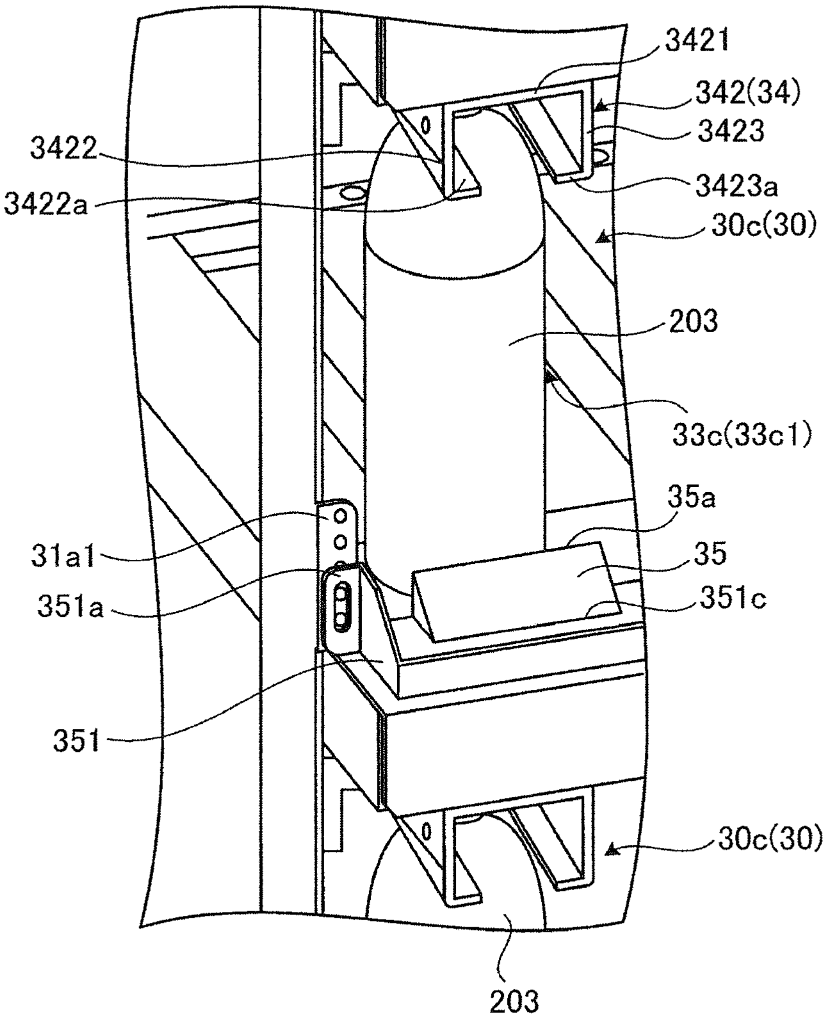
FIG. 8 is a perspective view showing an enlargement of the substantial portions of a commodity rack.

FIG. 8 is a perspective view showing an enlargement of the substantial portions of the plastic-bottled commodity rack 30*c*. As shown in FIG. 8, the plastic-bottled commodity rack 30*c* is provided with a restricting member 35 corresponding to each commodity storage column 33*c*. The restricting members 35 are made of resin, for example, and are each provided at the front end portion (downstream-side end portion) of the commodity storage passage 33*c*1 in each commodity storage column 33*c*, i.e., a front section (downstream-side section) in front of the foremost commodity (the most downstream commodity). The restricting members 35 are described hereinafter in detail.

Figure 9:
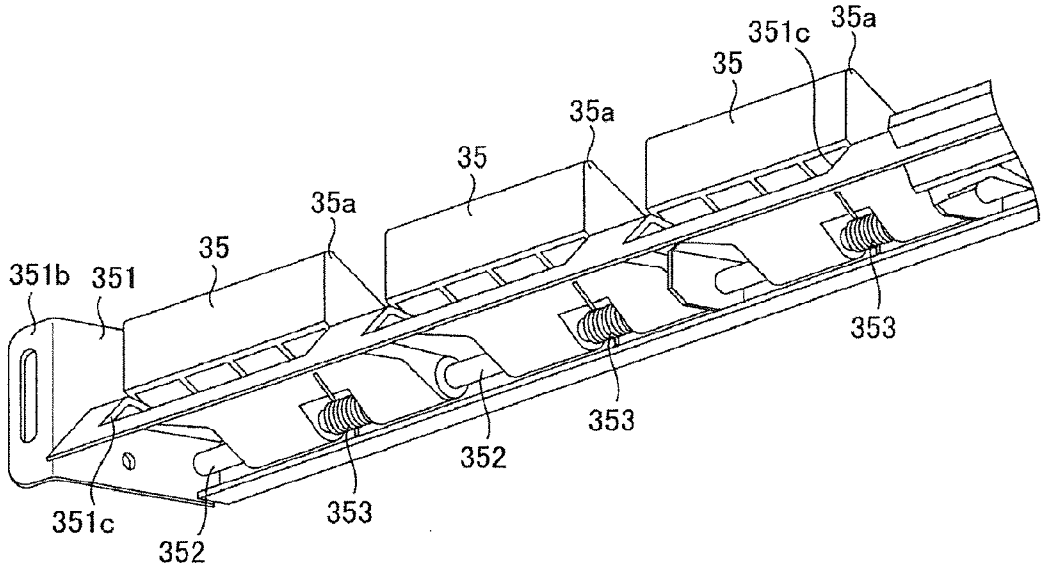
FIG. 9 is a perspective view showing the configuration of a restricting member shown in FIG. 8.

As shown in FIG. 9, the restricting members 35 are supported turnably by a restricting base member 351 formed from a steel plate. The restricting base member 351 is a long object whose crosswise direction is the longitudinal direction, wherein left and right end portions 351*a*, 351*b* are fastened to the front surfaces 31*a* l, 31*b*1 of the left front rack support side plate 31*a* and the right front rack support side plate 31*b* by the fastening members. A rod-like restricting shaft portion 352 extends in the crosswise direction across the restricting base member 351, and the restricting members 35 have the restricting shaft portion 352 inserted therethrough. The restricting members 35 are capable of turning about the central axis of the restricting shaft portion 352, and are biased by restricting spring members 353 respectively so that rear end portions 35*a* of the restricting member 35*s*, in the normal state, enter the commodity storage passage 33*c*1 through restricting openings 351*c* of the restricting base member 351.

When the restricting members 35 are biased by the restricting spring members 353 and consequently the rear end portions 35*a* enter the commodity storage passage 33*c*1, upper surfaces of the restricting members 35 are inclined gradually downward toward the front, as shown in FIG. 8.

Figure 10:
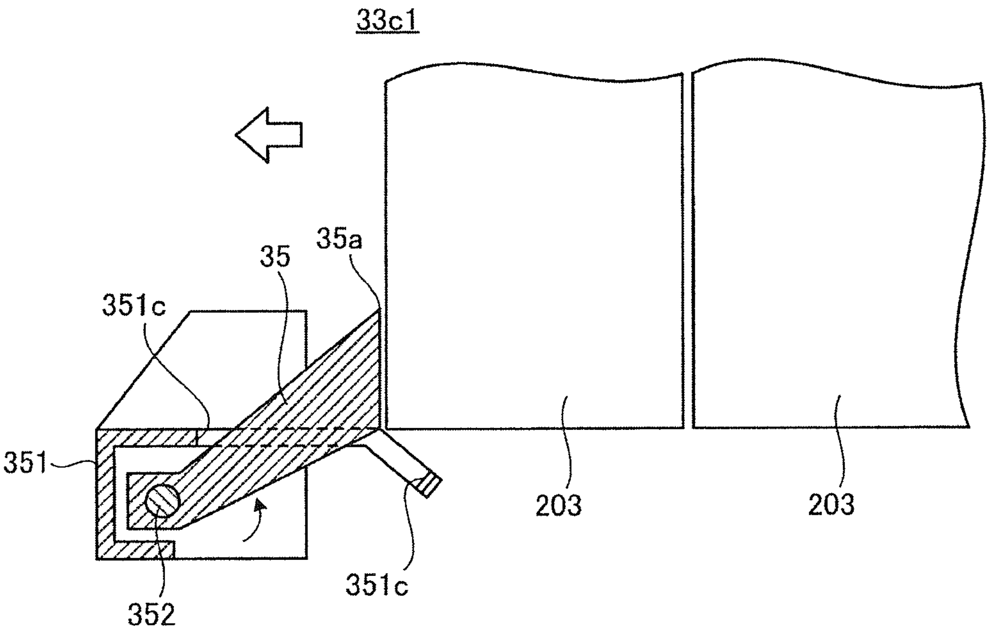
FIG. 10 is a cross-sectional side view for explaining the operations of the restricting member.
Figure 11:
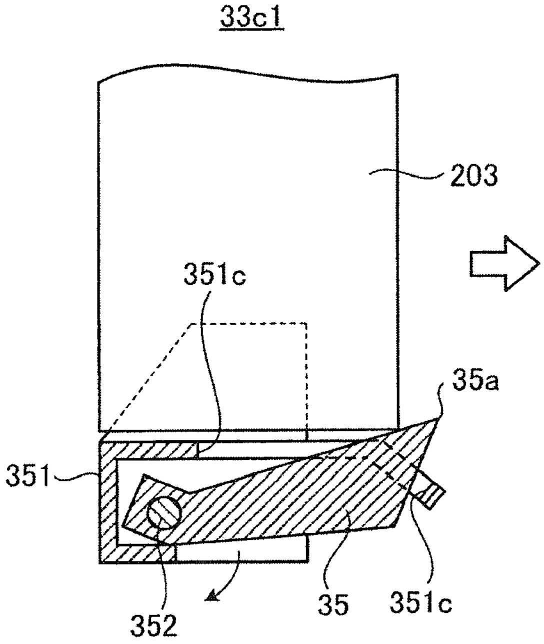
FIG. 11 is a cross-sectional side view for explaining the operations of the restricting member.

In a state in which the rear end portion 35*a* of a restricting member 35 is in the commodity storage passage 33*c*1 as shown in FIG. 10, the restricting member 35 restricts forward extraction of the upright foremost commodity 203. When pushed by a commodity 203 entering from the front, the restricting member 35 turns downward about the central axis of the restricting shaft portion 352 against the biasing force of the restricting spring member 353, allowing the rear end portion 35*a* to retreat from the commodity storage passage 33*c*1, as shown in FIG. 11. This allows the commodity 203 to enter the commodity storage passage 33*c*1.

A commodity rack 30 for storing canned beverage commodities 201 (also referred to as "canned commodity rack 30*a*" hereinafter) is described next.

The canned commodity rack 30*a* is configured by arranging a plurality of commodity storage columns 33*a* (five, in the illustrated example) in the crosswise direction. Each of these commodity storage columns 33*a* has a can guide member 36 and a can stand portion 37.

Figure 12:
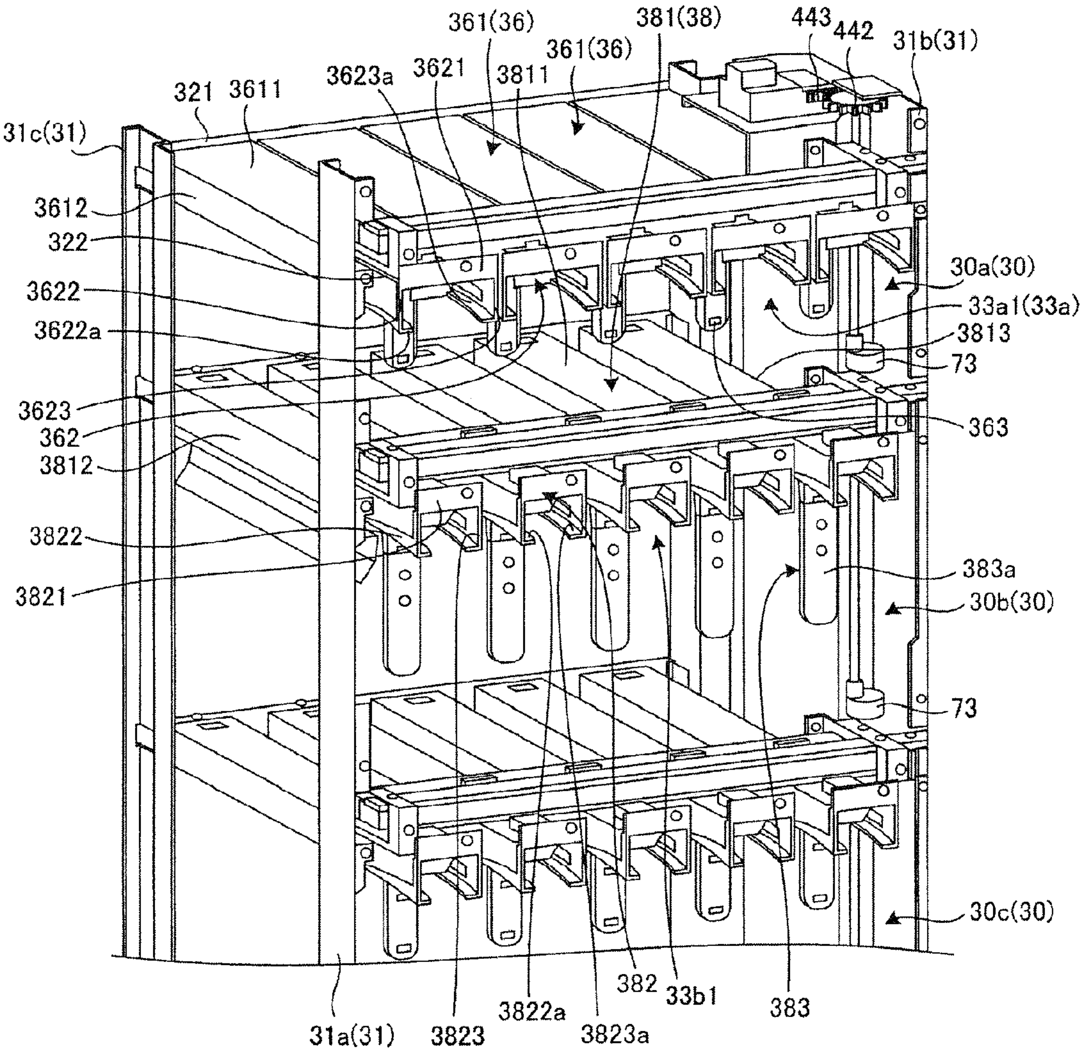
FIG. 12 is a perspective view showing the substantial portions of the commodity storage device shown in FIGS. 3 and 4, with some of the components omitted.

The can guide member 36 extends in the front-back direction and is configured by a can guide substrate 361, a can front end guide portion 362, and a can pusher member 363, as shown in FIG. 12.

The can guide substrate 361 is formed by appropriately bending a steel plate into a long object whose front-back direction is the longitudinal direction. When viewed from the front, the can guide substrate 361 is in an inverted U-shape with a base portion 3611, a lower left extension portion 3612, and a lower right extension portion 3613 integrated with each other.

The base portion 3611 is a horizontal section extending along the front-back direction. This base portion 3611 has its rear end portion supported by the rear horizontal member 321 and its front end portion by the slide base member 322.

The lower left extension portion 3612 extends downward from a left end portion of the base portion 3611 and has its extended end portion bent to the right, forming a left-side edge portion (not shown). Therefore, when viewed from the front, the lower left extension portion 3612 is in an L-shape. The lower right extension portion 3613 extends downward from a right end portion of the base portion 3611 and has its extended end portion bent to the left, forming a right-side edge portion (not shown). Therefore, when viewed from the front, the lower right extension portion 3613 is in an inverted L-shape.

The lower left extension portion 3612 and the lower right extension portion 3613 form a pair to define an upper part of each commodity storage passage **33*a*1 using the gap therebetween. The width of the commodity storage passage 33*a*1 (the minimum width between the left-side edge portion and the right-side edge portion) is slightly greater than the maximum width of a target commodity (canned beverage commodity: 201**).

The can front end guide portion 362 is made of resin. As with the can guide substrate 361, when viewed from the front, the can front end guide portion 362 is in an inverted U-shape with a front end base portion 3621, a front end lower left extension portion 3622, and a front end lower right extension portion 3623 integrated with each other.

The front end base portion 3621 is a horizontal section extending along the front-back direction. The front end lower left extension portion 3622 extends downward from a left end portion of the front end base portion 3621 and has its extended end portion bent to the right, forming a left-side front end edge portion **3622*a*. The front end lower right extension portion 3623 extends downward from a right end portion of the front end base portion 3621 and has its extended end portion bent to the left, forming a right-side front end edge portion 3623*a***.

The front end lower left extension portion 3622 and the front end lower right extension portion 3623 form a pair to define a front end portion (downstream end portion) of the commodity storage passage **33*a*1 using the gap therebetween. The width of the commodity storage passage is slightly greater than the maximum width of the target commodity (canned beverage commodity: 201**).

The can front end guide portion 362 is sized to be able to enter the front end portion of the can guide substrate 361, and has its predetermined section engaged after entering the front end portion, thereby connecting the left-side front end edge portion **3622*a* to the left-side edge portion, and the right-side front end edge portion 3623*a*** to the right-side edge portion.

The can pusher member 363 is incorporated in the commodity storage passage **33*a*1. The can pusher member 363 is constantly biased forward by a pair of left and right spiral spring members (not shown). These spiral spring members have tip end portions thereof fixed to the front end section of the can guide substrate 361**.

Figure 13:
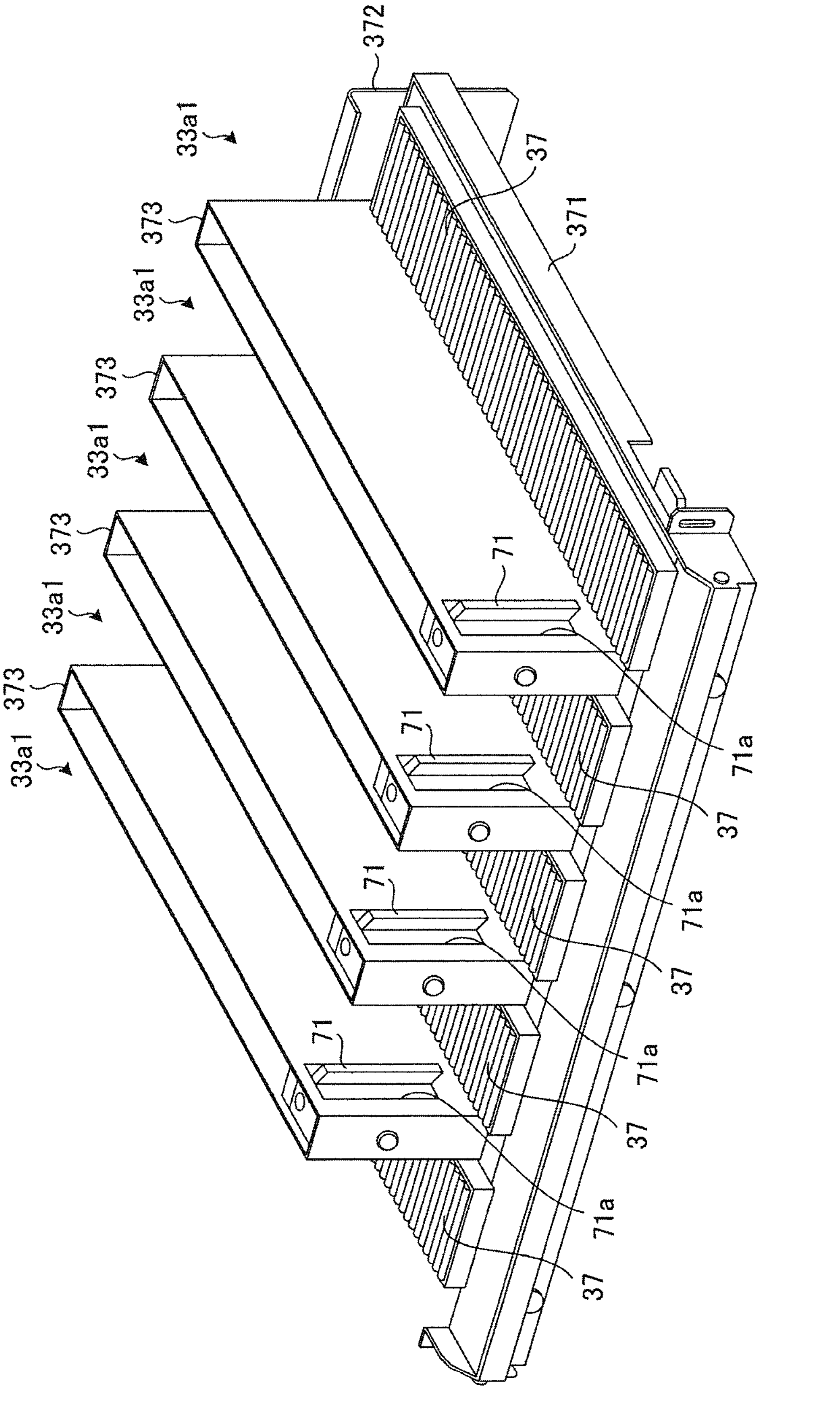
FIG. 13 is a perspective view showing a can stand portion configuring a canned commodity rack.
Figure 14:
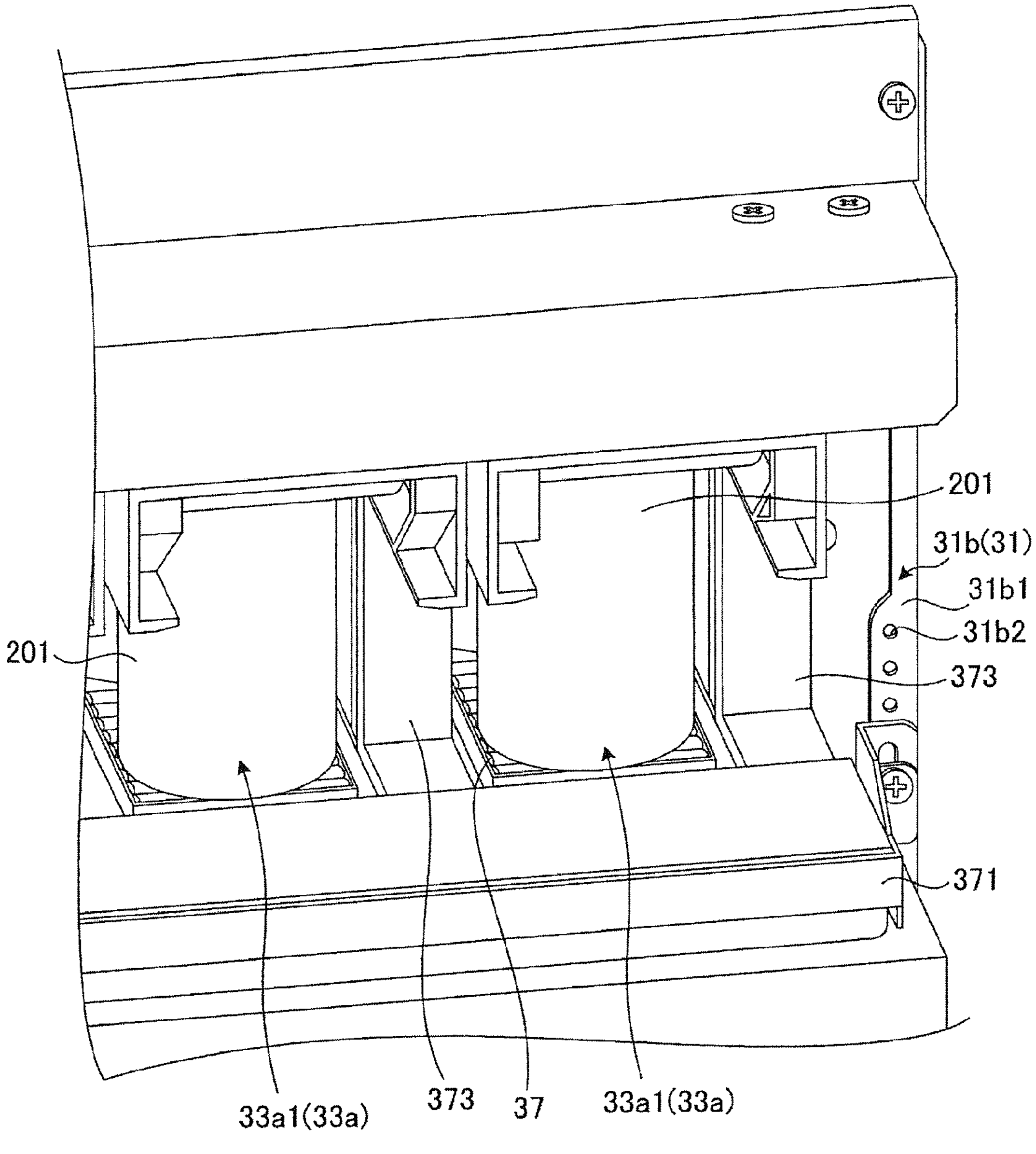
FIG. 14 is a perspective view showing an enlargement of a front end portion of the canned commodity rack.
Figure 15:
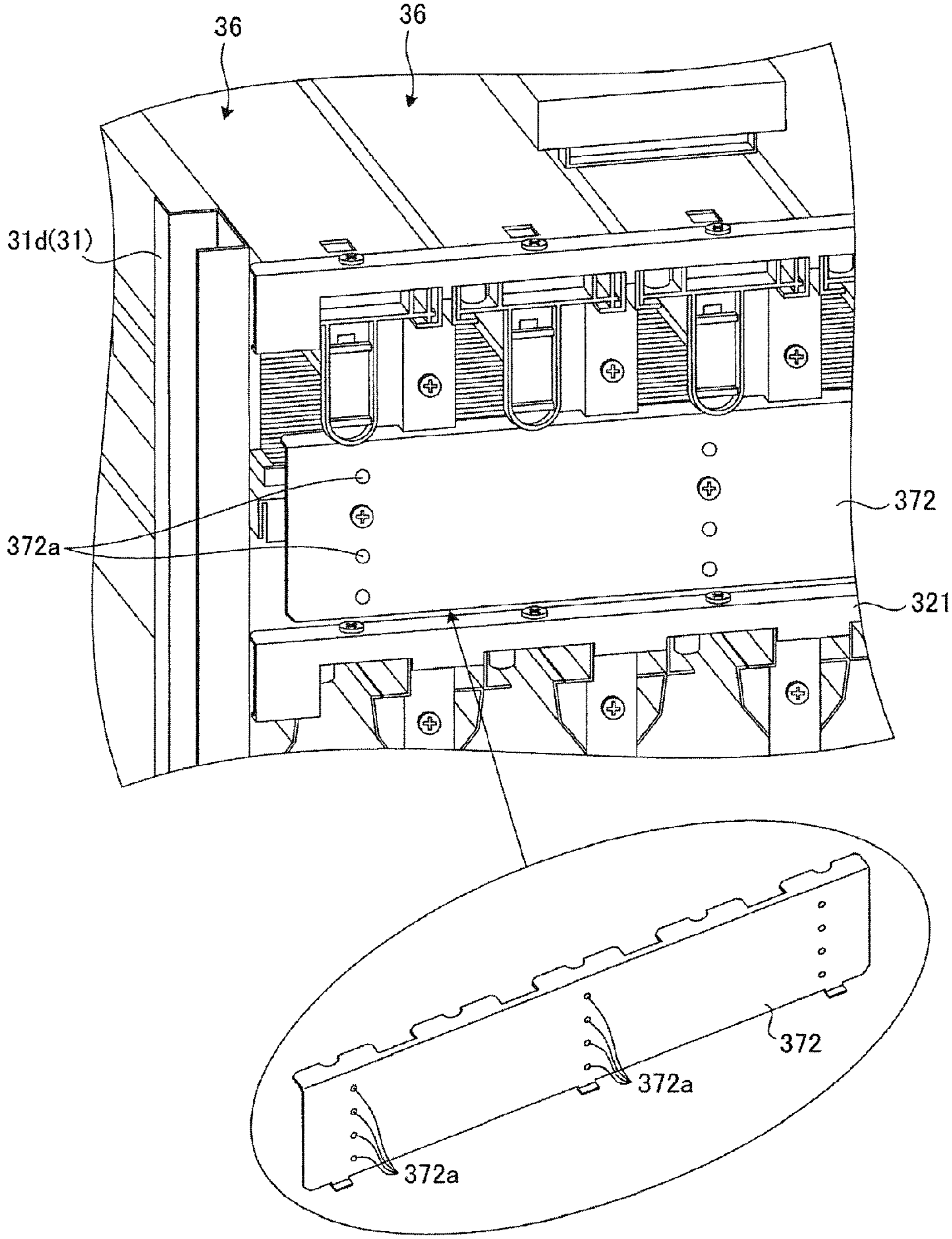
FIG. 15 is a perspective view showing an enlargement of a rear end portion of the canned commodity rack.

The can stand portions 37 are arranged crosswise on an upper surface of a can rack base member 371, as shown in FIG. 13. The can rack base member 371 is a plate-like member formed from a steel plate. As shown in FIGS. 14 and 15, the can rack base member 371 has its left and right end portions on the front end side fastened to the front surfaces **31*a*1, 31*b*1 of the left front rack support side plate 31*a* and the right front rack support side plate 31*b* by the fastening members, and has its rear end portion 35*a* fastened to the rear horizontal member 321 configuring the bottom commodity rack 30 by fastening members, with a rear plate 372 therebetween. The front surfaces 31*a*1, 31*b*1 of the left front rack support side plate 31*a* and the right front rack support side plate 31*b* have a plurality of fastening holes 31*a*2, 31*b*2 formed vertically, while the rear plate 372 has a plurality of fastening holes 372*a*** formed vertically.

Each of the can stand portions 37, the front-back direction of which is the longitudinal direction, configures a bottom portion of the corresponding commodity storage passage **33*a*1, and has a plurality of roller members disposed in a rotatable manner. A can partition plate 373 is provided upright on either side portion of each can stand portion 37. FIG. 13** omits illustration of the can partition plates on the left and right ends.

Each of the can partition plates 373 has its front-back direction configuring the longitudinal direction and extends substantially the same length as the can stand portions 37. The can partition plates 373 configure the side walls of each commodity storage passage **33*a*1, and the length between the adjacent can partition plates 373, or the distance in the crosswise direction between the adjacent can partition plates 373, is slightly greater than the maximum width of the target commodity (canned beverage commodity) 201. In addition, the length of each can partition plate 373** in the vertical direction is slightly longer than total length of the shortest cans so-called "short cans."

Each commodity storage column **33*a* is configured as described above so that the commodities 201 are arranged in the commodity storage passage 33*a*1 in the front-back direction by placing them upright on the can stand portion 37 sequentially from the front in the commodity storage passage 33*a*1. As a result of having the can pusher member 363 constantly biased forward by the spiral spring members, the commodities 201 are pushed forward and stored in the commodity storage passage 33*a*1**.

In the commodity storage column **33*a*, the plurality of fastening holes 31*a*2, 31*b*2 are formed vertically on the front surfaces 31*a*1, 31*b*1 of the left front rack support side plate 31*a* and the right front rack support side plate 31*b*, while the plurality of fastening holes 372*a* are formed vertically on the rear plate 372. Thus, changing the fastening holes 31*a*2, 31*b*2, and 372*a* through which the fastening members pass, can adjust the level of the can stand portion 37. In other words, the commodity storage column 33*a* is configured so as to be able to arbitrarily adjust the distance between the can guide member 36 and the can stand portion 37**.

Each commodity storage column **33*a* is also provided with the extraction detection sensor 5. The extraction detection sensor 5 is provided at the foremost part of the corresponding commodity storage passage 33*a*1. This extraction detection sensor 5 is sort of, for example, an optical sensor that detects the passage of a commodity through a predetermined monitoring region and transmits a detection signal, which is the result of the detection, to the control means 100**.

A commodity rack 30 for storing bottled beverage commodities 202 (also referred to as "bottled commodity rack **30*b***" hereinafter) is described next.

The bottled commodity rack **30*b* is configured by arranging a plurality of commodity storage columns 33*b* (five, in the illustrated example) in the crosswise direction. Each of these commodity storage columns 33*b* has a bottle guide member 38 and a bottle stand portion 39**.

The bottle guide member 38 extends in the front-back direction and is configured by a bottle guide substrate 381, a bottle front end guide portion 382, and a can pusher member 383, as shown in FIG. 12.

The bottle guide substrate 381 is formed by appropriately bending a steel plate into a long object whose front-back direction is the longitudinal direction. When viewed from the front, the bottle guide substrate 381 is in an inverted U-shape with a base portion 3811, a lower left extension portion 3812, and a lower right extension portion 3813 integrated with each other.

The base portion 3811 is a horizontal section extending along the front-back direction. This base portion 3811 has its rear end portion supported by the rear horizontal member 321 and its front end portion by the slide base member 322.

Figure 58:
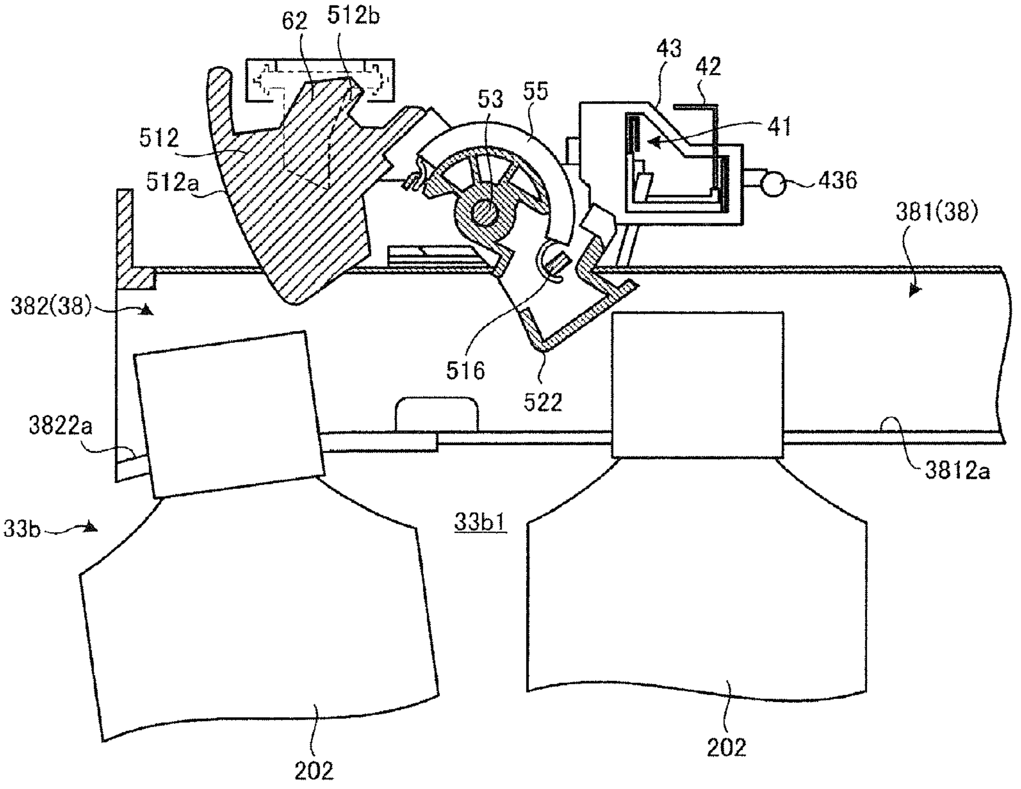
FIG. 58 is a longitudinal cross-sectional view of a commodity storage column configuring the bottled commodity rack, viewed from the right side.

The lower left extension portion 3812 extends downward from a left end portion of the base portion 3811 and has its extended end portion bent to the right, forming a left-side edge portion 3812*a* (see FIG. 58). Therefore, when viewed from the front, the lower left extension portion 3812 is in an L-shape. The lower right extension portion 3813 extends downward from a right end portion of the base portion 3811 and has its extended end portion bent to the left, forming a right-side edge portion (not shown). Therefore, when viewed from the front, the lower right extension portion 3813 is in an inverted L-shape.

The lower left extension portion 3812 and the lower right extension portion 3813 form a pair to define an upper part of each commodity storage passage 33*b*1 using the gap therebetween. The width of the commodity storage passage (the minimum width between the left-side edge portion 3812*a* and the right-side edge portion) is slightly greater than the cap mount portion 2021 with the cap 202*a* of a target commodity (bottled beverage commodity) 202 mounted thereon.

The bottle front end guide portion 382 is made of resin. As with the bottle guide substrate 381, when viewed from the front, the bottle front end guide portion 382 is in an inverted U-shape with a front end base portion 3821, a front end lower left extension portion 3822, and a front end lower right extension portion 3823 integrated with each other.

The front end base portion 3821 is a horizontal section extending along the front-back direction. The front end lower left extension portion 3822 extends downward from a left end portion of the front end base portion 3821 and has its extended end portion bent to the right, forming a left-side front end edge portion 3822*a*. The front end lower right extension portion 3823 extends downward from a right end portion of the front end base portion 3821 and has its extended end portion bent to the left, forming a right-side front end edge portion 3823*a*.

The front end lower left extension portion 3822 and the front end lower right extension portion 3823 form a pair to define a front end portion (downstream end portion) of the commodity storage passage 33*b*1 using the gap therebetween. The width of the commodity storage passage is slightly greater than the cap mount portion 2021 with the cap 202*a* of the target commodity (bottled beverage commodity) 202 mounted thereon.

This bottle front end guide portion 382 is sized to be able to enter the front end portion of the bottle guide substrate 381, and has its predetermined section engaged after entering the front end portion, thereby connecting the left-side front end edge portion 3822*a* to the left-side edge portion 3812*a*, and the right-side front end edge portion 3823*a* to the right-side edge portion.

The bottle pusher member 383 is incorporated in the commodity storage passage 33*b*1. The bottle pusher member 383 is constantly biased forward by a pair of left and right spiral spring members (not shown). These spiral spring members have tip end portions thereof fixed to the front end section of the bottle guide substrate 381.

The bottle pusher member 383 is mounted with an attachment member 383*a*, as shown in FIG. 12. The attachment member 383*a* is provided detachably to the bottle pusher member 383 to increase the area pressed by the bottle pusher member 383.

Figure 16:
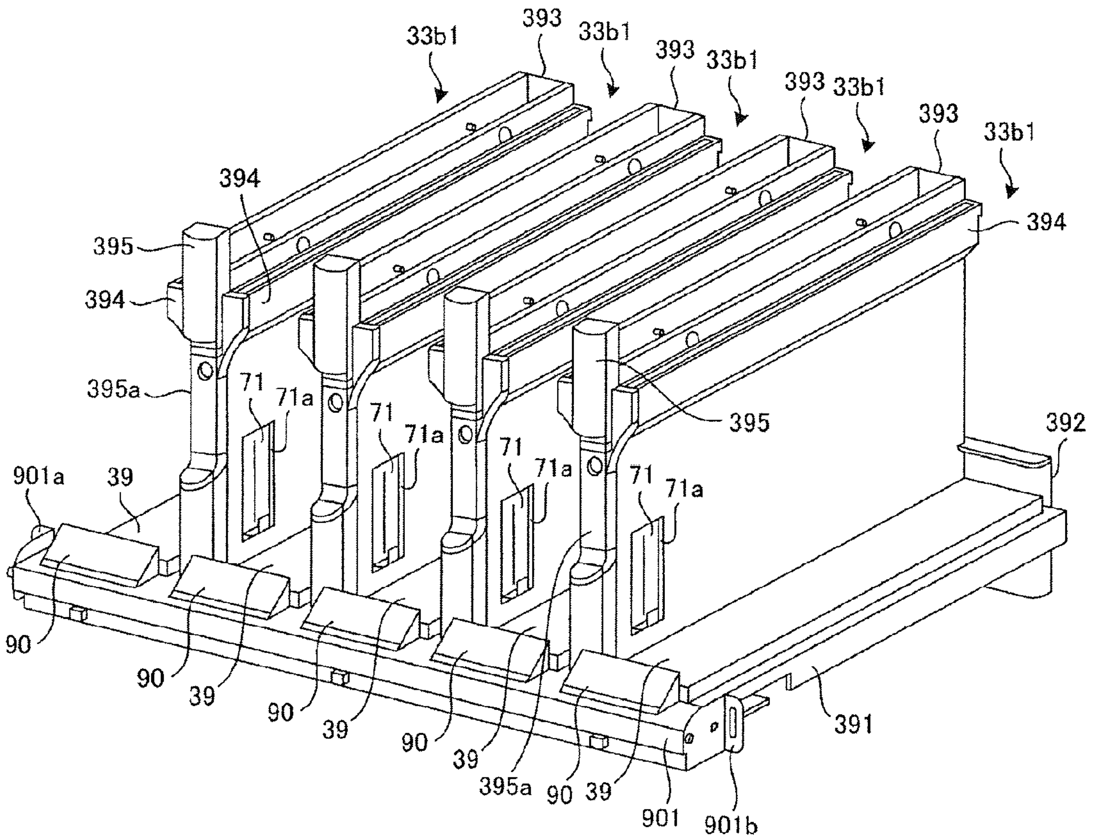
FIG. 16 is a perspective view showing a bottle base portion configuring a bottled commodity rack.

The bottle stand portions 39 are arranged crosswise on an upper surface of a bottle rack base member 391, as shown in FIG. 16. The bottle rack base member 391 is a plate-like member formed from a steel plate. The bottle rack base member 391 has its front end side fastened to the front surfaces 31*a*1, 31*b*1 of the left front rack support side plate 31*a* and the right front rack support side plate 31*b*, with a stopper base member 901 therebetween, and has its rear end portion 35*a* fastened to the rear horizontal member 321 supporting the bottom commodity rack 30 (the plastic-bottled commodity rack 30*c*) by fastening members, with a rear plate 392 therebetween.

Each of the bottle stand portion 39, the front-back direction of which is the longitudinal direction, configures a bottom portion of the corresponding commodity storage passage 33*b*1, and has a plurality of roller members, not shown, which are disposed in a rotatable manner. A bottle partition plate 393 is provided upright on either side portion of each bottle stand portion 39. FIG. 16 omits illustration of the bottle partition plates on the left and right ends.

Each of the bottle partition plates 393 has its front-back direction configuring the longitudinal direction and extends substantially the same length as the bottle stand portions 39. The bottle partition plates 393 configure the side walls of each commodity storage passage 33*b*1, and the length between the adjacent bottle partition plates 393, or the distance in the crosswise direction between the adjacent bottle partition plates 393, is slightly greater than the maximum width of the body portion 2022 of the target commodity (bottled beverage commodity) 202.

In addition, each bottle partition plate 393 is provided with an inclination place 394 and a cover member 395. The inclination plate 394 protrudes to the corresponding commodity storage passage 33*b*1 and extends in the front-back direction at a side surface upper part of the bottle partition plate 393 that faces the commodity stage passage 33*b*1. This inclination plate 394 is configured to reduce the distance to the target commodity (the bottled beverage commodity) 202 stored in the commodity storage passage 33*b*1. The length between the inclination plates 394 of the adjacent bottle partition plates 393 is slightly greater than the width of the bulging portion 2023 of the target commodity (bottled beverage commodity).

The cover member 395 is mounted on a front end surface of the corresponding bottle partition plate 393. The center of the cover member 395 that corresponds to an upper part of the body portion 2022 of the target commodity (bottled beverage commodity) 202 stored in the commodity storage passage 33*b*1 has a depressed portion 395*a*.

Each commodity storage column 33*b* is configured as described above so that the commodities 202 are arranged in the commodity storage passage 33*b*1 in the front-back direction by placing them upright on the bottle stand portion 39 sequentially from the front in the commodity storage passage 33*b*1. As a result of having the bottle pusher member 383 constantly biased forward by the spiral spring members, the commodities are pushed forward and stored in the commodity storage passage 33*b*1.

Each commodity storage column 33*b* is also provided with the extraction detection sensor 5. The extraction detection sensor 5 is provided at the foremost part of the corresponding commodity storage passage 33*b*1. This extraction detection sensor 5 is sort of, for example, an optical sensor that detects the passage of a commodity through a predetermined monitoring region and transmits a detection signal, which is the result of the detection, to the control means 100.

The stopper base member 901 located on the front end side of the bottle rack base member 391 is formed from a steel plate and provided with a stopper member 90 corresponding to each commodity storage column 33*b*. The stopper members 90 are made of resin, for example, and are provided at the front end portions (downstream-side end portions) of the commodity storage passages 33*b*1 in the respective commodity storage columns 33*b*, which are front sections (downstream-side sections) in front of the foremost commodities (the most downstream commodities).

Figure 17:
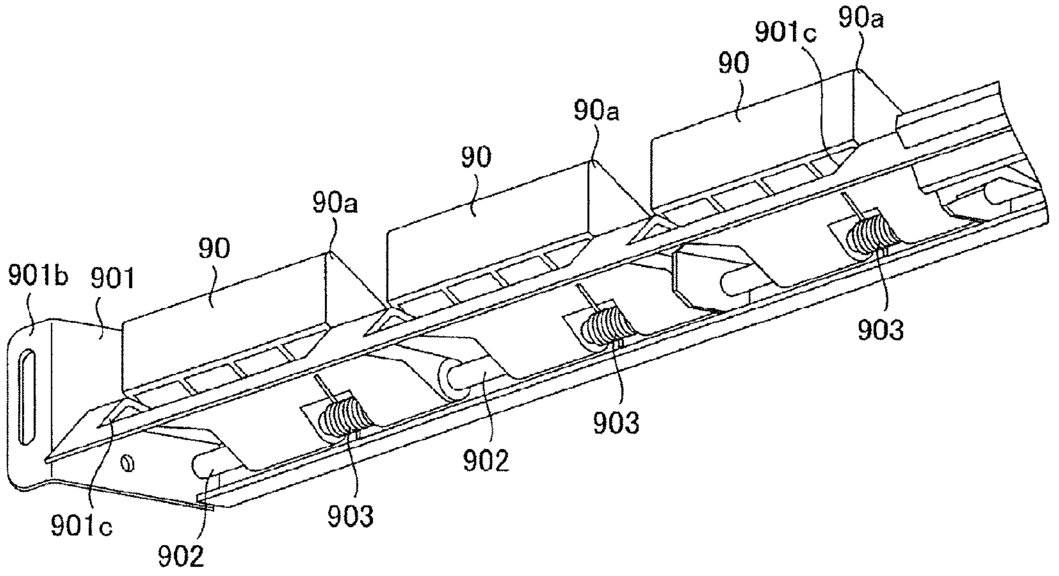
FIG. 17 is a perspective view showing the configuration of a stopper member shown in FIGS. 3 and 4.

As shown in FIG. 17, each stopper member 90 is supported turnably by the stopper base member 901. The stopper base member 901 is a long object whose crosswise direction is the longitudinal direction, wherein left and right end portions 901*a*, 901*b* are mounted onto the front surfaces 31*a*1, 31*b*1 of the left front rack support side plate 31*a* and the right front rack support side plate 31*b* by fastening members. A rod-like stopper shaft portion 902 extends in the crosswise direction across the stopper base member 901, and is inserted through the stopper members 90. The stopper members 90 are capable of turning about the central axis of the stopper shaft portion 902, and are biased by stopper spring members 903 respectively so that rear end portions 90*a* of the stopper members 90, in the normal state, enter the respectively commodity storage passages 33*b*1 through stopper openings 901*c* of the stopper base member 901. When each stopper member 90 is biased by the corresponding stopper spring member 903 and consequently the rear end portion 90*a* thereof enters the corresponding commodity storage passage 33*b*1, an upper surface of the stopper member 90 forms an inclination surface that is inclined gradually downward toward the front, as shown in FIG. 16.

Figure 18:
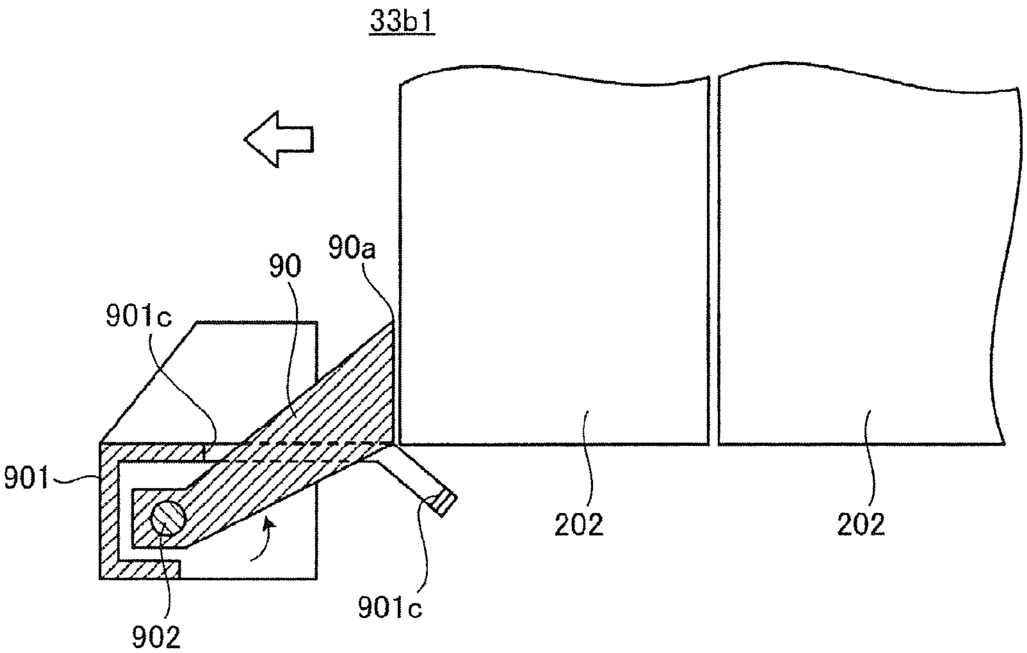
FIG. 18 is a cross-sectional side view for explaining the operations of the stopper member.
Figure 19:
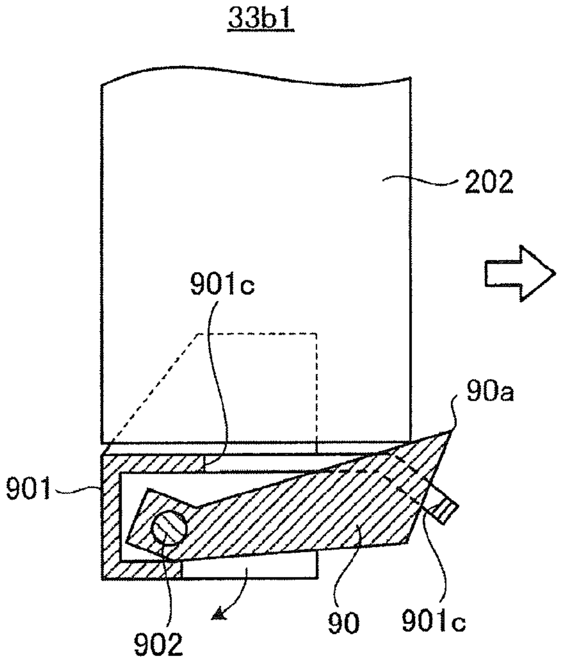
FIG. 19 is a cross-sectional side view for explaining the operations of the stopper member.

In a state in which the rear end portion 90*a* of each stopper member 90 is in the commodity storage passage 33*b*1 as shown in FIG. 18, the stopper member 90 restricts the forward extraction of the upright foremost commodity 202. When pushed by the commodity entering from the front, the stopper member 90 turns downward about the central axis of the stopper shaft portion 902 against the biasing force of the stopper spring member 903, allowing the rear end portion 90*a* to retreat from the commodity storage passage 33*b*1, as shown in FIG. 19. This allows the commodity 202 to enter the commodity storage passage 33*b*1.

Figure 20:
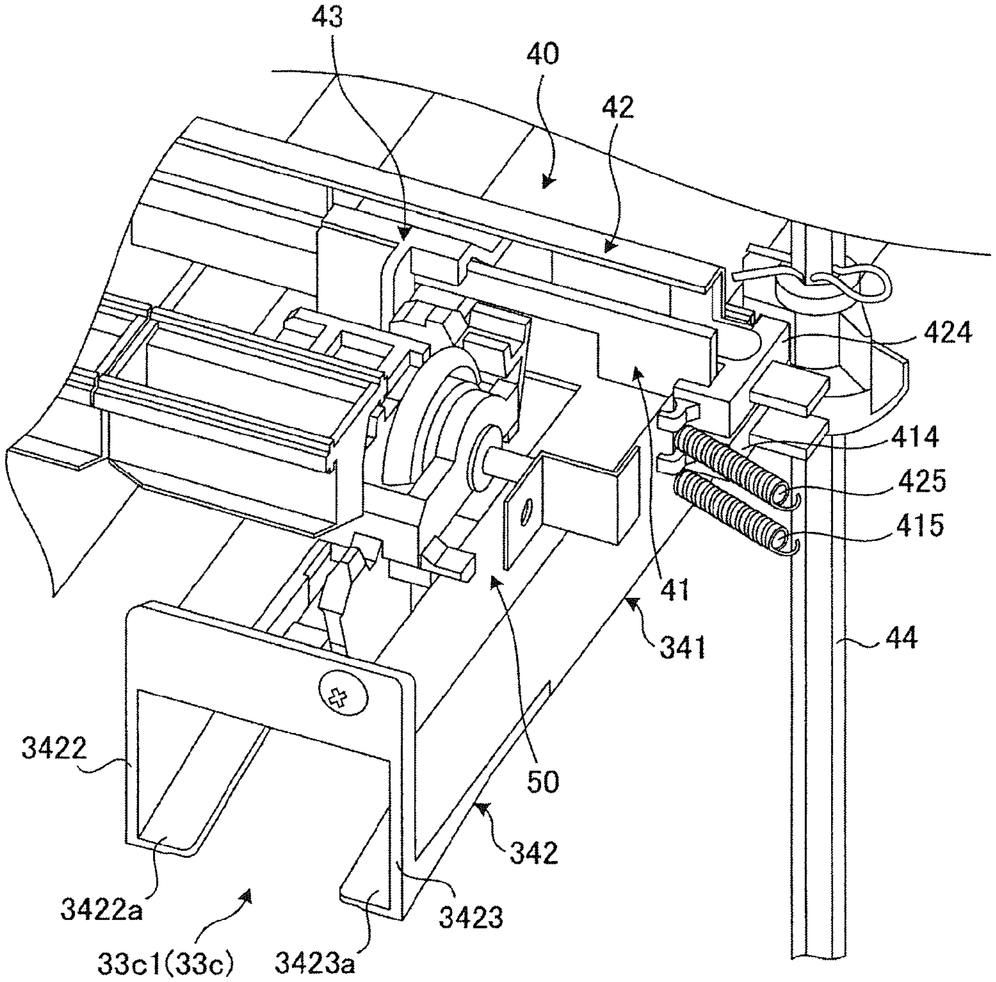
FIG. 20 is a perspective view showing an enlargement of the substantial portions of a circumferential structure of a third commodity rack from the top shown in FIGS. 3 and 4, with some of the components omitted.

FIG. 20 is a perspective view showing an enlargement of the substantial portions of a circumferential structure of a third commodity rack 30 from the top (plastic-bottled commodity rack 30*c*) shown in FIGS. 3 and 4, with some of the components omitted. As shown in FIG. 20 as well, the rack selection mechanism 40 is configured by a first slide plate 41, a second slide plate 42, a lock member 43, and a support rod 44. The circumferential structure of the plastic-bottled commodity rack 30*c* is illustrated here, but the rack selection mechanism 40 has the same configuration throughout the commodity racks 30.

Figure 21:
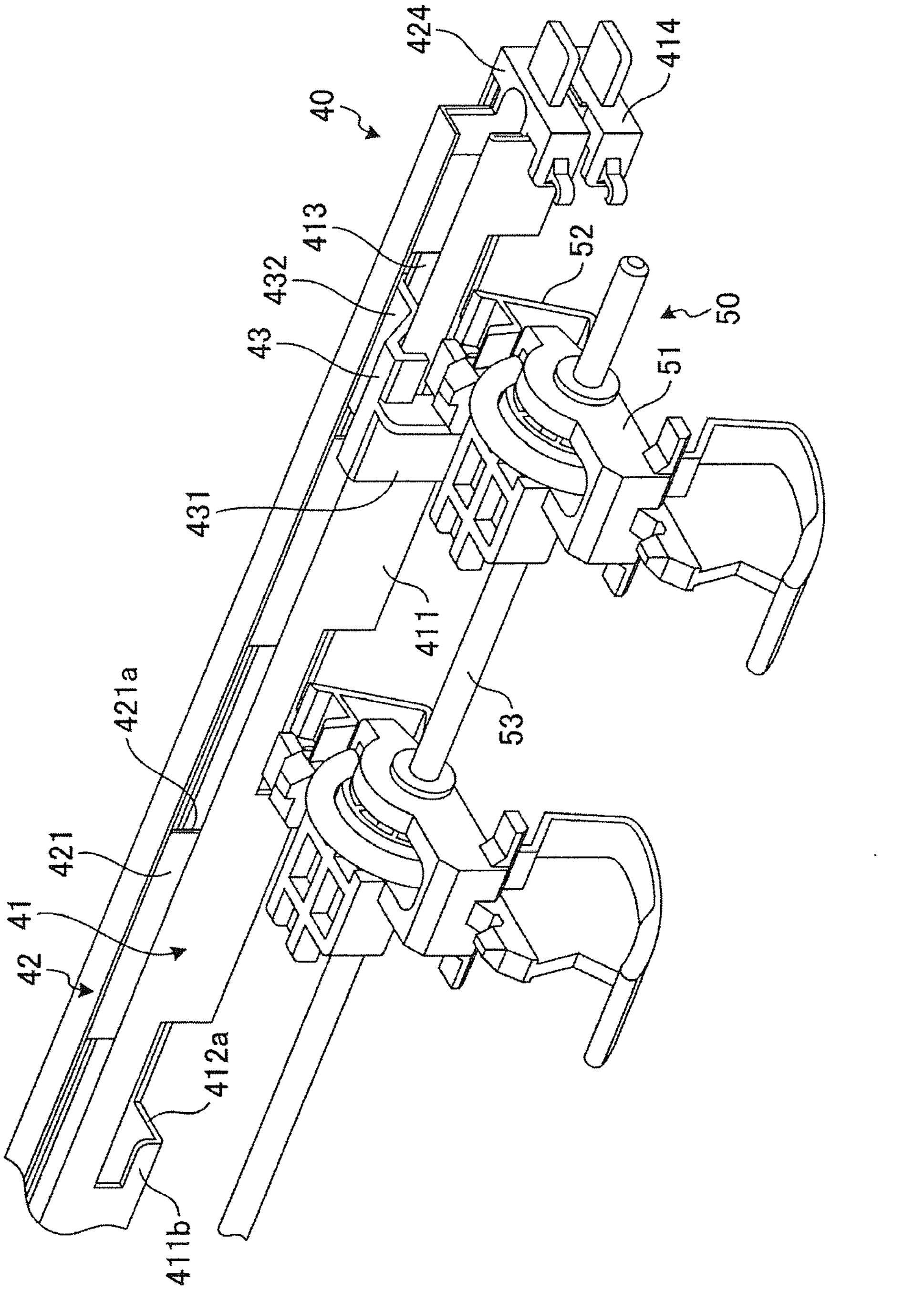
FIG. 21 is a perspective view showing a first slide plate and a second slide plate that configure a rack selection mechanism.
Figure 22:
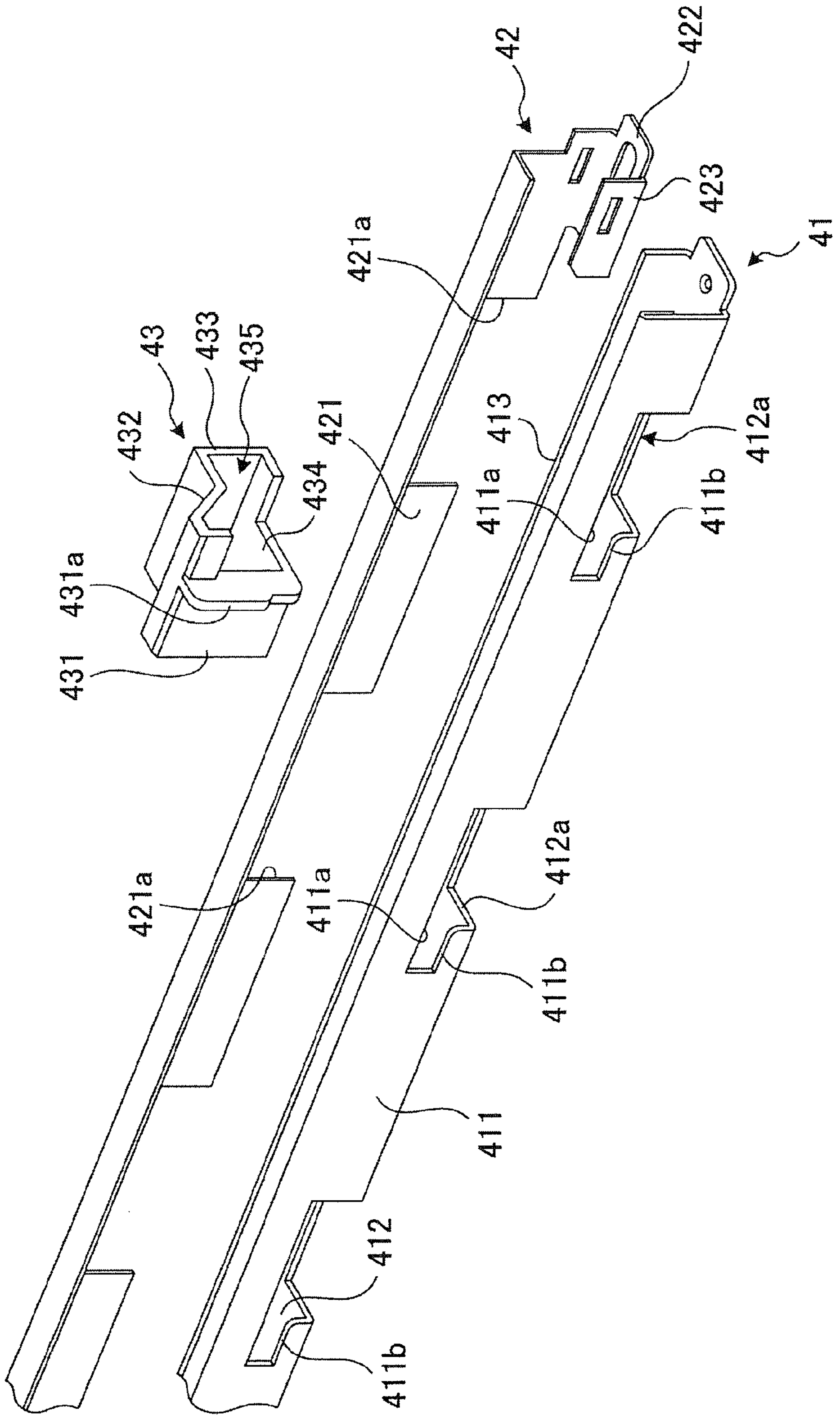
FIG. 22 is an exploded perspective view of the first slide plate and the second slide plate shown in FIG. 21.

FIG. 21 is a perspective view showing the first slide plate and the second slide plate that configure the rack selection mechanism. FIG. 22 is an exploded perspective view of the first slide plate and the second slide plate shown in FIG. 21.

As shown in FIGS. 21 and 22, the first slide plate 41 is provided in such a manner as to extend along the crosswise direction through the front-side upper regions of the commodity storage columns 33*a*, 33*b*, 33*c* (collectively referred to as "commodity storage columns 33," hereinafter) of each commodity rack 30. The first slide plate 41 has a first slide substrate 411 extending along the vertical direction, a first slide bottom portion 412 extending in such a manner as to curve rearward from a lower end of the first slide substrate 411, and a first slide upper extension portion 413 extending in such a manner as to curve upward from a rear end of the first slide bottom portion 412.

A plurality of cutout portions 412*a* that are connected to cutout portions 411*a* of the first slide substrate 411 are formed in the first slide bottom portion 412. The number of cutout portions 412*a* formed in the first slide bottom portion 412 is five, matching the number of commodity storage columns 33 configuring the corresponding commodity rack 30. The first slide substrate 411 is provided with restricting pieces 411*b* that configure left-side lower extension portions of the cutout portions 411*a*.

The first slide plate 41 is provided with a first slide abutting portion 414 at is right end, wherein the first slide abutting portion 414 is coupled to the slide base member 322 by a first slide spring member 415. Due to this configuration, the first slide plate 41 is constantly biased to the right by the first slide spring member 415 so as to be placed at a reference position during the normal state.

The second slide plate 42 is provided in such a manner as to extend along the crosswise direction through the front-side upper regions of the commodity storage columns 33 of the corresponding commodity rack 30. The second slide plate 42 has a second slide substrate 421 extending along the vertical direction, second slide bottom portions 422 extending in such a manner as to curve forward from lower ends of the left and right ends of the second slide substrate 421, and a second slide upper extension portion 423 extending in such a manner as to curve upward from a front end of each second slide bottom portion 422.

The second slide plate 42 is provided behind the first slide substrate 411 of the first slide plate 41 in such a manner as to be parallel to the first slide plate 41. In other words, the second slide plate 42 is provided in such a manner that the second slide bottom portions 422 thereof are placed in an upper region of the first slide bottom portion 412 between the first slide substrate 411 and the first slide upper extension portion 413. The second slide substrate 421 of the second slide plate 42 is provided with a plurality of (e.g., five) insertion portions 421*a*, the number of which matches that number of cutout portions 412*a*.

The second slide plate 42 is provided with a second slide abutting portion 424 at its right end, wherein the second slide abutting portion 424 is coupled to the slide base member 322 by a second slide spring member 425. Due to this configuration, the second slide plate 42 is constantly biased to the right by the second slide spring member 425 so as to be placed at a reference position during the normal state.

The lock member 43 is made of, for example, resin, and has a hollow portion 435 formed by a front end portion 431, an upper portion 432, a rear end portion 433, and a lower portion 434 connected together. The front end portion 431 of the lock member 43 is provided with a protruding piece 431*a* protruding forward. As shown in FIG. 21, this lock member 43 has its upper portion 432 inserted through each insertion portion 421*a* of the second slide plate 42 and has the first slide plate 41 passing through its hollow portion 435. In other words, the front end portion 431 of the lock member 43 is located in front of the first slide substrate 411 of the first slide plate 41, and the rear end portion 433 of the lock member 43 is located behind the first slide upper extension portion 413 of the first slide plate 41. The lower portion 434 of the lock member 43 is located under the first slide bottom portion 412 of the first slide plate 41.

The lock member 43 has its rear end portion 433 coupled to a rear surface of the first slide upper extension portion 413 of the first slide plate 41 by a lock spring member 436 (see FIG. 32) and is biased to the right by this lock spring member 436.

Figure 23:
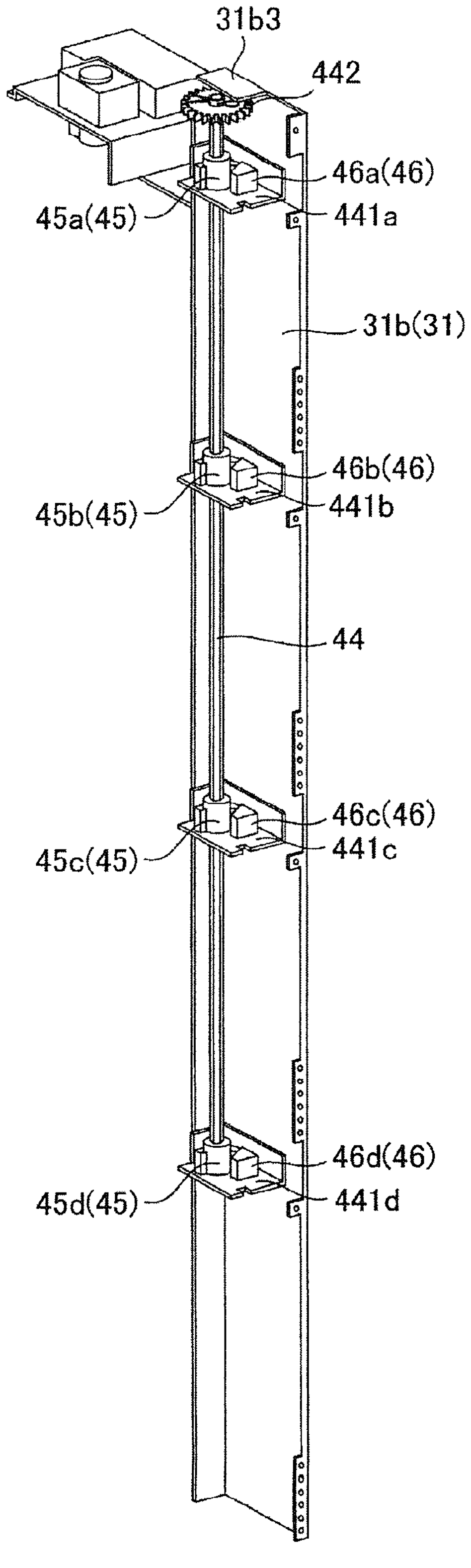
FIG. 23 is a perspective view showing the configuration of a right front rack support side plate.

The support rod 44 is a rod like object in the shape of, for example, a hexagonal cylinder, and is provided in the right front rack support side plate 31*b* in such a manner as to be able to rotate about its own central axis as shown in FIG. 23. More specifically, the support rod 44 has its upper end portion supported by an upper end piece 31*b*3 of the right front rack support side plate 31*b*, has its lower end portion supported by a cam base member 441*d* provided at the same level as the bottom commodity rack 30 (30*c*), and is capable of rotating about its own central axis.

The upper end portion of the support rod 44 is provided with a coupling gear 442. The coupling gear 442 is engaged with an output gear of a motor M (not shown) via a coupling gear 443 (see FIG. 12). The motor M here is a driving source driven in response to a drive command from the control means 100, and rotates the output gear in the clockwise direction, the output gear being viewed from above. Consequently, when viewed from above, the coupling gear 442 engaged with the output gear by the coupling gear 443 is also rotated in the clockwise direction, causing the support rod 44 to rotate clockwise about its central axis.

A plurality of (e.g., four) switching cam members 45 are mounted on the support rod 44. The switching cam members 45 configure a cam mechanism together with auxiliary cam members 46 which are described hereinafter. Hexagonal through-holes 451 provided in the switching cam members 45 have the support rod 44 passing therethrough and are disposed at the same levels as the respective commodity racks 30. The switching cam members 45 rotate integrally with the support rod 44. With the support rod 44 passing through the through-holes 451, the switching cam members 45 can be displaced along the direction in which the support rod 44 extends (the vertical direction), in accordance with the levels of the respective commodity racks 30. In other words, the switching cam members 45 can be positioned depending on the levels of the respective commodity racks 30.

Figure 24:
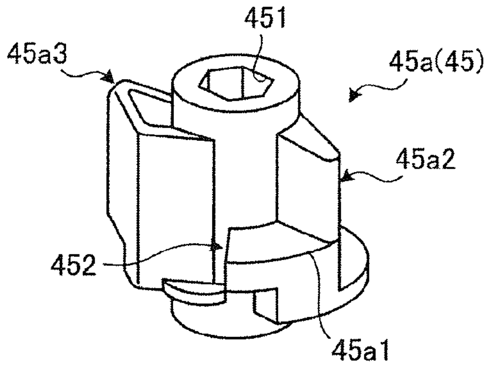
FIG. 24 is a perspective view showing switching cam members mounted on a support rod shown in FIG. 23, wherein (*a*) shows the switching cam member corresponding to the top commodity rack, (*b*) the switching cam member corresponding to the second commodity rack from the top, (*c*) the switching cam member corresponding to the third commodity rack from the top, and (*d*) the switching cam member corresponding to the bottom commodity rack.
Figure 24:
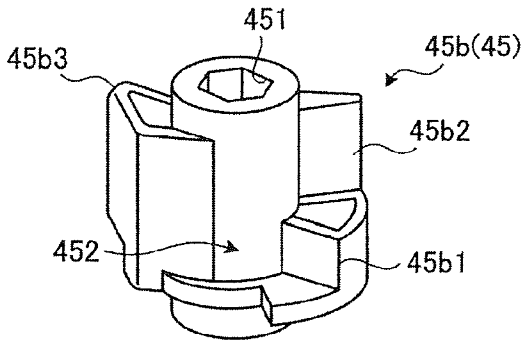
Figure 24:
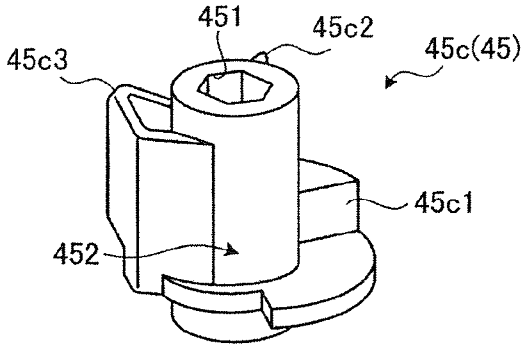
Figure 24:
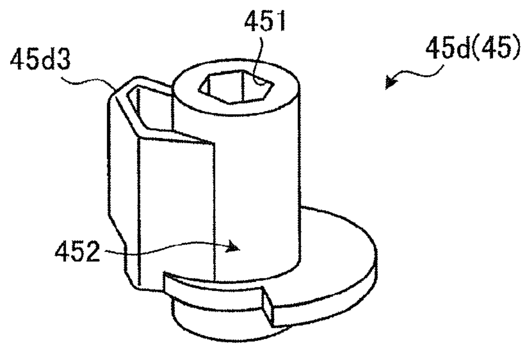

FIG. 24 is a perspective view showing the switching cam members mounted on the support rod shown in FIG. 23, wherein (a) shows the switching cam member 45 corresponding to the top commodity rack 30 (the canned commodity rack 30*a*) (also referred to as "first switching cam member 45*a*" hereinafter), (b) the switching cam member 45 corresponding to the second commodity rack 30 from the top (the bottled commodity rack 30*b*) (also referred to as "second switching cam member 45*b*" hereinafter), (c) the switching cam member 45 corresponding to the third commodity rack 30 from the top (the plastic-bottled commodity rack 30*c*) (also referred to as "third switching cam member 45*c*" hereinafter), and (d) the switching cam member 45 corresponding to the bottom commodity rack 30 (the plastic-bottled commodity rack 30*c*) (also referred to as "fourth switching cam member 45*d*" hereinafter).

As shown in FIG. 24, standby sections 452, which are reference positions, are formed in the switching cam members 45 respectively. Also the switching cam members 45 are provided with first projecting pieces 45*a*1, 45*b*1, 45*c*1, 45*d*1, second projecting pieces 45*a*2, 45*b*2, 45*c*2, and third projecting pieces 45*a*3, 45*b*3, 45*c*3, 45*d*3. The first projecting pieces 45*a*1, 45*b*1, 45*c*1, 45*d*1, provided on the lower side of the outer circumferential surfaces of the respective switching cam members 45 in such a manner as to protrude in a radial direction, configure selling sections. These first projecting pieces 45*a*1, 45*b*1, 45*c*1, 45*d*1 are positioned 60 degrees apart, for example, in the clockwise direction around the central axis of the switching cam members 45 (the central axis of the support rod 44). The second projecting pieces 45*a*2, 45*b*2, 45*c*2 are formed in such a manner as to extend upward from the end portions of the first projecting pieces 45*a*1, 45*b*1, 45*c*1. The third projecting pieces 45*a*3, 45*b*3, 45*c*3 of the switching cam members 45 except for the fourth switching cam member 45*d* are provided in such a manner as to be spaced a predetermined angle apart from the second projecting pieces 45*a*2, 45*b*2, 45*c*2 in the counterclockwise direction around the central axis (the central axis of the support rod 44), and extend in the vertical direction. The third projecting piece 45*d*3 of the fourth switching cam member 45*d* is formed in such a manner as to extend upward from the end portion of the first projecting piece 45*d*1. In other words, the second projecting piece is not formed in the fourth switching cam member 45*d* because the third projecting piece 45*d*3 is configured as the second projecting piece as well. These third projecting pieces 45*a*3, 45*b*3, 45*c*3 configure auxiliary sections.

The switching cam members 45 mounted on the support rod 44 are configured, with their first projecting pieces 45*a*1, 45*b*1, 45*c*1, 45*d*1 disposed a predetermined angle apart around the central axis of the support rod 44, while the standby sections 452 and the third projecting pieces 45*a*3, 45*b*3, 45*c*3, 45*d*3 are provided in line with each other in the vertical direction.

An example of installing the first projecting pieces 45*a*1, 45*b*1, 45*c*1, 45*d*1 and the third projecting pieces 45*a*3, 45*b*3, 45*c*3, 45*d*3 of the respective switching cam members 45 is now described. Needless to say, this is merely one example, to which the present invention should not be limited.

In the second switching cam member 45*b*, the first projecting piece 45*b*1 is shifted 60 degrees counterclockwise in relation to the first projecting piece 45*a*1 and the second projecting piece 45*a*2 of the first switching cam member 45*a* with reference to the central axis of the support rod 44.

In the third switching cam member 45*c*, the first projecting piece 45*c*1 is shifted 60 degrees counterclockwise in relation to the first projecting piece 45*b*1 of the second switching cam member 45*b* with reference to the central axis of the support rod 44.

In the fourth switching cam member 45*d*, the first projecting piece 45*d*1 is shifted 60 degrees counterclockwise in relation to the first projecting piece 45*c*1 of the third switching cam member 45*c* with reference to the central axis of the support rod 44.

The third projecting piece 45*a*3 of the first switching cam member 45*a* is shifted 240 degrees counterclockwise from the first projecting piece 45*a*1 of the first switching cam member 45*a* with reference to the central axis of the support rod 44. The third projecting piece 45*b*3 of the second switching cam member 45*b* is shifted 180 degrees counterclockwise from the first projecting piece 45*b*1 of the second switching cam member 45*b* with reference to the central axis of the support rod 44. The third projecting piece 45*c*3 of the third switching cam member 45*c* is shifted 120 degrees counterclockwise from the first projecting piece 45*c*1 of the third switching cam member 45*c* with reference to the central axis of the support rod 44. The third projecting piece 45*d*3 of the fourth switching cam member 45*d* is shifted 60 degrees counterclockwise from the first projecting piece **45*d*1 of the fourth switching cam member 45*d* with reference to the central axis of the support rod 44**.

One of the side surfaces of the support rod 44 in the shape of a hexagonal cylindrical rod-like body corresponds to the standby sections 452 of the plurality of switching cam members 45, whereas another side surface of the support rod 44 corresponds to the third projecting pieces **45*a*3, 45*b*3, 45*c*3, 45*d*3 of the plurality of switching cam members 45. The rest of the side surfaces of the support rod 44 correspond individually to the first projecting pieces 45*a*1, 45*b*1, 45*c*1, 45*d*1 of the switching cam members 45**.

According to such a configuration, because the positions of the projecting pieces correspond to the respective side surfaces of the support rod 44, these positions can be disposed 60 degrees apart evenly when the support rod 44 is rotated 360 degrees.

The auxiliary cam members 46 are provided in the vicinity of the respective switching cam members 45. The auxiliary cam member 46 provided in the vicinity of the first switching cam member **45*a* (also referred to as "first auxiliary cam member 46*a*" hereinafter) is supported by a cam base member 441*a* located at the level of the top commodity rack 30 (the canned commodity rack 30*a*) by having the support rod 44 passing through its own through-hole (not shown). This cam base member 441*a* is formed by appropriately bending a steel plate and mounted on the right front rack support side plate 31*b*** by means of a screw and the like.

The auxiliary cam member 46 provided in the vicinity of the second switching cam member **45*b* (also referred to as "second auxiliary cam member 46*b*" hereinafter) is supported by a cam base member 441*b* located at the level of the second commodity rack 30 from the top (the bottled commodity rack 30*b*) by having the support rod 44 passing through its own through-hole (not shown). This cam base member 441*b* is formed by appropriately bending a steel plate and mounted on the right front rack support side plate 31*b*** by means of a screw and the like.

The auxiliary cam member 46 provided in the vicinity of the third switching cam member **45*c* (also referred to as "third auxiliary cam member 46*c*" hereinafter) is supported by a cam base member 441*c* located at the level of the third commodity rack 30 from the top (the plastic-bottled commodity rack 30*c*) by having the support rod 44 passing through its own through-hole (not shown). This cam base member 441*c* is formed by appropriately bending a steel plate and mounted on the right front rack support side plate 31*b*** by means of a screw and the like.

The auxiliary cam member 46 provided in the vicinity of the fourth switching cam member **45*d* (also referred to as "fourth auxiliary cam member 46*d*" hereinafter) is supported by the cam base member 441*d* that supports the lower end portion of the support rod 44 as described above. This cam base member 441*d* is formed by appropriately bending a steel plate and mounted on the right front rack support side plate 31*b* by means of a screw and the like so as to be at the level of the bottom commodity rack 30 (the plastic-bottled commodity rack 30*c***) as described above.

Figure 25:
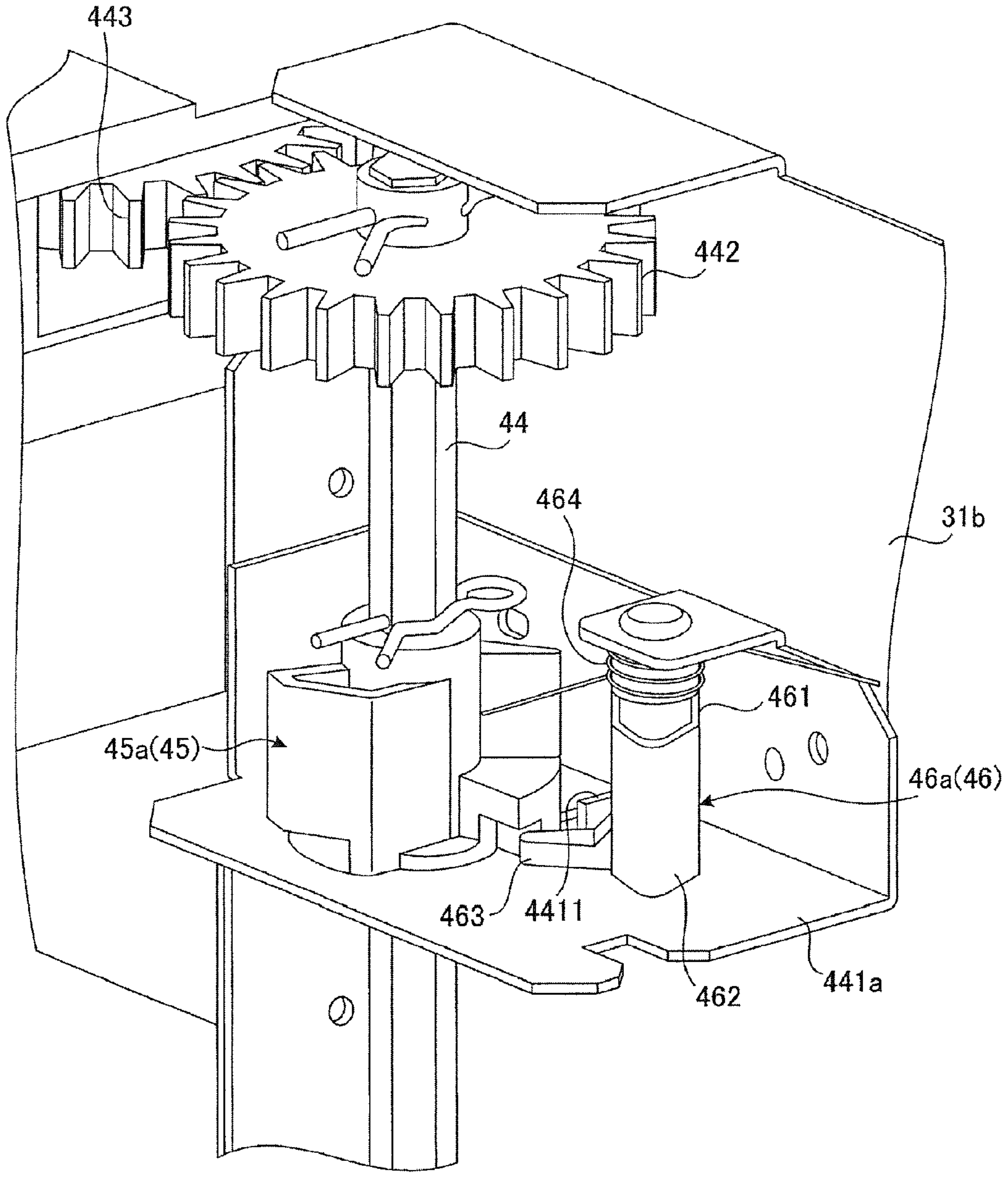
FIG. 25 is a perspective view showing a first auxiliary cam member.

FIG. 25 is a perspective view of the first auxiliary cam member **46*a*. The first auxiliary cam member 46*a* is now described with reference to FIG. 25. Note that the second auxiliary cam member 46*b*, the third auxiliary cam member 46*c*, and the fourth auxiliary cam member 46*d* have the same configuration as the first auxiliary cam member 46*a***; thus, detailed descriptions thereof will be omitted accordingly.

The first auxiliary cam member **46*a* has its base end section 461 rotatably supported by the cam base member 441*a*. The first auxiliary cam member 46*a* is provided with a tongue piece 463. Between the first auxiliary cam member 46*a* and the cam base member 441*a* is interposed an auxiliary cam spring member 464. Therefore, in its free state, the first auxiliary cam member 46*a* has its tip end section 462 facing to the left (engagement posture) by being biased by the auxiliary cam spring member 464 and consequently having the tongue piece 463 abutting with a stopping piece 4411 provided on an upper surface of the cam base member 441*a*. In FIG. 25, as a result of bringing the tongue piece 463 into abutment with the first switching cam member 45*a*, the tip end section 462 of the first auxiliary cam member 46*a* faces slightly forward against the biasing force of the auxiliary cam spring member 464**.

The rotation angle positions of the switching cam members 45 described above are detected by a mode detection switch 6 (see FIG. 2). The mode detection switch 6 detects the rotation angle positions of the switching cam members 45 by detecting the state of a mode gear (not shown) engaged with the output gear of the motor M. Once the rotation angle positions are detected, the mode detection switch 6 sends the detection signals corresponding to the results of the detection to the control means 100. Examples of the rotation angle positions detected by the mode detection switch 6 are now described. Needless to say, these are merely examples, to which the present invention should not be limited.

There are six rotation angle positions detected by the mode detection switch 6: "standby position," "60-degree rotated position," "120-degree rotated position," "180-degree rotated position," "240-degree rotated position," and "300-degree rotated position."

Figure 26:
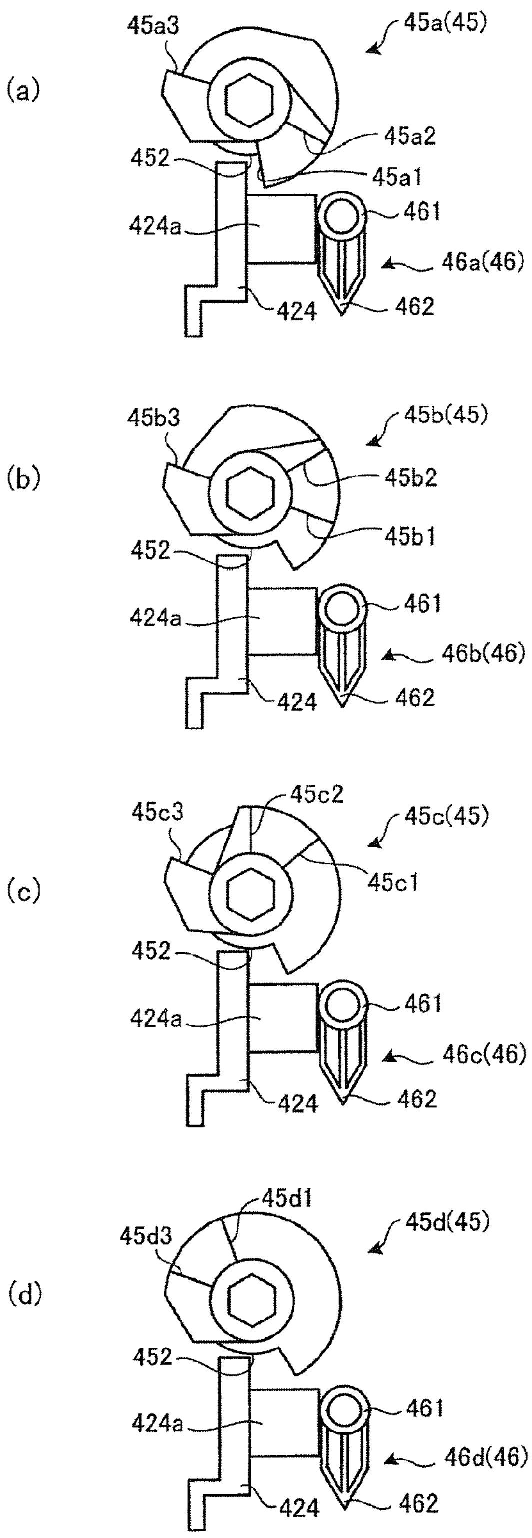
FIG. 26 is an explanation drawing showing the relationship between a cam mechanism in "standby position" and the first and second slide plates.

The "standby position" is a reference position where the standby section 452 of each switching cam member 45 faces forward, as shown in FIGS. 26(*a*) to 26(*d*). In this case, none of the switching cam members is in abutment with the first slide plate 41 and the second slide plate 42. In this case, a non-engagement posture is obtained in which each auxiliary cam member 46 is brought into a first slide projection **414*a* of the first slide abutting portion 414 of the first slide plate 41 that is located at the reference position and a second slide projection 424*a* of the second slide abutting portion 424 of the second slide plate 42 that is located at the reference position, whereby the tip end section 462** faces forward.

Figure 27:
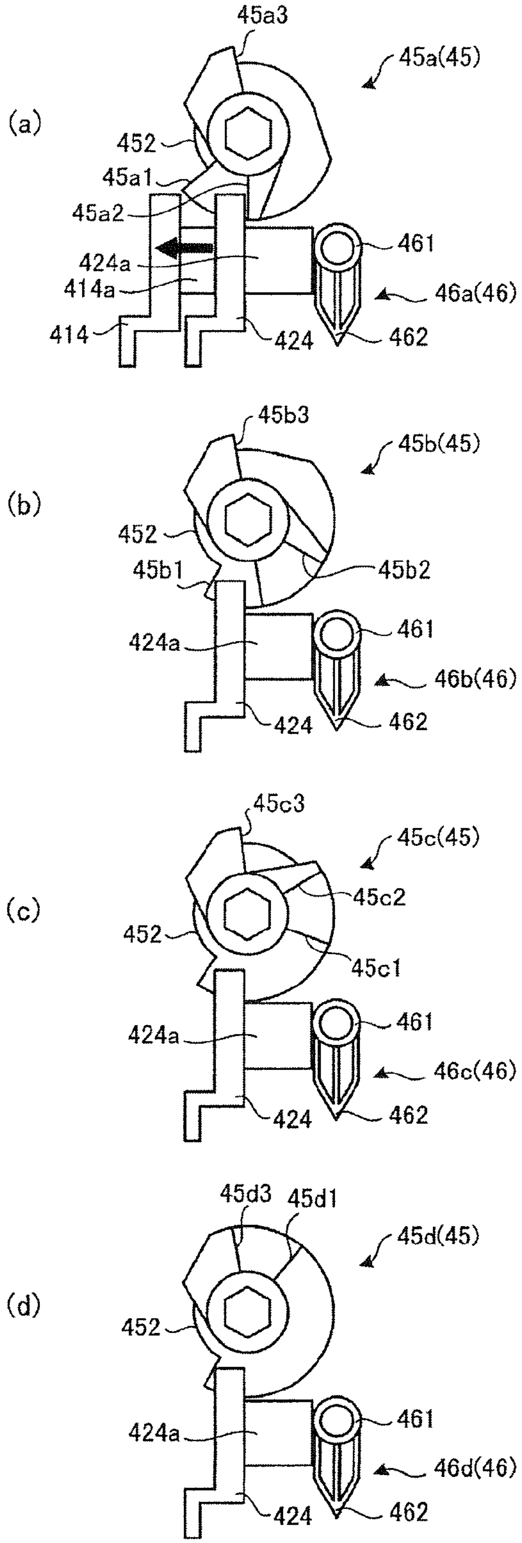
FIG. 27 is an explanation drawing showing the relationship between the cam mechanism in "60-degree rotated position" and the first and second slide plates.

The "60-degree rotated position" is obtained by turning the support rod 44 by 60 degrees clockwise from the "standby position." As shown in FIG. 27(*a*), at this position the first projecting piece **45*a*1 of the first switching cam member 45*a* is brought into abutment with the first slide abutting portion 414 of the first slide plate 41 in the top commodity rack 30, moving the first slide plate 41 to the left. At this moment, the non-engagement posture is obtained where the first auxiliary cam member 46*a* is brought into abutment with the second slide projection 424*a* of the second slide abutting portion 424 of the second slide plate 42 located at the reference position, whereby the tip end section 462 faces forward. Furthermore, as shown in FIGS. 27**(*b*) to 27(*d*), the second switching cam member **45*b*, the third switching cam member 45*c*, and the fourth switching cam member 45*d* are not in abutment with the first and second slide plates 41 and 42**.

Figure 28:
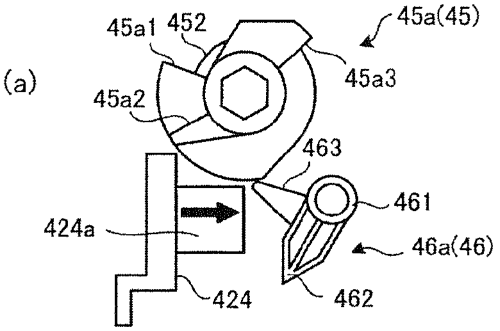
FIG. 28 is an explanation drawing showing the relationship between the cam mechanism in "120-degree rotated position" and the first and second slide plates.
Figure 28:
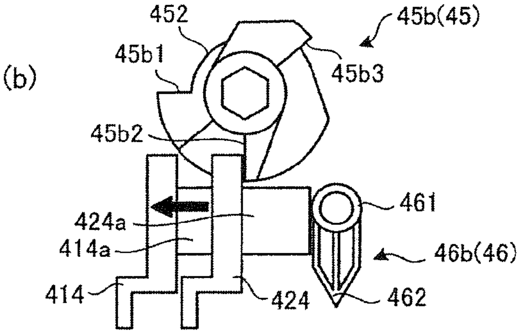
Figure 28:
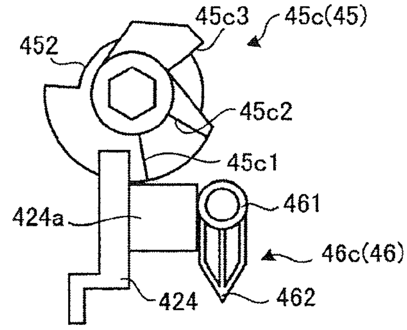
Figure 28:
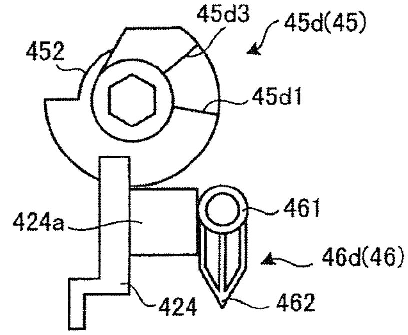

The "120-degree rotated position" is obtained by turning the support rod 44 by 120 degrees clockwise from the "standby position." As shown in FIG. 28(*b*), at this position the first projecting piece **45*b*1 of the second switching cam member 45*b* is brought into abutment with the first slide abutting portion 414 of the first slide plate 41 in the second commodity rack 30 from the top, moving the first slide plate 41 to the left. At this moment, the non-engagement posture is obtained where the second auxiliary cam member 46*b* is brought into abutment with the second slide projection 424***a* of the second slide abutting portion 424 of the second slide plate 42 located at the reference position, whereby the tip end section 462 faces forward. Also as shown in FIG. 28(*a*), while the cam mechanism reaches the "120-degree rotated position," the second projecting piece 45*a*2 of the first switching cam member 45*a* is brought into abutment with the first slide abutting portion 414 and the second slide abutting portion 424, moving these abutting portions to the left. As a result, the first auxiliary cam member 46*a* that was in abutment with the first slide projection 414*a* of the first slide abutting portion 414 and the second slide projection 424*a* of the second slide abutting portion 424 is biased by the auxiliary cam spring member 464 and turns to the left; however, the tongue piece 463 comes into contact with the first switching cam member 45*a* to prevent the first auxiliary cam member 46*a* from turning by a predetermined angle or more. Furthermore, as shown in FIGS. 28(*c*) and 28(*d*), the third switching cam member 45*c* and the fourth switching cam member 45*d* are not in abutment with the first and second slide plates 41 and 42.

Figure 29:
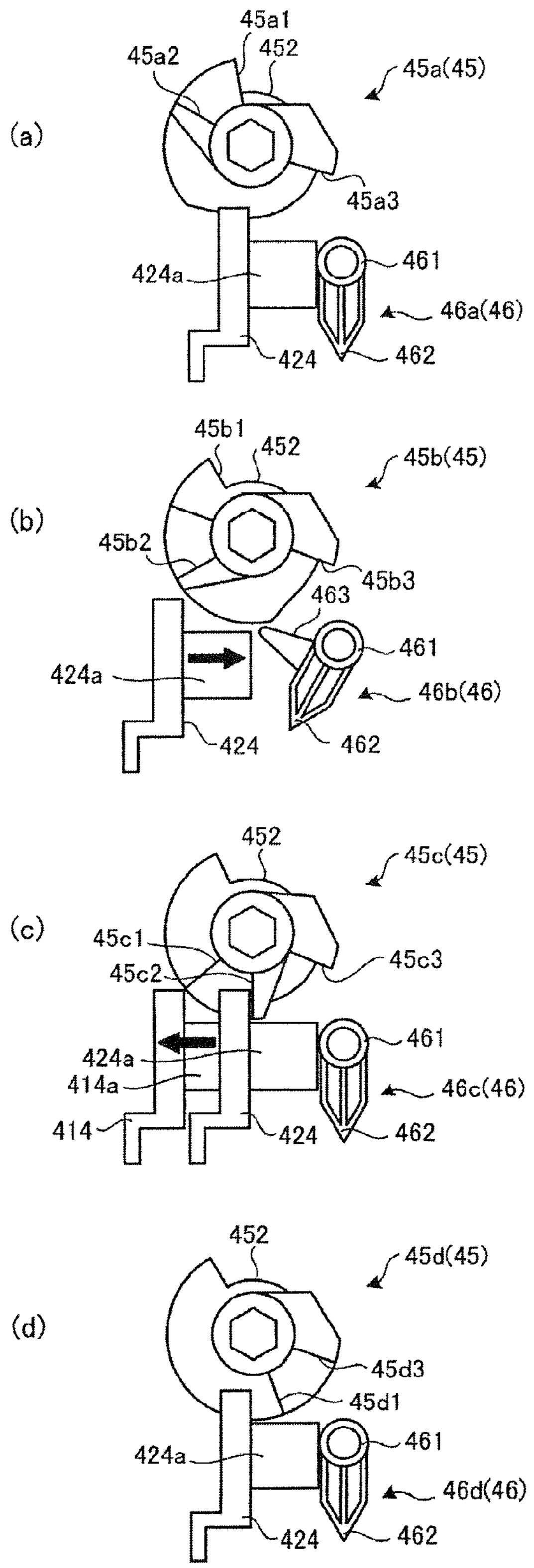
FIG. 29 is an explanation drawing showing the relationship between the cam mechanism in "180-degree rotated position" and the first and second slide plates.

The "180-degree rotated position" is obtained by turning the support rod 44 by 180 degrees clockwise from the "standby position." As shown in FIG. 29(*c*), at this position the first projecting piece 45*c*1 of the third switching cam member 45*c* is brought into abutment with the first slide abutting portion 414 of the first slide plate 41 in the third commodity rack 30 from the top, moving the first slide plate 41 to the left. At this moment, the non-engagement posture is obtained where the third auxiliary cam member 46*c* is brought into abutment with the second slide projection 424*a* of the second slide abutting portion 424 of the second slide plate 42 located at the reference position, whereby the tip end section 462 faces forward. Also as shown in FIG. 29(*b*), while the cam mechanism reaches the "180-degree rotated position," the second projecting piece 45*b*2 of the second switching cam member 45*b* is brought into abutment with the first slide abutting portion 414 and the second slide abutting portion 424, moving these abutting portions to the left. As a result, the second auxiliary cam member 46*b* that was in abutment with the first slide projection 414*a* of the first slide abutting portion 414 and the second slide projection 424*a* of the second slide abutting portion 424 is biased by the auxiliary cam spring member 464 and turns to the left; however, the tongue piece 463 comes into contact with the second switching cam member 45*b* to prevent the second auxiliary cam member 46*b* from turning by a predetermined angle or more. Furthermore, as shown in FIGS. 29(*a*) and 29(*d*), the first switching cam member 45*a* and the fourth switching cam member 45*d* are not in abutment with the first slide plate 41 and the second slide plate 42.

Figure 30:
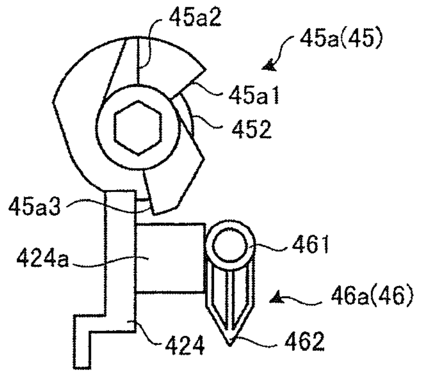
FIG. 30 is an explanation drawing showing the relationship between the cam mechanism in "240-degree rotated position" and the first and second slide plates.
Figure 30:
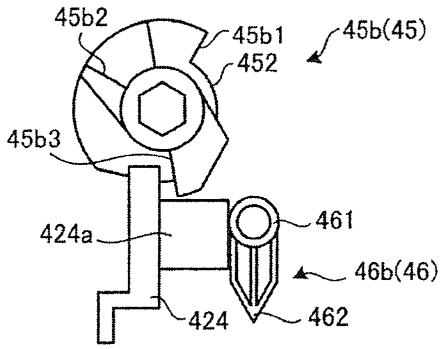
Figure 30:
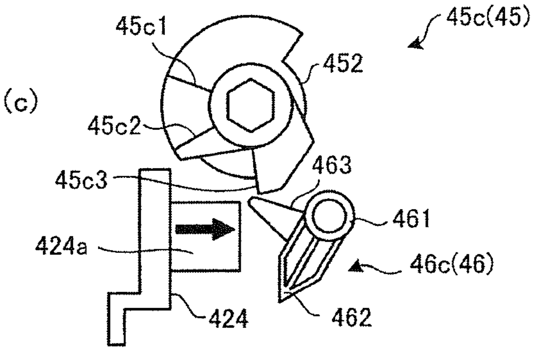
Figure 30:
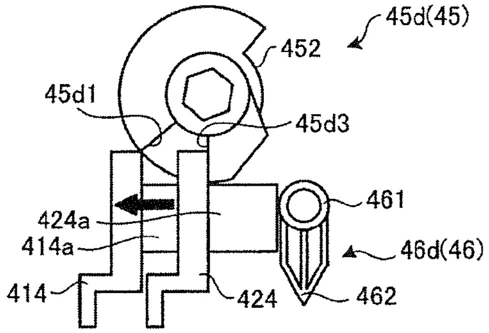

The "240-degree rotated position" is obtained by turning the support rod 44 by 240 degrees clockwise from the "standby position." As shown in FIG. 30(*d*), at this position the first projecting piece 45*d*1 of the fourth switching cam member 45*d* is brought into abutment with the first slide abutting portion 414 of the first slide plate 41 in the bottom commodity rack 30, moving the first slide plate 41 to the left. At this moment, the non-engagement posture is obtained where the fourth auxiliary cam member 46*d* is brought into abutment with the second slide projection 424*a* of the second slide abutting portion 424 of the second slide plate 42 located at the reference position, whereby the tip end section 462 faces forward. Also as shown in FIG. 30(*c*), while the cam mechanism reaches the "240-degree rotated position," the second projecting piece 45*c*2 of the third switching cam member 45*c* is brought into abutment with the first slide abutting portion 414 and the second slide abutting portion 424, moving these abutting portions to the left. As a result, the third auxiliary cam member 46*c* that was in abutment with the first slide projection 414*a* of the first slide abutting portion 414 and the second slide projection 424*a* of the second slide abutting portion 424 is biased by the auxiliary cam spring member 464 and turns to the left; however, the tongue piece 463 comes into contact with the third switching cam member 45*c* to prevent the third auxiliary cam member 46*c* from turning by a predetermined angle or more. Furthermore, as shown in FIGS. 30(*a*) and 30(*b*), the first switching cam member 45*a* and the second switching cam member 45*b* are not in abutment with the first slide plate 41 and the second slide plate 42.

Figure 31:
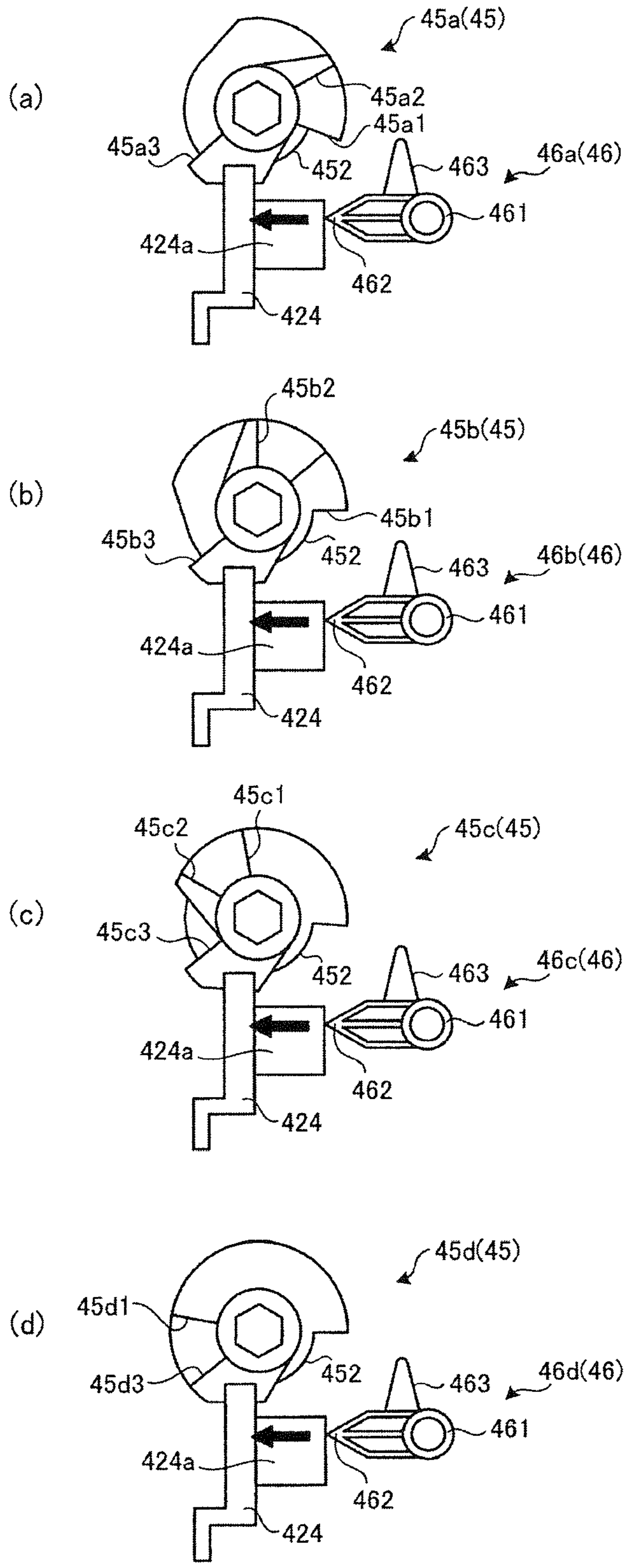
FIG. 31 is an explanation drawing showing the relationship between the cam mechanism in "300-degree rotated position" and the first and second slide plates.

The "300-degree rotated position" is obtained by turning the support rod 44 by 300 degrees clockwise from the "standby position." As shown in FIGS. 31(*a*) to 31(*d*), at this position the third projecting pieces 45*a*3, 45*b*3, 45*c*3, 45*d*3 of all the switching cam members 45 are brought into abutment with the first slide abutting portions 414 of the first slide plates 41 and the second slide abutting portions 424 of the second slide plates 42 of the commodity racks 30, respectively, moving these abutting portions to the left. At this moment, the engagement posture is obtained where the each auxiliary cam member 46 is biased by the corresponding auxiliary cam spring member 464, and the tongue piece 463 does not come into abutment with the corresponding switching cam member 45, causing the cam member to turn to the left and the tongue piece 463 to abut with the stopping piece 4411, whereby the tip end section 462 faces the left. This engagement posture keeps the state in which the tip end section 462 comes into abutment with the first slide projection 414*a* of the first slide abutting portion 414 and the second slide projection 424*a* of the second slide abutting portion 424 to move the first slide plate 41 and the second slide plate 42 to the left from the reference positions.

Then, when the support rod 44 is rotated from the "300-degree rotated position" to the "standby position" again, each of the auxiliary cam members 46 in the engagement posture is tuned to the front against the biasing force of the corresponding auxiliary cam spring member 464 by allowing the tongue piece 463 to come into contact with the corresponding switching cam member 45. As a result, the first slide plate 41 and the second slide plate 42 return to the reference positions.

The extraction mechanisms 50 are described next. The extraction mechanisms 50 are provided in the commodity storage columns 33 respectively, as shown in FIGS. 3, 4, and 20.

Figure 32:
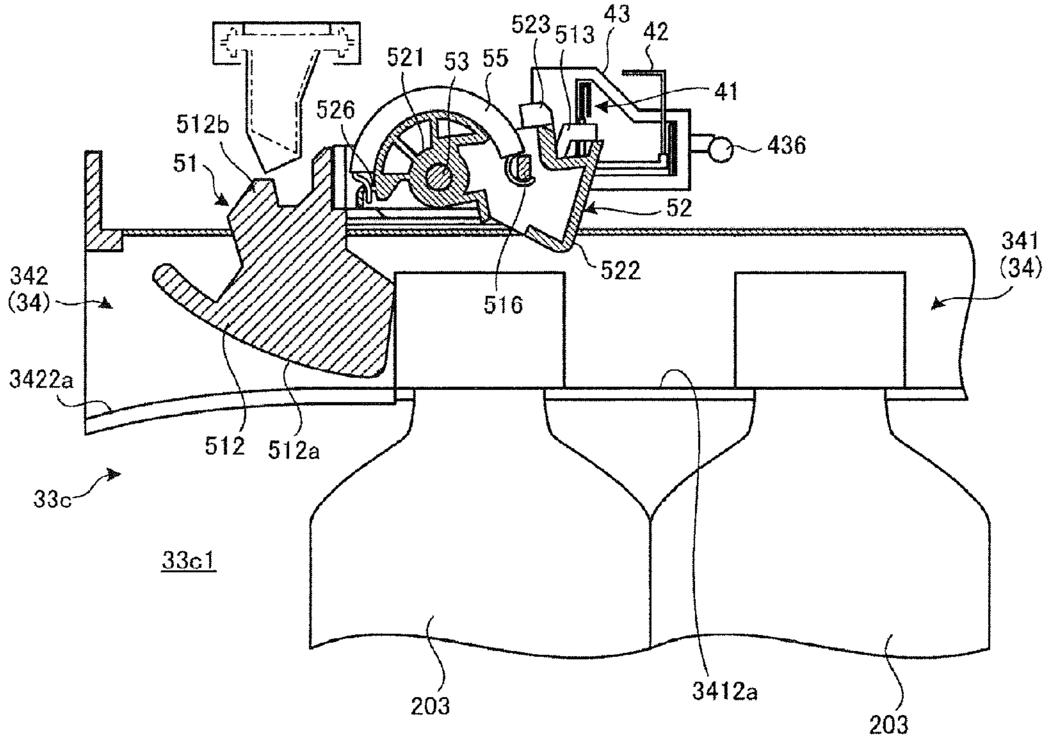
FIG. 32 is a schematic longitudinal cross-sectional view of a commodity storage column configuring a plastic-bottled commodity rack, viewed from the right side.
Figure 33:
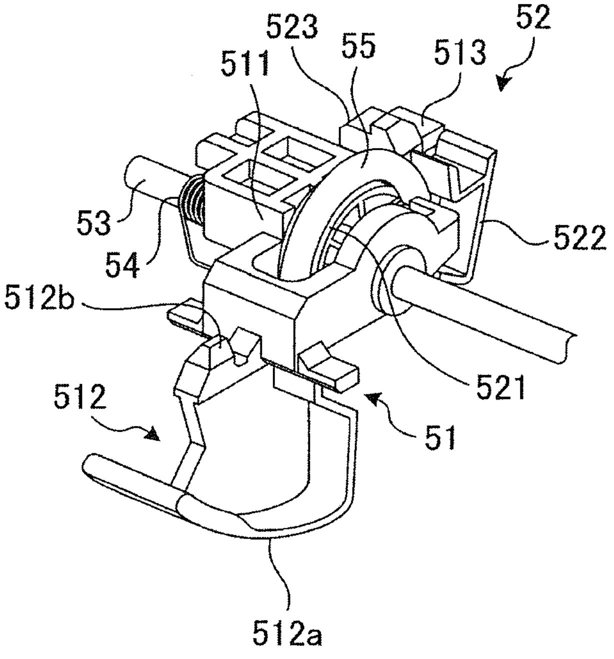
FIG. 33 is a perspective view showing an extraction mechanism corresponding to the commodity storage column of the plastic-bottled commodity rack.
Figure 34:
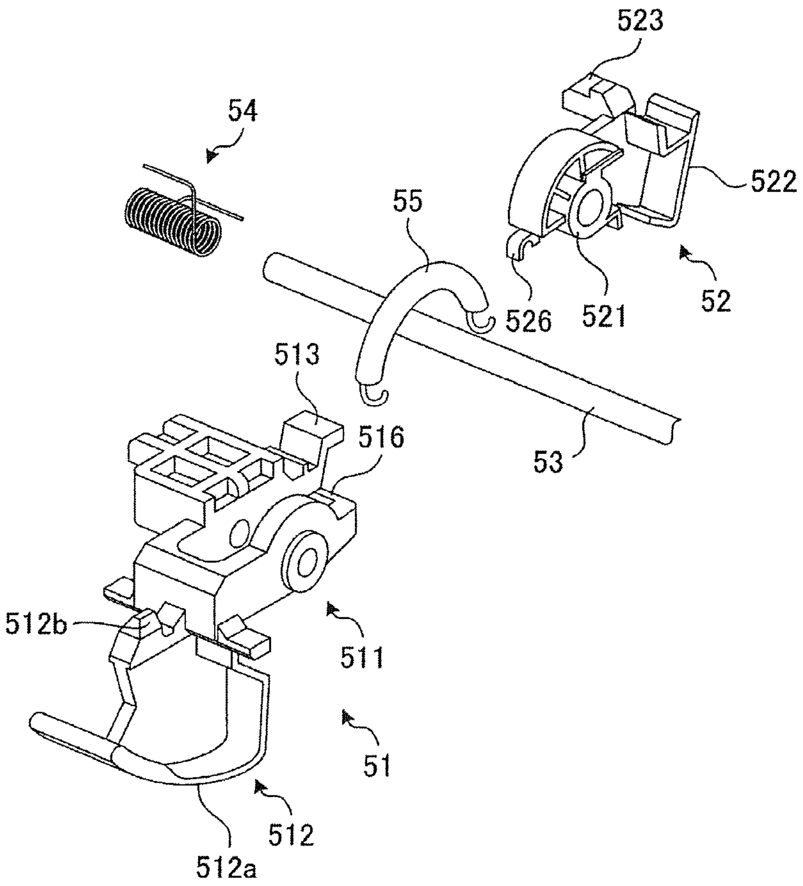
FIG. 34 is an exploded perspective view of the principal elements of the extraction mechanism shown in FIG. 33.
Figure 35:
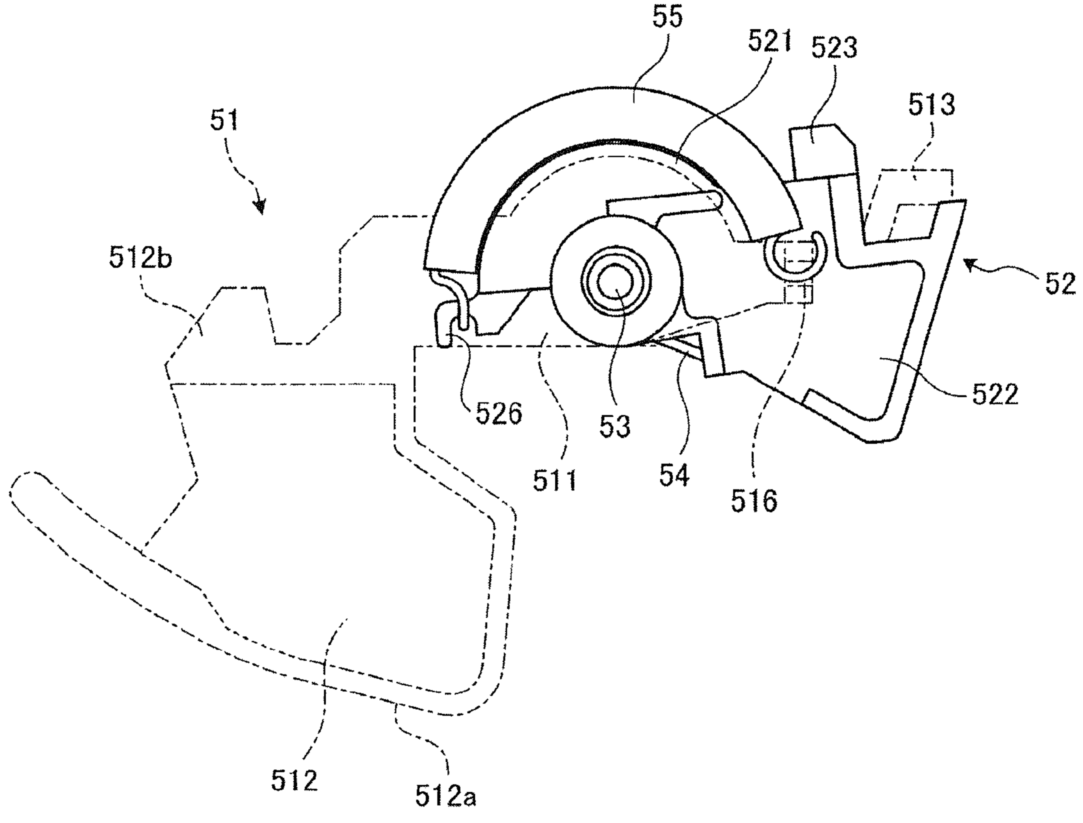
FIG. 35 is a side view of the extraction mechanism shown in FIG. 33, viewed from the right side.
Figure 36:
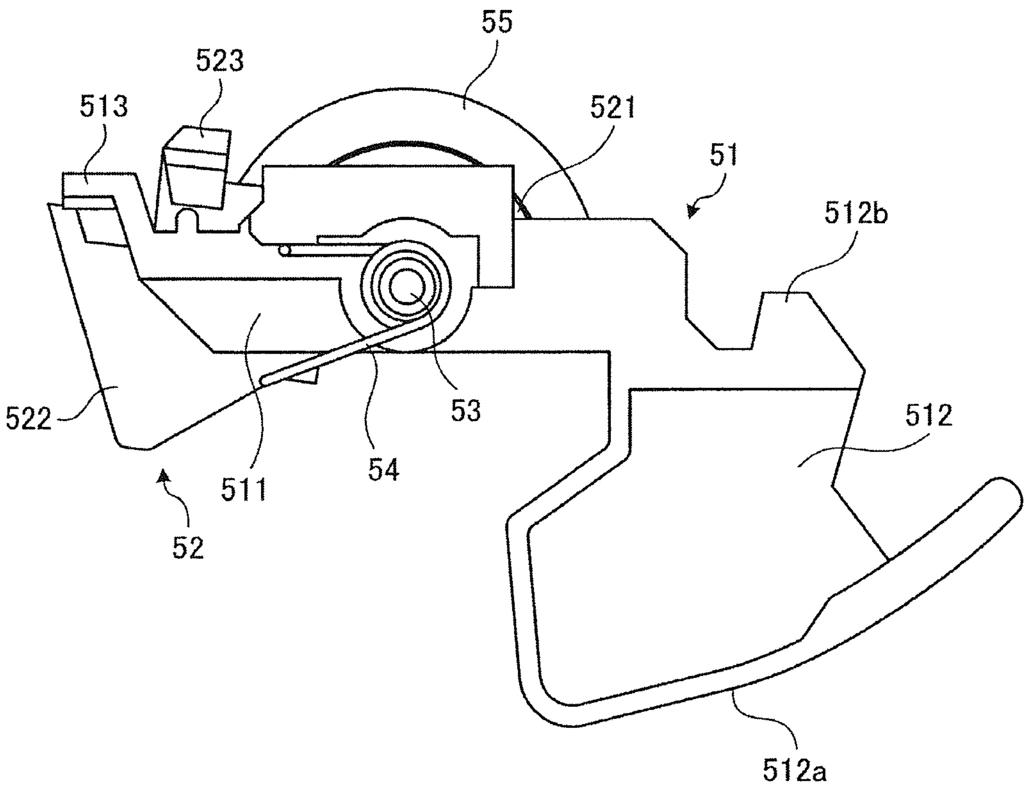
FIG. 36 is a side view of the extraction mechanism shown in FIG. 33, viewed from the left side.

FIG. 32 is a schematic longitudinal cross-sectional view of a commodity storage column 33*c* configuring the plastic-bottled commodity rack 30*c*, viewed from the right side. FIG. 33 is a perspective view showing one of the extraction mechanisms 50 provided in the commodity storage column 33 shown in FIG. 32. FIG. 34 is an exploded perspective view showing the principal elements of the extraction mechanism 50. FIG. 35 is a side view of the extraction mechanism 50 viewed from the right side. FIG. 36 is a side view of the extraction mechanism 50 viewed from the left side.

As shown in FIG. 32 as well, the extraction mechanism 50 is provided in each of the commodity storage columns 33. The extraction mechanism 50 is configured by a first gate member 51 and a second gate member 52.

The first gate member 51 has a first base end portion 511 extending along the crosswise direction and supported by a gate shaft portion 53 hung across the upper region of the foremost commodity, and a first tip end portion 512 extending further forward than the first base end portion 511 and then protruding downward. A lower section of the first tip end portion 512 is provided with a sliding portion 512*a* forming a curved surface. The first gate member 51 is capable of turning about the central axis of the gate shaft portion 53. Between the first gate member 51 and the gate shaft portion 53 is interposed a gate spring member 54. Thus, the first gate member 51 is biased by the gate spring member 54 to turn downward, while the first tip end portion 512 enters the corresponding commodity storage passage 33*c*1.

When the first tip end portion 512 of the first gate member 51 enters the commodity storage passage 33*c*1 as described above, this first tip end portion 512 is brought to a front region of the foremost commodity 203. Then, when the first gate member 51 turns upward against the biasing force of the gate spring member 54, the first tip end portion 512 retreats from the commodity storage passage 33*c*1.

The first gate member 51 also has a first engaging piece 513 protruding rearward. In a case where the first tip end portion 512 of the first gate member 51 enters the commodity storage passage 33*c*1 and the first slide plate 41 is located at the reference position, the first engaging piece 513 is located at an upper region of the corresponding restricting piece 411*b* (see FIG. 21). In this configuration, even when the first gate member 51 attempts to turn upward, the first gate member 51 is prevented from doing so because the first engaging piece 513 is in abutment with the restricting piece 411*b*.

The second gate member 52 is provided in a section further back of the first gate member 51, and has a second base end portion 521 entering the first base end portion 511 and supported by the gate shaft portion 53, and a second tip end portion 522 extending further rearward than the second base end portion 521 and having its lower end portion protruding further downward than the second base end portion 521. The second gate member 52 is capable of turning about the central axis of the gate shaft portion 53. In other words, the second gate member 52 is disposed in such a manner as to be able to turn about the central axis of the shaft portion that the second gate member 52 shares with the first gate member 51.

The second gate member 52 is coupled to the first gate member 51 by a coil spring member 55. More specifically, the coil spring member 55 is hooked between a hooking groove 516 of the first gate member 51 and a hooking groove 526 of the second gate member 52. Biased by this coil spring member 55, the positional relationship between the first gate member 51 and the second gate member 52 is defined.

In a case where the first tip end portion 512 of the first gate member 51 enters the commodity storage passage 33*c*1, the second tip end portion 522 of the second gate member 52 retreats from the commodity storage passage 33*c*1. On the other hand, when the first tip end portion 512 of the first gate member 51 retreats from the commodity storage passage 33*c*1, the second tip end portion 522 enters the commodity storage passage 33*c*1. When the second tip end portion 522 is in the commodity storage passage 33*c*1, the second tip end portion 522 is located at the front region of the second commodity from the front.

The second gate member 52 also has a second engaging piece 523 protruding to the left. The second engaging piece 523 enters a concave portion located in front of the first engaging piece 513 of the first gate member 51, so as to be latched on the concave portion.

Because the second gate member 52 is coupled to the first gate member 51 by the coil spring member 55, basically the second gate member 52 turns together with the first gate member 51. However, when the second tip end portion 522 is forced to retreat from the commodity storage passage 33*c*1, the second gate member 52 turns upward against the biasing force of the coil spring member 55.

Figure 37:
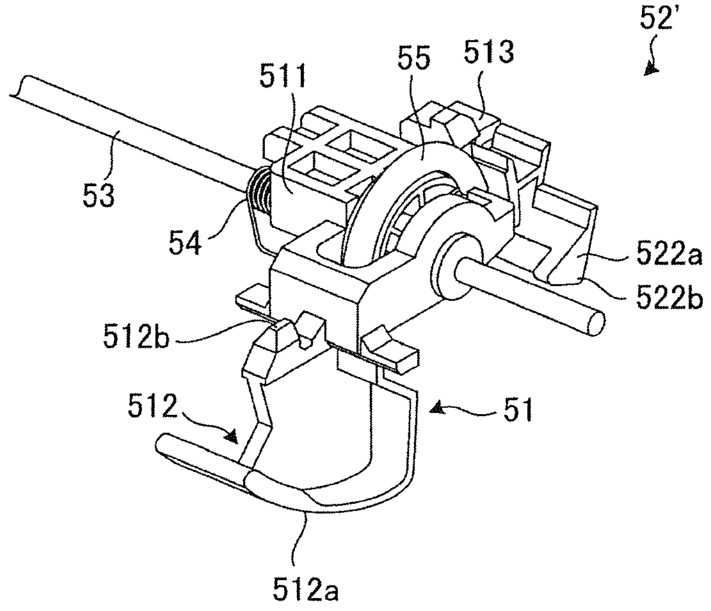
FIG. 37 is a perspective view showing an extraction mechanism corresponding to a commodity storage column of the canned commodity rack.
Figure 38:
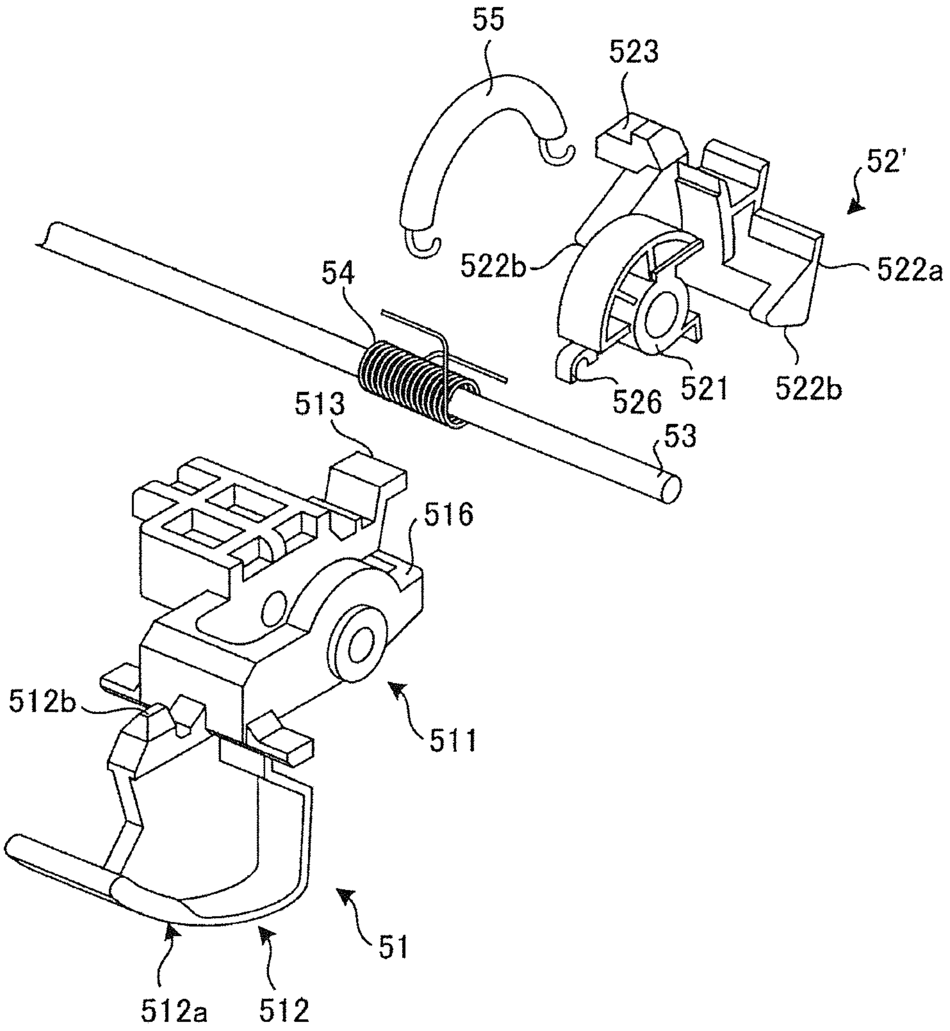
FIG. 38 is an exploded perspective view showing the principal elements of the extraction mechanism shown in FIG. 37.

FIG. 37 is a perspective view showing the extraction mechanism 50 corresponding to a commodity storage column 33 of the canned commodity rack 30*a*. FIG. 38 is an exploded perspective view showing the principal elements of the extraction mechanism 50 shown in FIG. 37. Note that the extraction mechanism 50 that corresponds to a commodity storage column 33 configuring the canned commodity rack 30*a* has substantially the same configuration as the extraction mechanism 50 that corresponds to a commodity storage column 33 configuring the plastic-bottled commodity rack 30*c* except for the size; thus, the parts that are common to these extraction mechanisms are denoted the same reference numerals, and the overlapping descriptions are omitted accordingly.

The extraction mechanism 50 that corresponds to a commodity storage column 33 configuring the canned commodity rack 30*a* is configured by the first gate member 51 and a second gate member 52'.

The first gate member 51 has a first base end portion 511 extending along the crosswise direction and supported by a gate shaft portion 53 hung across the upper region of the foremost commodity, and a first tip end portion 512 extending further forward than the first base end portion 511 and then protruding downward. A lower section of the first tip end portion 512 is provided with a sliding portion 512*a* forming a curved surface. The first gate member 51 is capable of turning about the central axis of the gate shaft portion 53. Between the first gate member 51 and the gate shaft portion 53 is interposed a gate spring member 54. Thus, the first gate member 51 is biased by the gate spring member 54 to turn downward, while the first tip end portion 512 enters the corresponding commodity storage passage 33*a*1.

When the first tip end portion 512 of the first gate member 51 enters the commodity storage passage 33*a*1 as described above, this first tip end portion 512 is brought to the front region of the foremost commodity. Then, when the first gate member 51 turns upward against the biasing force of the gate spring member 54, the first tip end portion 512 retreats from the commodity storage passage 33*a*1.

The first gate member 51 also has a first engaging piece 513 protruding rearward. In a case where the first tip end portion 512 of the first gate member 51 enters the commodity storage passage 33*a*1 and the first slide plate 41 is located at the reference position, the first engaging piece 513 is located at an upper region of the corresponding restricting piece 411*b*. In this configuration, even when the first gate member 51 attempts to turn upward, the first gate member 51 is prevented from doing so because the first engaging piece 513 is in abutment with the restricting piece 411*b*.

In this first gate member 51, the first tip end portion 512 is made wider in the crosswise direction than the first tip end portion 512 of the first gate member 51 that corresponds to each of the commodity storage columns 33 of the plastic-bottled commodity rack 30*c*.

The second gate member 52' is provided in a section further back of the first gate member 51, and has a second base end portion 521 entering the first base end portion 511 and supported by the gate shaft portion 53, and a second tip end portion 522*a* extending further rearward than the second base end portion 521 and having its lower end portion protruding further downward than the second base end portion 521. The second tip end portion 522*a* is made wider in the crosswise direction than the second tip end portion 522 of the second gate member 52 that corresponds to each of the commodity storage columns 33 of the plastic-bottled commodity rack 30*c*. This second tip end portion 522*a* also has protrusions 522*b* on both right and left ends thereof. The second gate member 52' is capable of turning about the central axis of the gate shaft portion 53. In other words, the second gate member 52' is disposed in such a manner as to be able to turn about the central axis of the shaft portion that the second gate member 52' shares with the first gate member 51.

The second gate member 52' is coupled to the first gate member 51 by a coil spring member 55. More specifically, the coil spring member 55 is hooked between a hooking groove 516 of the first gate member 51 and a hooking groove 526 of the second gate member 52'. Biased by this coil spring member 55, the positional relationship between the first gate member 51 and the second gate member 52' is defined.

Figure 39:
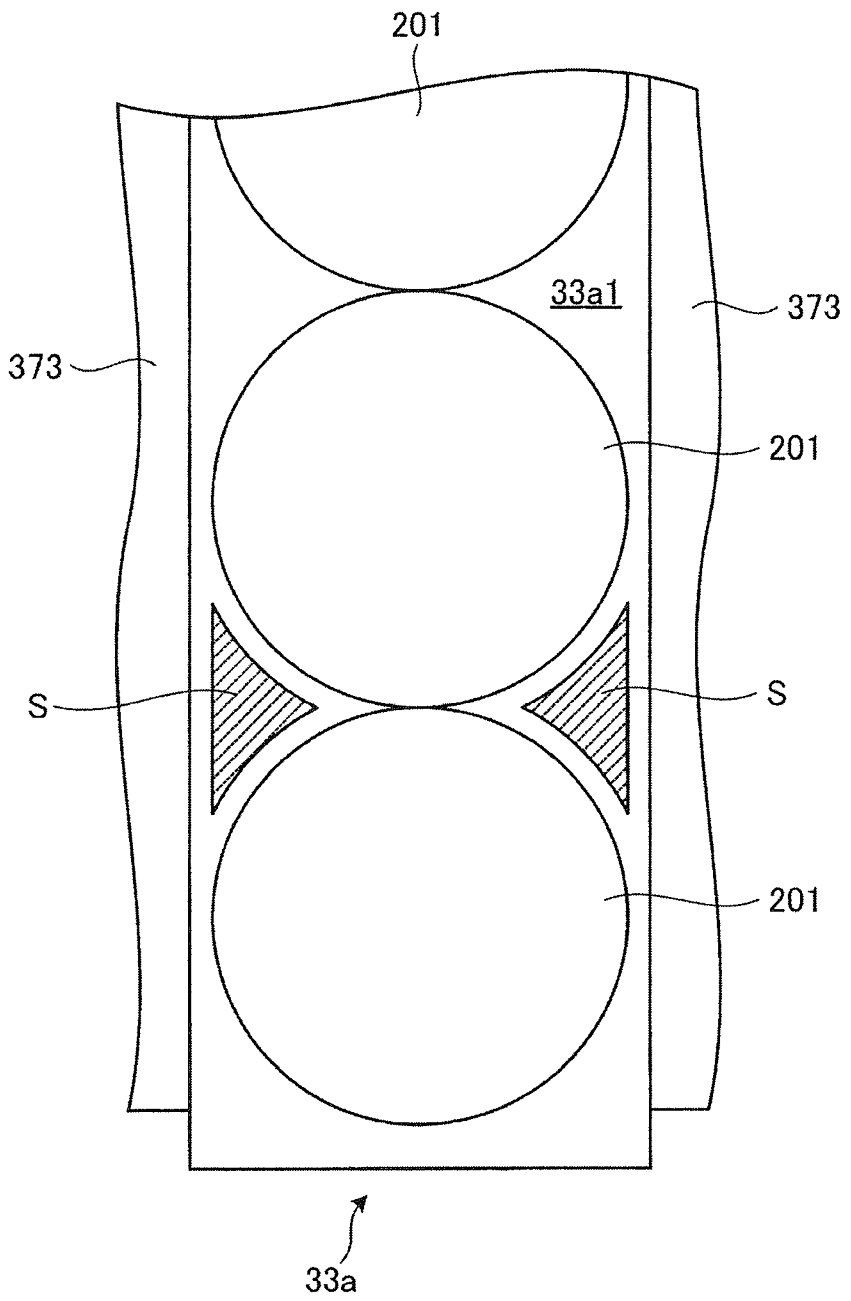
FIG. 39 is a plan view schematically showing a commodity storage passage of the canned commodity rack.

In a case where the first tip end portion 512 of the first gate member 51 enters the commodity storage passage **33*a*1, the second tip end portion 522*a* of the second gate member 52' retreats from the commodity storage passage 33*a*1. On the other hand, when the first tip end portion 512 of the first gate member 51 retreats from the commodity storage passage 33*a*1, the second tip end portion 522*a* enters the commodity storage passage 33*a*1. When the second tip end portion 522*a* is in the commodity storage passage 33*a*1, the protrusions 522*b* of the second tip end portion 522*a* enter spaces S, the hatched areas shown in FIG. 39, between the foremost, most downstream commodity 201 and the second commodity 201 that is in partial abutment with this most downstream commodity 201**.

The second gate member 52' also has a second engaging piece 523 protruding to the left. The second engaging piece 523 enters a concave portion located in front of the first engaging piece 513 of the first gate member 51, so as to be latched on the concave portion.

Because the second gate member 52' is coupled to the first gate member 51 by the coil spring member 55, basically the second gate member 52' turns together with the first gate member 51. However, when the second tip end portion **522*a* is forced to retreat from the commodity storage passage 33*a*1, the second gate member 52' turns upward against the biasing force of the coil spring member 55**.

The extraction mechanism 50 that corresponds to each of the commodity storage columns 33 configuring the bottled commodity rack **30*b* has the same configuration as the extraction mechanism 50 that corresponds to each of the commodity storage columns 33 configuring the plastic-bottled commodity rack 30*c***; thus, the overlapping descriptions are omitted accordingly.

Figure 40:
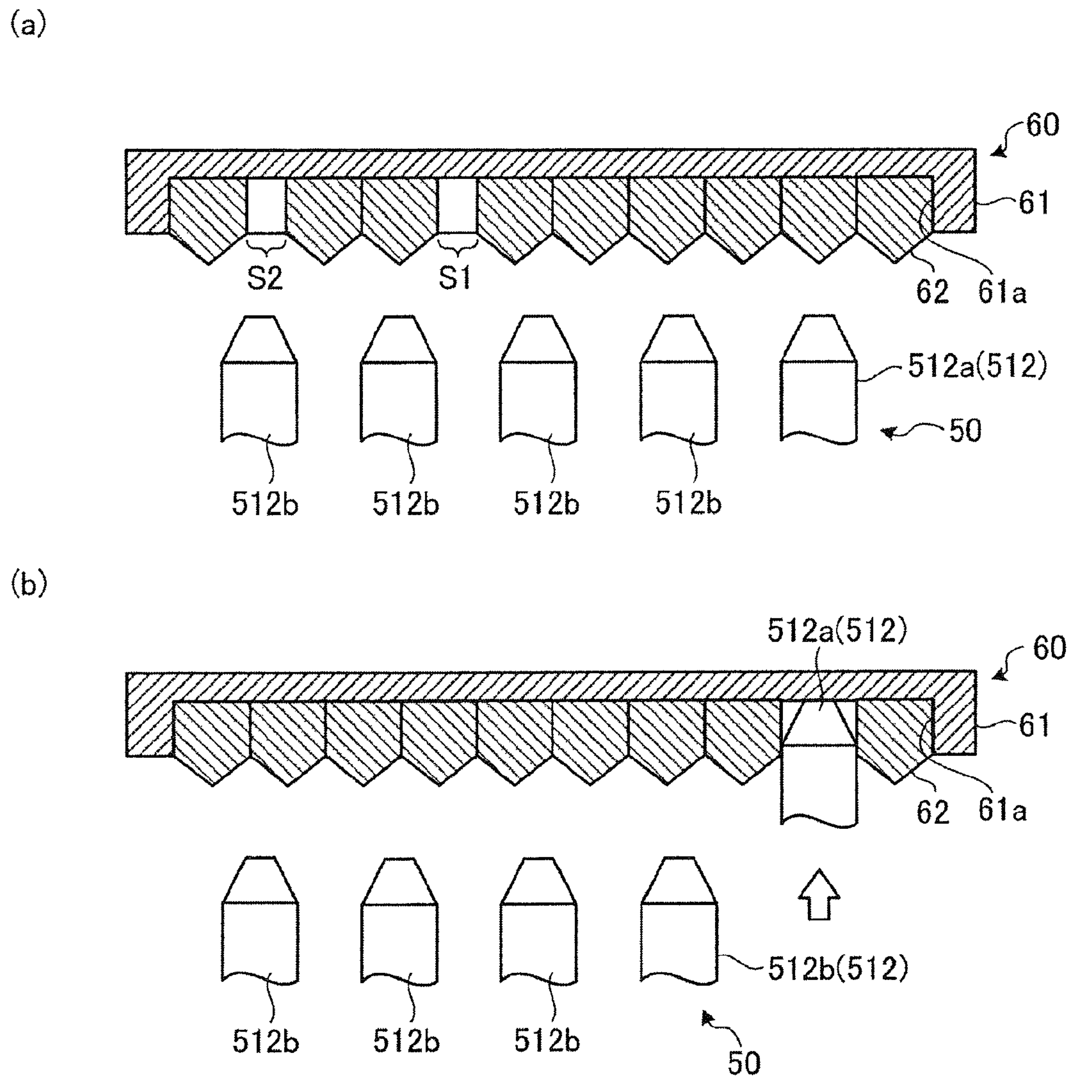
FIG. 40 is an explanation drawing schematically showing restricting means configuring the commodity storage device shown in FIGS. 3 and 4.

The restricting means 60 is described next. FIG. 40 is an explanation drawing schematically showing one of the restricting means 60 configuring the commodity storage device 20 shown in FIGS. 3, 4 and 20. The restricting means 60 is configured by a guide member 61 and bridge members 62. The guide member 61 extends along the crosswise direction through a forward upper region of the commodity storage columns 33 of each commodity rack 30.

There are a plurality of bridge members 62 provided in the restricting means 60. These bridge members 62 are accommodated in an accommodation region **61*a* of the guide member 61 in such a manner as to be able to slide along the crosswise direction. The total widths of spaces S1, S2 formed in the accommodation region 61*a* of this restricting means 60 is slightly wider than a projection 512*b* of the first gate member 51 configuring the corresponding extraction mechanism 50**.

Therefore, in a case where the projection **512*b* of the first gate member 51 of any one of the extraction mechanisms 50 disposed in the respective commodity storage columns 33 enters the accommodation region 61*a* as shown in FIG. 40**(*b*), there are no spaces in the accommodation region **61*a* into which the projections 512*b* of the first gate members 51 of the other extraction mechanisms 50** can enter.

In such a case where the projection **512*b* of the first tip end portion 512 of a single first gate member 51 retreats from the commodity storage passage 33*a*1, 33*b*1, 33*c*1 in response to a commodity extraction operation and enters the accommodation region 61*a*, the projections 512*b* of the first tip end portions 512 of the first gate members 51 of the other extraction mechanisms 50 are inhibited from entering the accommodation region 61*a*, restricting the first gate members 51 of the other extraction mechanisms 50** from turning upward.

Figure 41:
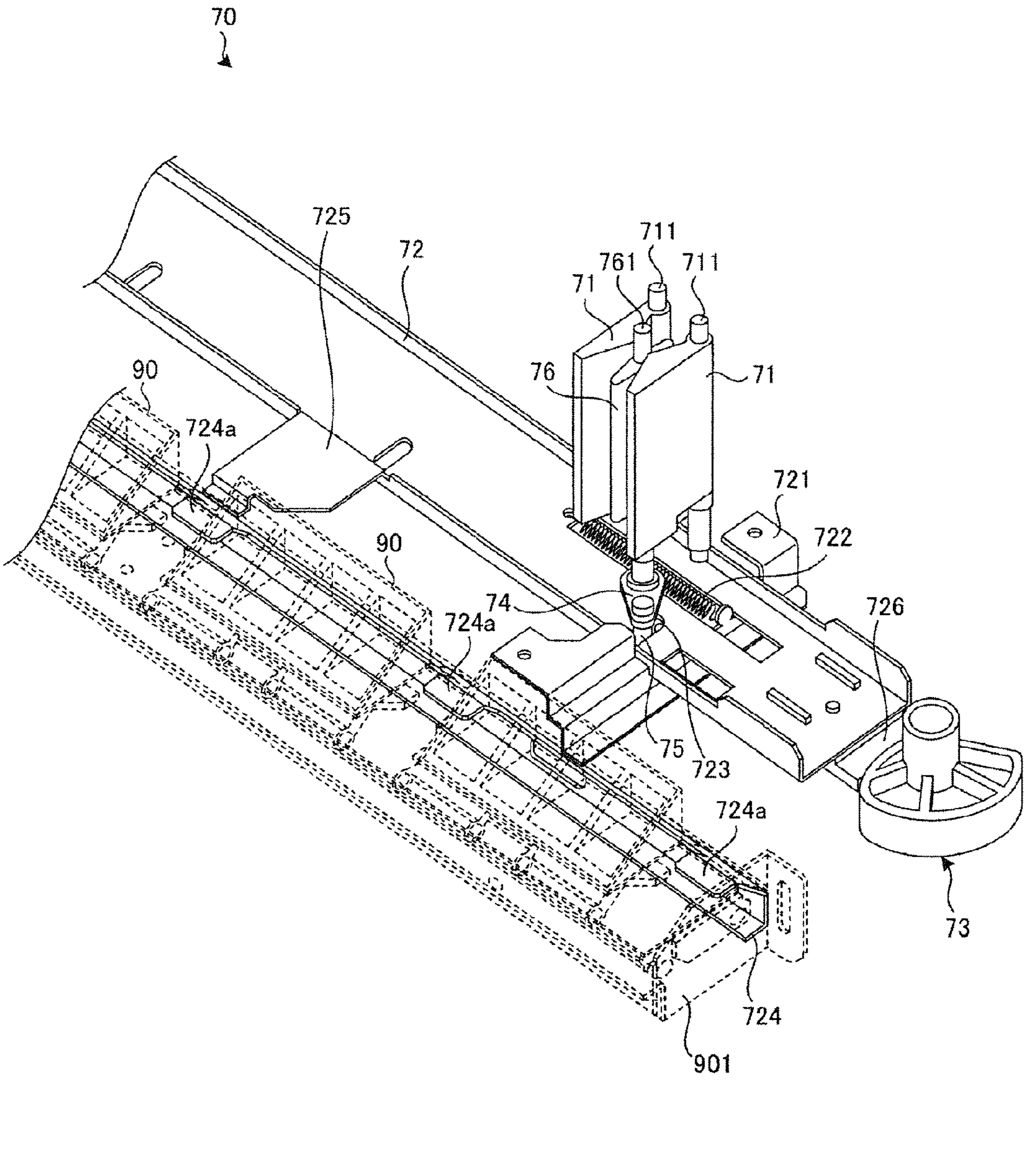
FIG. 41 is a perspective view showing a flapper mechanism configuring the commodity storage device shown in FIGS. 3 and 4, with some of the components omitted.
Figure 42:
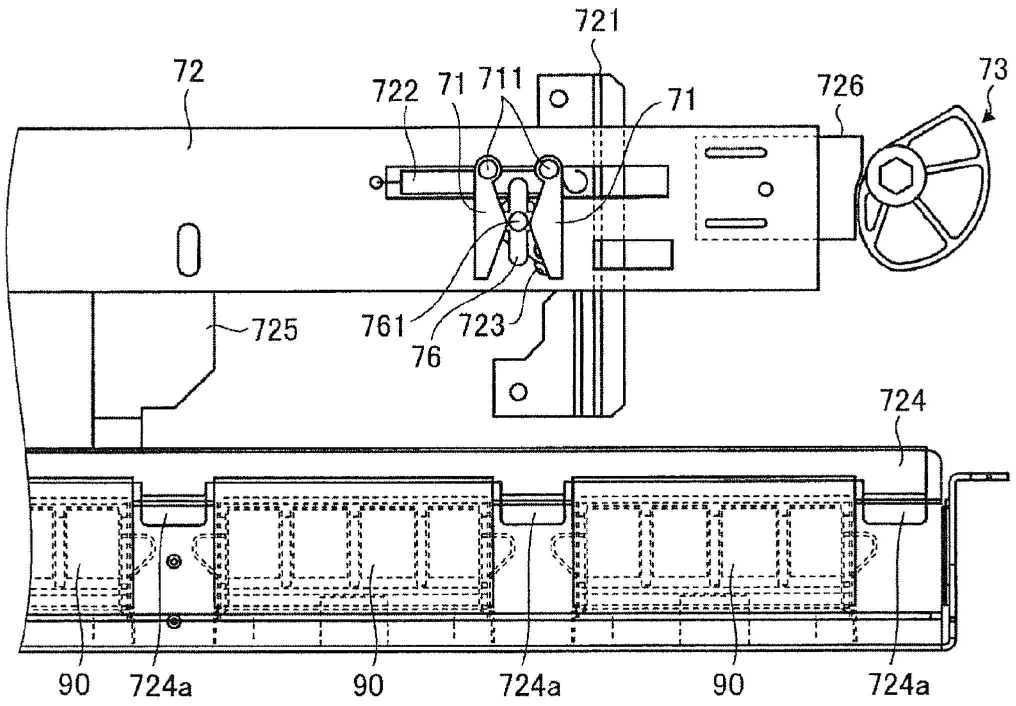
FIG. 42 is a plan view showing the flapper mechanism configuring the commodity storage device shown in FIGS. 3 and 4, with some of the components omitted.

The flapper mechanisms 70 are described next. FIGS. 41 and 42 each show one of the flapper mechanisms 70 configuring the commodity storage device 20 shown in FIGS. 3 and 4, FIG. 41 being a perspective view and FIG. 42 a plan view, with some of the components omitted. The flapper mechanism 70 illustrated here is configured by flapper members 71, a flapper slide plate 72, and a flapper cam member 73. Note that the flapper mechanisms 70 are provided in the canned commodity rack **30*a* and the bottled commodity rack 30*b* and have the same configuration. The flapper mechanism 70 provided in the bottled commodity rack 30*b*** is now mainly described.

Figure 43:
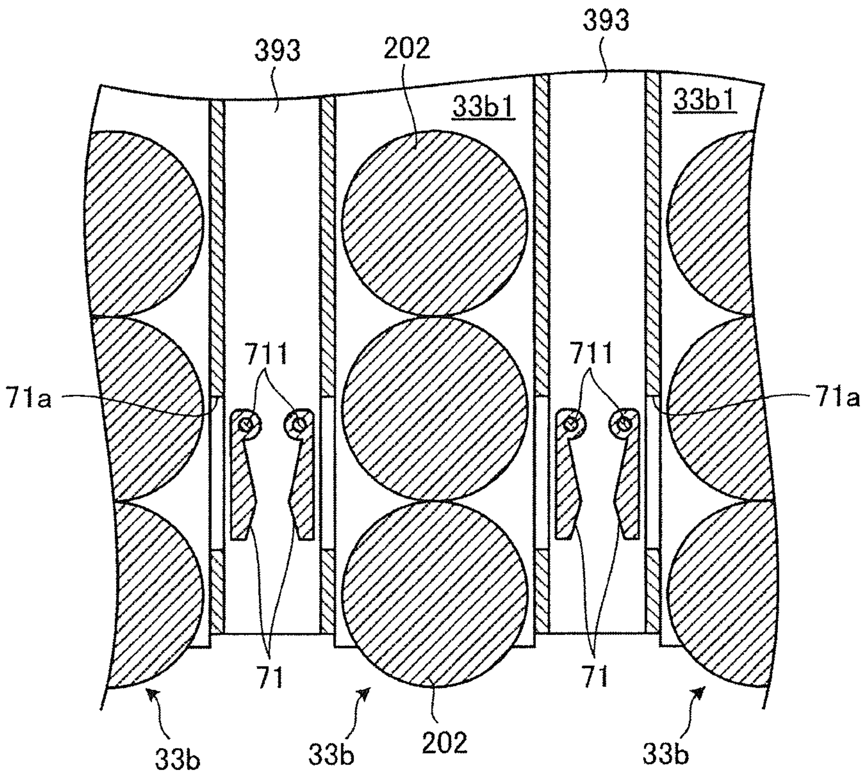
FIG. 43 is a plan view schematically showing commodity storage passages of the bottled commodity rack.

As shown in FIGS. 13 and 16, the flapper members 71 are provided in the can partition plate 373 and the bottle partition plate 393 in such a manner as to be able to turn about the shaft centers of flapper shafts 711, and are capable of reciprocating in the commodity storage passages **33*b*1 through corresponding flapper openings 71*a* that are formed on the side surfaces of each partition plate 393 (373) facing the commodity storage passages 33*b*1 (33*a*1). The flapper members 71 are biased by flapper spring members, not shown, and thereby are retreated from the corresponding commodity storage passages 33*b*1 in the normal state, as shown in FIG. 43**.

Figure 44:
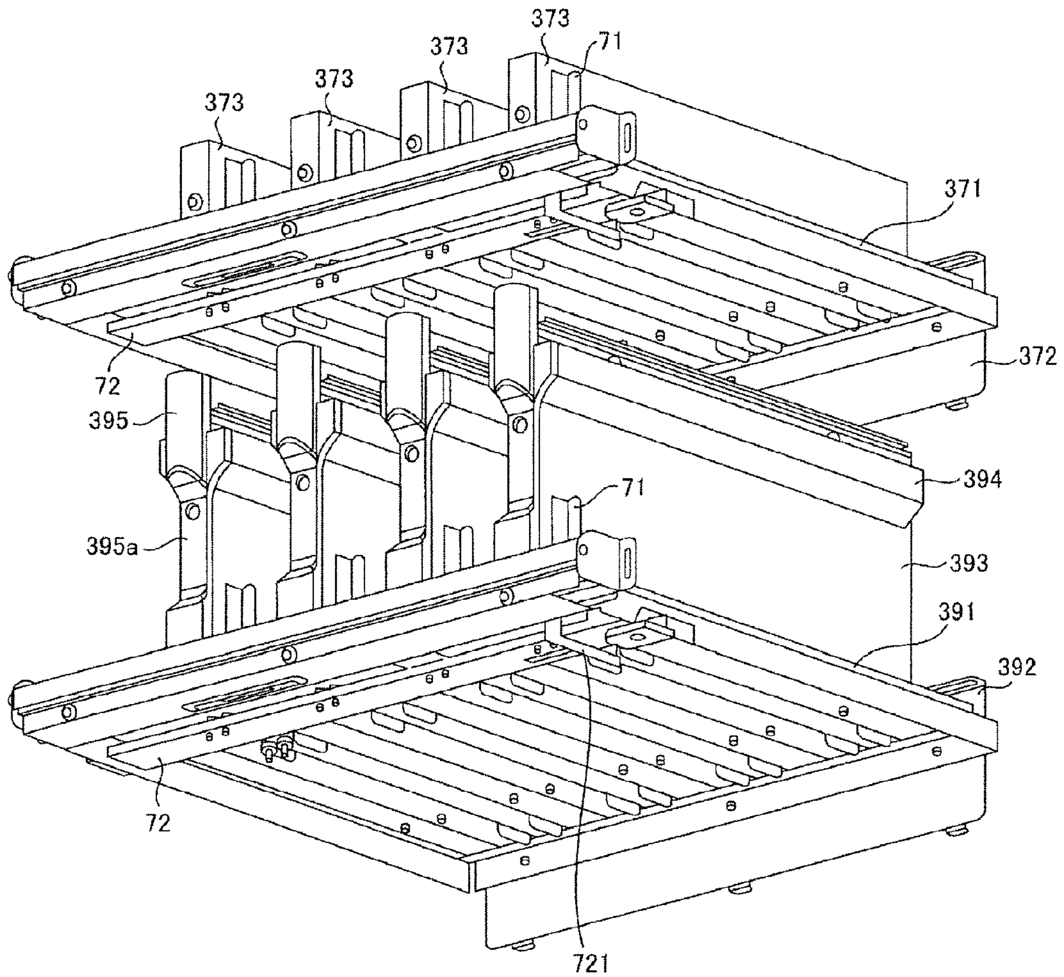
FIG. 44 is a perspective view showing the substantial portions of the canned commodity rack and the bottled commodity rack configuring a commodity discharging device shown in FIGS. 3 and 4, with some of the components omitted.

The flapper slide plate 72 is a long, plate-like body whose crosswise direction is the longitudinal direction, and is mounted on front end-side lower parts of the can rack base member 371 and the bottle rack base member 391 by mounting brackets 721, as shown in FIG. 44. The flapper slide plate 72 is coupled to the corresponding mounting bracket 721 by a flapper slide spring member 722. The flapper slide plate 72 is therefore constantly biased to the right by the flapper slide spring member 722 and located at a reference position during the normal state.

The flapper slide plate 72 is provided with a long hole 723 and a stopper restricting plate 724. A pin member 75, an upper end portion of which is mounted on a lower surface of one end portion of a coupling bracket 74, is inserted through the long hole 723. The coupling bracket 74 is in the shape of a tongue piece, wherein a flapper guide shaft 761 is provided upright on an upper surface of the other end portion of the coupling bracket 74. The flapper guide shaft 761 extends in the vertical direction in the can partition plate 373 and the bottle partition plate 393 and is provided with a flapper guide plate 76. The flapper guide plate 76 is capable of rotating about the central axis of the flapper guide shaft 761 together with the flapper guide shaft 761, thereby coming into abutment with the flapper members 71, causing the flapper members 71 to enter the corresponding commodity storage passage **33*b*1 (33*a*1**).

The stopper restricting plate 724 is a long object that is integrated with the flapper slide plate 72 by a coupling portion 725 and has its crosswise direction configuring the longitudinal direction. The stopper restricting plate 724 is obtained by an appropriate bending or cutting process and enters the stopper base member 901. Stopper pieces **724*a* in the shape of a tongue piece are formed in this stopper restricting plate 724, so when the flapper slide plate 72 is positioned at the reference position, the stopper pieces 724***a* come to the positions away from the turning regions of the stopper members 90.

Note that the stopper restricting plate 724 does not have to be provided on the flapper slide plate 72 corresponding to the canned commodity rack 30*a*. This is because the canned commodity rack 30*a* is not provided with the stopper members 90. If the stopper restricting plate 724 is integrally formed on the flapper slide plate 72 mounted on the can rack base member 371, the stopper restricting plate 724 enters the front end side of the can rack base member 371, which does not affect any other members.

As shown in FIG. 12, the flapper cam members 73 have the support rod 44 inserted therethrough and are located above the second switching cam member 45*b* and the third switching cam member 45*c*. The flapper cam members 73 rotate along with the support rod 44 as the support rod 44 rotates, and are configured to not abut with flapper slide abutting portions 726 of the corresponding flapper slide plates 72 in the "standby position" and the "300-degree rotated position" described above, but to abut with the flapper slide abutting portions 726 in the "60-degree rotated position," the "120-degree rotated position," the "180-degree rotated position," and the "240-degree rotated position."

Figure 45:
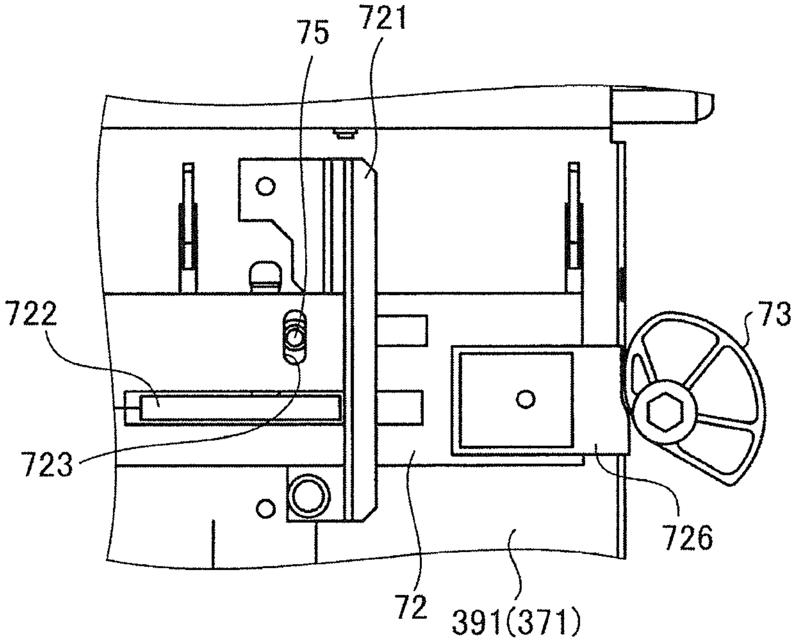
FIG. 45 is an explanation drawing showing, from below, the substantial portions of the flapper mechanism shown in FIG. 41.
Figure 46:
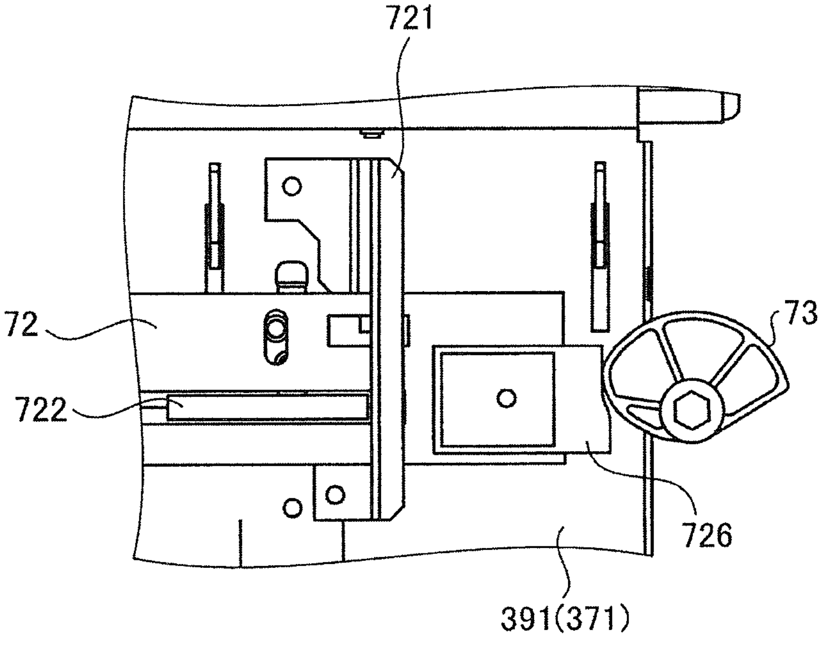
FIG. 46 is an explanation drawing showing, from below, the substantial portions of the flapper mechanism shown in FIG. 41.
Figure 47:
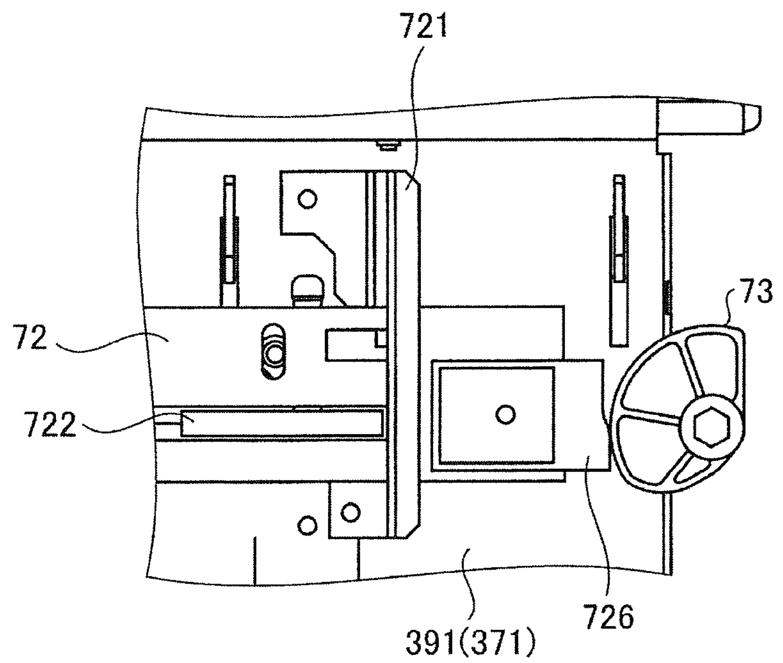
FIG. 47 is an explanation drawing showing, from below, the substantial portions of the flapper mechanism shown in FIG. 41.
Figure 48:
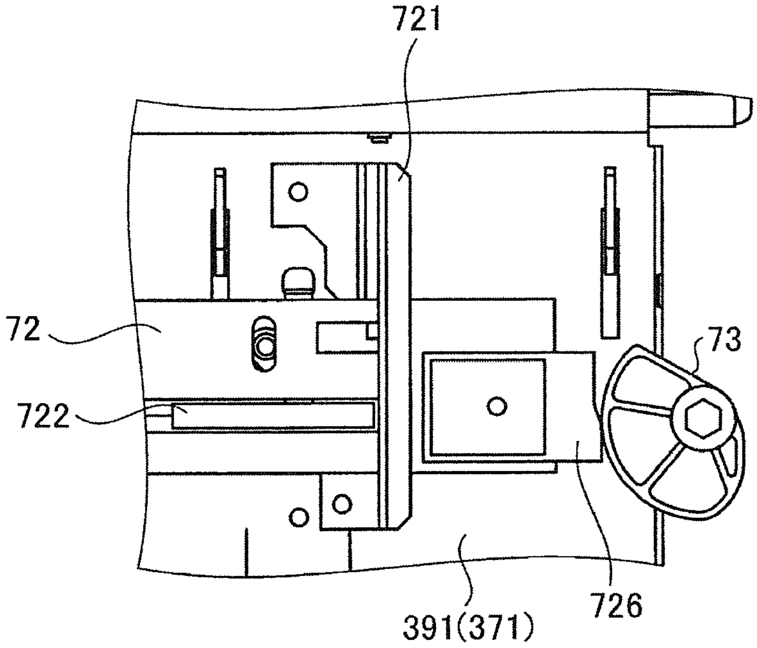
FIG. 48 is an explanation drawing showing, from below, the substantial portions of the flapper mechanism shown in FIG. 41.
Figure 49:
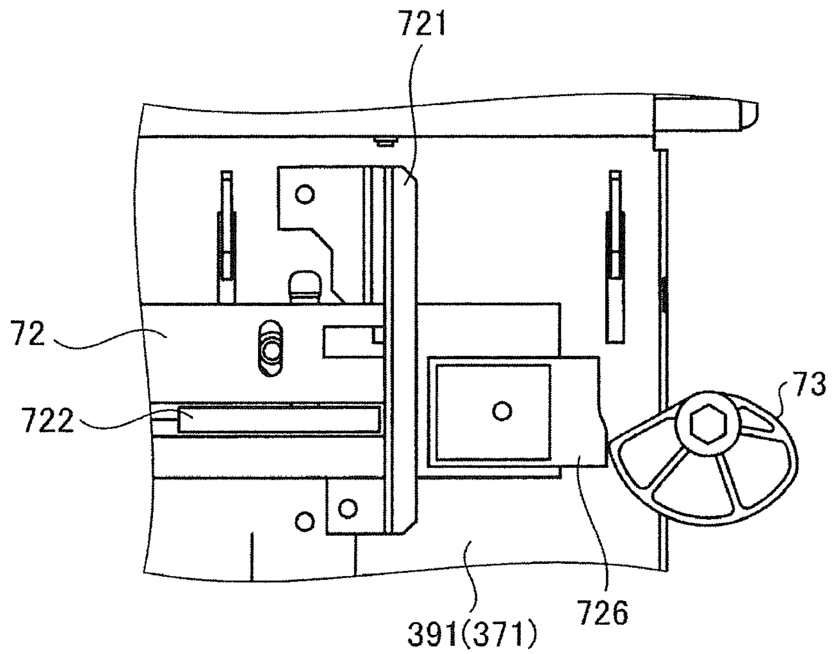
FIG. 49 is an explanation drawing showing, from below, the substantial portions of the flapper mechanism shown in FIG. 41.
Figure 50:
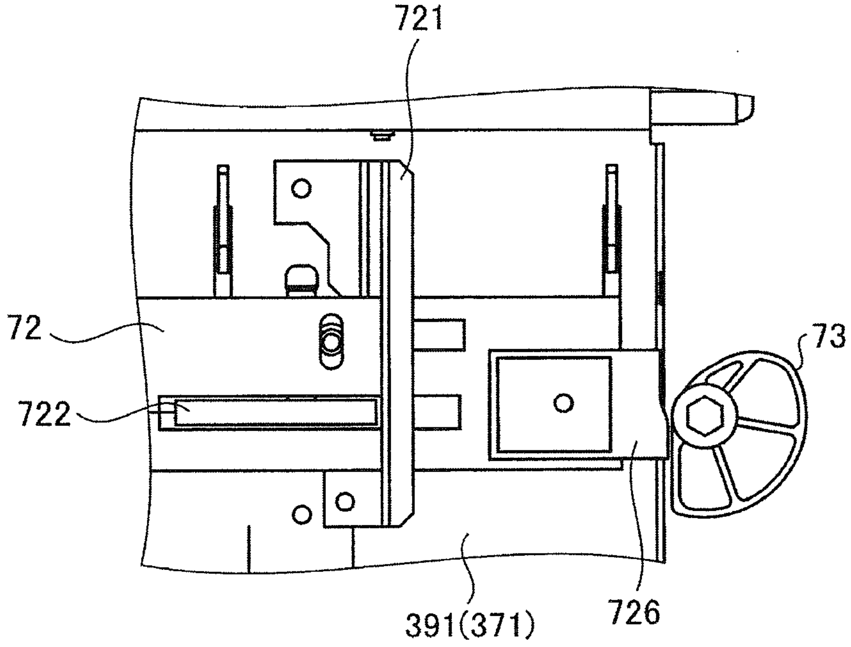
FIG. 50 is an explanation drawing showing, from below, the substantial portions of the flapper mechanism shown in FIG. 41.

More specifically, in the "standby position" each flapper cam member 73 does not come into abutment with the corresponding flapper slide plate 72, as shown in FIG. 45. Therefore, the flapper slide plate 72 is biased by the flapper slide spring member 722 so as to be positioned at the reference position. In the "60-degree rotated position," the flapper cam member 73 comes into abutment with the flapper slide abutting portion 726 of the flapper slide plate 72, moving the flapper slide plate 72 to the left, as shown in FIG. 46. In the "120-degree rotated position," the flapper cam member 73 stays in abutment with the flapper slide abutting portion 726 of the flapper slide plate 72, continuously moving the flapper slide plate 72 to the left, as shown in FIG. 47. In the "180-degree rotated position," the flapper cam member 73 stays in abutment with the flapper slide abutting portion 726 of the flapper slide plate 72, continuously moving the flapper slide plate 72 to the left, as shown in FIG. 48. In the "240-degree rotated position," the flapper cam member 73 stays in abutment with the flapper slide abutting portion 726 of the flapper slide plate 72, continuously moving the flapper slide plate 72 to the left, as shown in FIG. 49. In the "300-degree rotated position," the abutment between the flapper cam member 73 and the flapper slide abutting portion 726 is released, as shown in FIG. 50. As a result, the flapper slide plate 72 is released and biased by the flapper slide spring member 722, moving to the right to return to the reference position.

Figure 51:
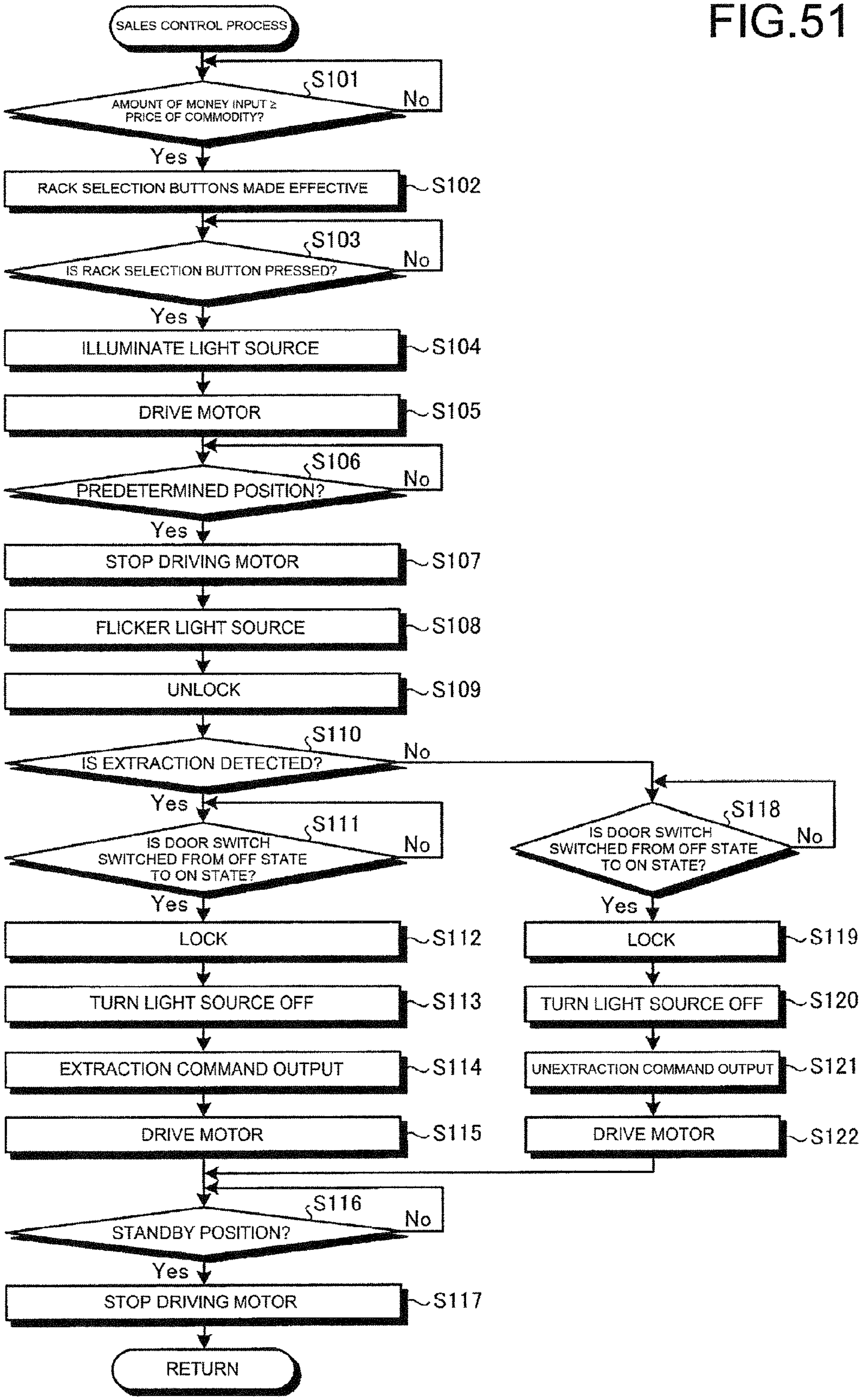
FIG. 51 is a flowchart showing the main content of a sales control process executed by control means shown in FIG. 2.

FIG. 51 is a flowchart showing the main content of a sales control process executed by the control means 100 shown in FIG. 2. The following illustrates the operations of the automatic vending machine with the commodity storage device 20 therein while describing the sales control process. The following description assumes that the third commodity rack 30 from the top (the plastic-bottled commodity rack 30*c*) is selected.

In this sales control process, when the amount of money (monetary information) that is input from the cash processing device 16 is equal to or greater than the price of a commodity (step S101: Yes), the control means 100 determines that the relevant rack selection buttons 13 are effective (step S102).

When the rack selection button 13 associated with the third plastic-bottled commodity rack 30*c* from the top is selected out of the effective rack selection buttons 13 and pressed (step S103: Yes), the control means 100 illuminates the light source 13*a* embedded in the pressed rack selection button 13 in accordance with a predetermined pattern (step S104). In this step S104, the light source 13*a* is illuminated at all times. After executing step S104, the control means 100 drives the motor M based on the assumption that a sales command is input (step S105).

When the "180-degree rotated position" is detected by the mode detection switch 6 (step S106: Yes), the control means 100 stops driving the motor M, and, for example, flickers the light source 13*a* according to a predetermined pattern, the light source 13*a* being illuminated constantly in step S104 (step S107, step S108).

After executing step S108, the control means 100 drives the locking/unlocking mechanism 3 into the unlocked state (step S109). This allows a user to open the outer door 2.

Figure 52:
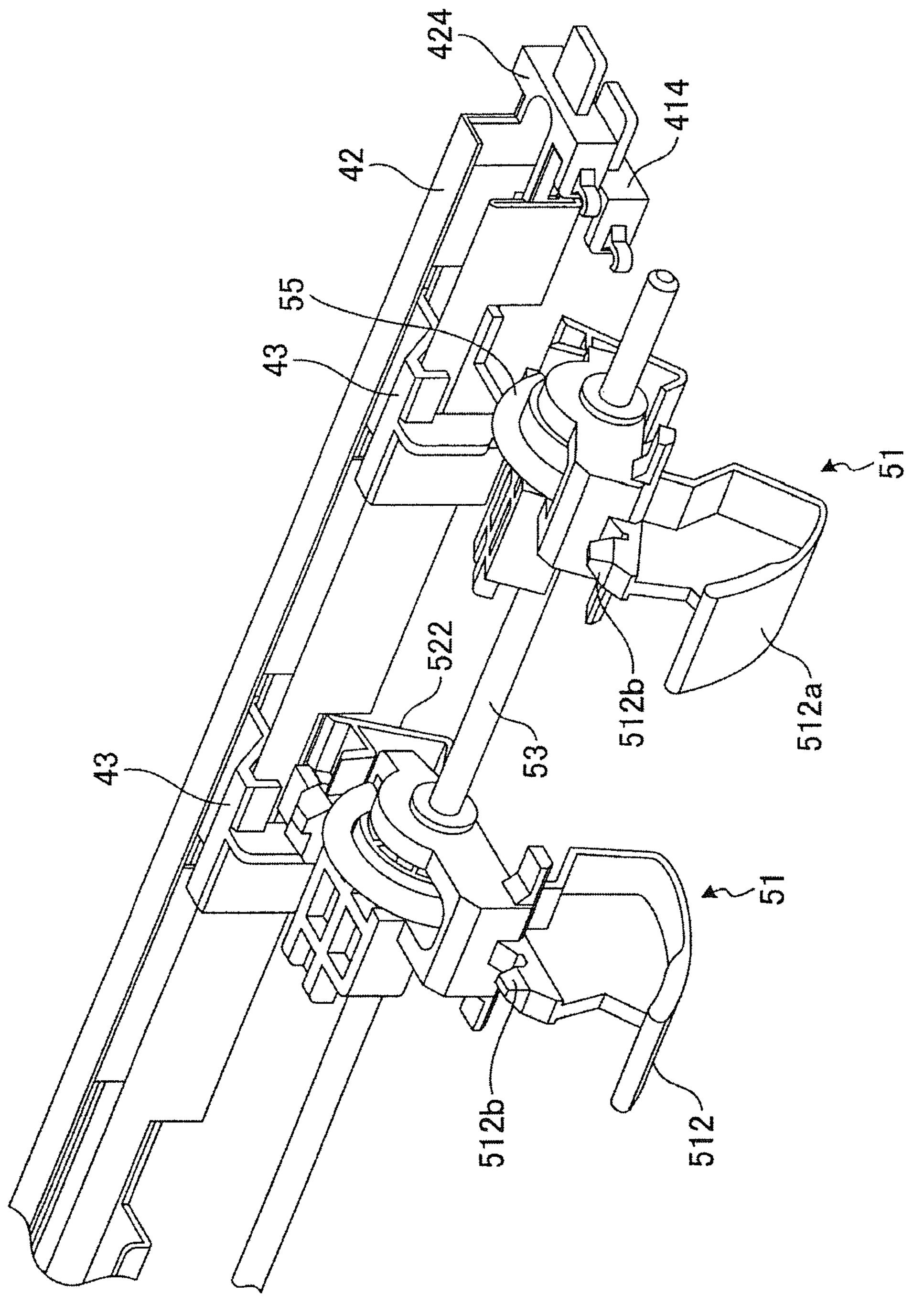
FIG. 52 is a perspective view showing the operations of the extraction mechanism in a state in which the first slide plate is moved from a reference position to the left.

Since the cam mechanism is stopped at the "180-degree rotated position," the support rod 44 is rotated clockwise by 180 degrees from the "standby position," bringing the first projecting pieces 45*c*1 of the third switching cam member 45*c* into abutment with the first slide abutting portion 414 of the first slide plate 41. As a result, the first slide plate 41 moves to the left against the biasing force of the first slide spring member 415, as shown in FIG. 52.

When the first slide plate 41 moves to the left in this manner, the restricting piece 411*b* of the first slide plate 41 moves away from a lower region of the first engaging piece 513 of the first gate member 51 so that the cutout portions 412*a* are in place, opening the lower region of the first engaging piece 513. As a result, the first gate member 51 of each of the extraction mechanisms 50 in the top commodity rack 30 is biased by the gate spring member 54 but enters its free state so as to be able to turn upward.

Incidentally, in the commodity racks 30 other than the third commodity rack 30 from the top, the switching cam members 45 (the first switching cam member 45*a*, the second switching cam member 45*b*, the fourth switching cam member 45*d*) that are mounted at the same levels as the respective commodity racks 30 are not in abutment with the first slide abutting portions 414. Therefore, in each of the commodity racks 30 other than the third commodity rack from the top, the first gate member 51 of the extraction mechanism 50 disposed in each commodity storage column 33 is restricted by the first slide plate 41. In these commodity racks 30, therefore, extraction of the commodities stored in each commodity storage column 33 is prevented.

As described above, the rack selection mechanism 40 restricts extraction of the commodities stored in all the commodity racks 30 in the standby state, but allows only the commodities of a designated commodity rack 30 to be extracted when a sales command is input.

In addition, as a result of rotating the support rod 44 by 180 degrees, the flapper slide plate 72 in abutment with the flapper cam member 73 is moved from the reference position to the left.

Figure 53:
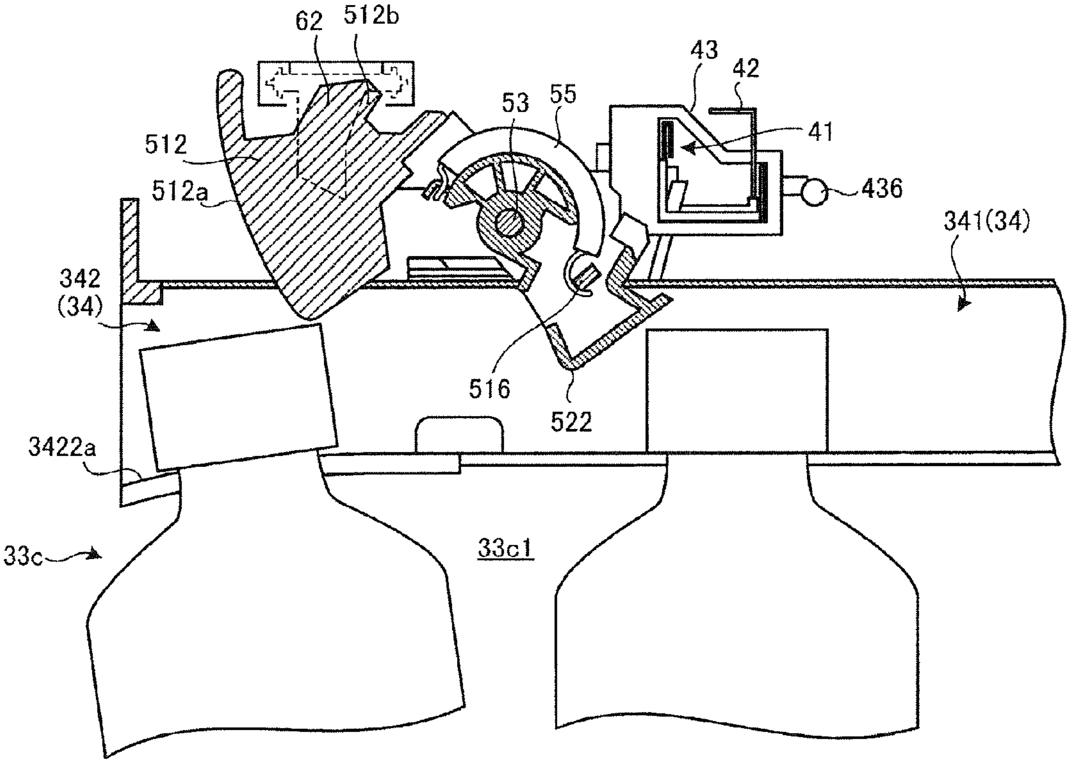
FIG. 53 is a longitudinal cross-sectional view of a commodity storage column configuring the plastic-bottled commodity rack, viewed from the right side.

When the user executes an extraction operation of pulling forward the foremost commodity stored any of the commodity storage columns 33 of the corresponding commodity rack 30, the extraction mechanism 50 operates as follows. As shown in FIG. 53, the first gate member 51 is turned upward against the biasing force of the gate spring member 54 so that the first tip end portion 512 retreats from the corresponding commodity storage passage 33*c*1. In this case, the second gate member 52 also is turned downward together with the first gate member 51 so that the second tip end portion 522 enters the commodity storage passage 33*c*1. As a result, the second tip end portion 522 of the second gate member 52 is brought to the position between the foremost commodity to be extracted and the second commodity from the front.

Figure 54:
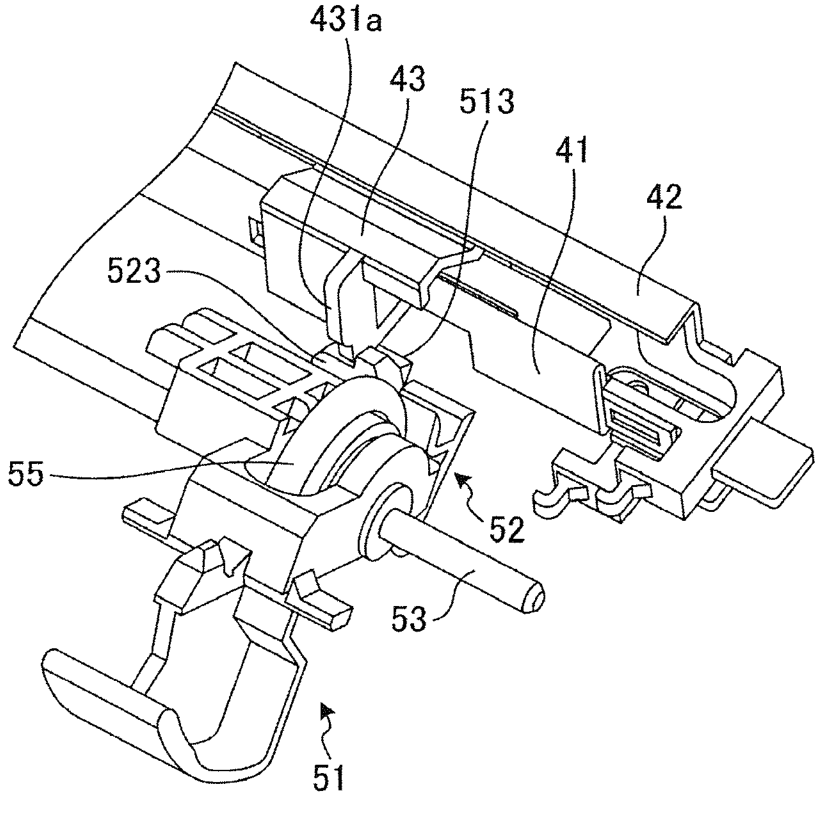
FIG. 54 is a perspective view showing the operations of the extraction mechanism in a state in which the first slide plate is moved from the reference position to the left.

Once the second gate member 52 is turned downward in this manner, the first gate member 51 is turned upward, and consequently the lock member 43 is biased by the lock spring member 436 and moves to the right, as shown in FIG. 54. Furthermore, the protruding piece 431*a* of the lock member 43 is brought to the position above the second engaging piece 523 of the second gate member 52, whereby the second gate member 52 is kept at its downwardly turned state. This also keeps the first gate member 51 at its upwardly turned state. According to such a configuration, because the commodity stored behind the second commodity that is located second from the front cannot be moved forward, forward extraction of the plurality of commodities in the same commodity storage column 33 can be restricted.

Moreover, the first gate member 51 that is turned upward allows the projection 512*b* of the first tip end portion 512 to enter the accommodation region 61*a* of the guide member 61 configuring the restricting means 60. As a result, the first gate members 51 of the extraction mechanisms 50 disposed in the other commodity storage columns 33 of the plastic-bottled commodity rack 30*c* cannot be turned upward after all because the projections 512*b* thereof are inhibited from entering the accommodation region 61*a* of the guide member 61 due to the presence of the bridge members 62. Thus, extraction of the commodities from the other commodity storage columns 33 of the same commodity rack 30 can be prevented.

The foremost commodity is extracted in the following posture. As described above, each rail member 34 is curved in which the front end portion 431 (downstream-side end portion) is gradually inclined downward and the restricting member 35 is provided in such a manner that the rear end portion 433 enters the corresponding commodity storage passage 33*c*1. Due to this configuration, the foremost commodity is kept in its upright posture without being extracted, but is extracted when tilted forward, as shown in FIG. 53. In other words, the restricting member 35 is provided in the lower region of the commodity storage passage 33*c*1, in front of the foremost commodity, prevents the upright foremost commodity from being extracted, and allows it to be extracted when tilted forward.

Once the user extracts the foremost commodity from a predetermined commodity storage column 33, the extraction detection sensor 5 disposed in this commodity storage column 33 detects this extraction, and sends a detection signal to the control means 100.

When the control means 100 receives the detection signal from the extraction detection sensor 5 and thereafter the outer door 2 is closed, switching the door switch 4 from the OFF state to the ON state (step S110: Yes, step S111: Yes), the control means 100 can recognize that the front surface opening of the main cabinet 1 is closed after the commodity is extracted.

The control means 100 that has recognized that the front surface opening is closed, then drives the locking/unlocking mechanism 3 into the locked state, and switches off the flickering light source 13*a* (step S112, step S113). The control means 100 then sends an extraction command output to the cash processing device 16, and sends a cancellation command to the motor M to drive the motor M (step S114, step S115).

In response to the extraction command output from the control means 100, the cash processing device 16 inputs the change to the coin return slot 17 if there is any, and sorts accommodates the cash equivalent to the price of the commodity, with respect to the types of money.

Furthermore, the support rod 44 is rotated clockwise to the "standby position," which is a predetermined stop position, by driving the motor M.

As a result of rotating the support rod 44, in the third switching cam member 45*c* the second projecting piece 45*c*2 connected to the first projecting piece 45*c*1 comes into abutment with the second slide abutting portion 424 of the second slide plate 42 as well. As a result, the second slide plate 42 moves to the left against the biasing force of the second slide spring member 425. Following the leftward movement of the second slide plate 42, the lock member 43 also moves to the left against the biasing force of the lock spring member 436 and is released from above the second gate member 52. Consequently, the upper region of the second gate member 52 is opened. Biased by the gate spring member 54, the first gate member 51 is turned downward and the second gate member 52 is turned upward. Then, the first tip end portion 512 of the first gate member 51 enters the commodity storage passage 33*c*1, while the second tip end portion 522 of the second gate member 52 retreats from the commodity storage passage 33*c*1. The commodities stored in the commodity storage passage 33*c*1 are then pushed forward by the pusher member 343.

Subsequently, the abutment between the second projecting piece 45*c*2 of the third switching cam member 45*c* and the first and second slide abutting portions 414 and 424 is cancelled by the rotation of the support rod 44. Consequently, the first slide plate 41 and the second slide plate 42 are biased by the first slide spring member 415 and the second slide spring member 425 and move to the right to return to the original states. The restricting piece 411*b* of the first slide plate 41 is then brought to below the first engaging piece 513 of the first gate member 51. Therefore, the first gate member 51 cannot be turned upward.

In a case where the mode detection switch 6 detects a predetermined position, i.e., the "standby position" (step S116: Yes), the control means 100 stops driving the motor M (step S117) and then returns the procedure to end this process. This can result in selling one commodity selected by the user.

On the other hand, in step S110, when the door switch 4 is switched from the OFF state to the ON state without the detection signal from the extraction detection sensor 5 (step S110: No, step S118: Yes), the control means 100 can recognize that the front surface opening of the main cabinet 1 is closed without having any commodity extracted.

The control means 100 that has recognized this then drives the locking/unlocking mechanism 3 into the locked state, and switches off the flickering light source 13*a* (step S119, step S120). Subsequently, the control means 100 sends an unextraction command output to the cash processing device 16 (step S121). In response to the unextraction command output from the control means 100, the cash processing device 16 pays the input coins into the coin return slot 17.

The control means 100 that has sent the unextraction command output then sends a cancellation command, drives the motor M (step S122), executes steps S116 and S117 described above, returns the procedure, and ends this process.

Next is described the foregoing step S103 in which the rack selection button 13 associated with the second commodity rack 30 from the top (the bottled commodity rack 30*b*) is pushed. In this case, in steps S105 to S107, the motor M is driven until the mode detection switch 6 detects the "120-degree rotated position." Thus, the support rod 44 is rotated clockwise by 120 degrees from the standby position, causing the first projecting piece 45*b*1 of the second switching cam member 45*b* to come into abutment with the first slide abutting portion 414 of the first slide plate 41. Consequently, the first slide plate 41 moves to the left against the biasing force of the first slide spring member 415, as with the result shown in FIG. 52.

Once the first slide plate 41 moves to the left, the restricting piece 411*b* of the first slide plate 41 is released from the lower region of the first engaging piece 513 of the first gate member 51, bringing the cutout portion 412*a* in place and opening the lower region of the first engaging piece 513. As a result, although biased by the gate spring member 54, the first gate member 51 of each of the extraction mechanisms 50 in the bottled commodity rack 30*b* can be turned upward freely.

Incidentally, in the commodity racks 30 other than the second commodity rack 30 from the top, the switching cam members 45 (the first switching cam member 45*a*, the third switching cam member 45*c*, the fourth switching cam member 45*d*) that are mounted at the same levels as the respective commodity racks 30 are not in abutment with the first slide abutting portions 414. Therefore, in each of the commodity racks 30 other than the second commodity rack from the top, the first gate member 51 of the extraction mechanism 50 disposed in each commodity storage column 33 is restricted by the first slide plate 41.

Figure 55:
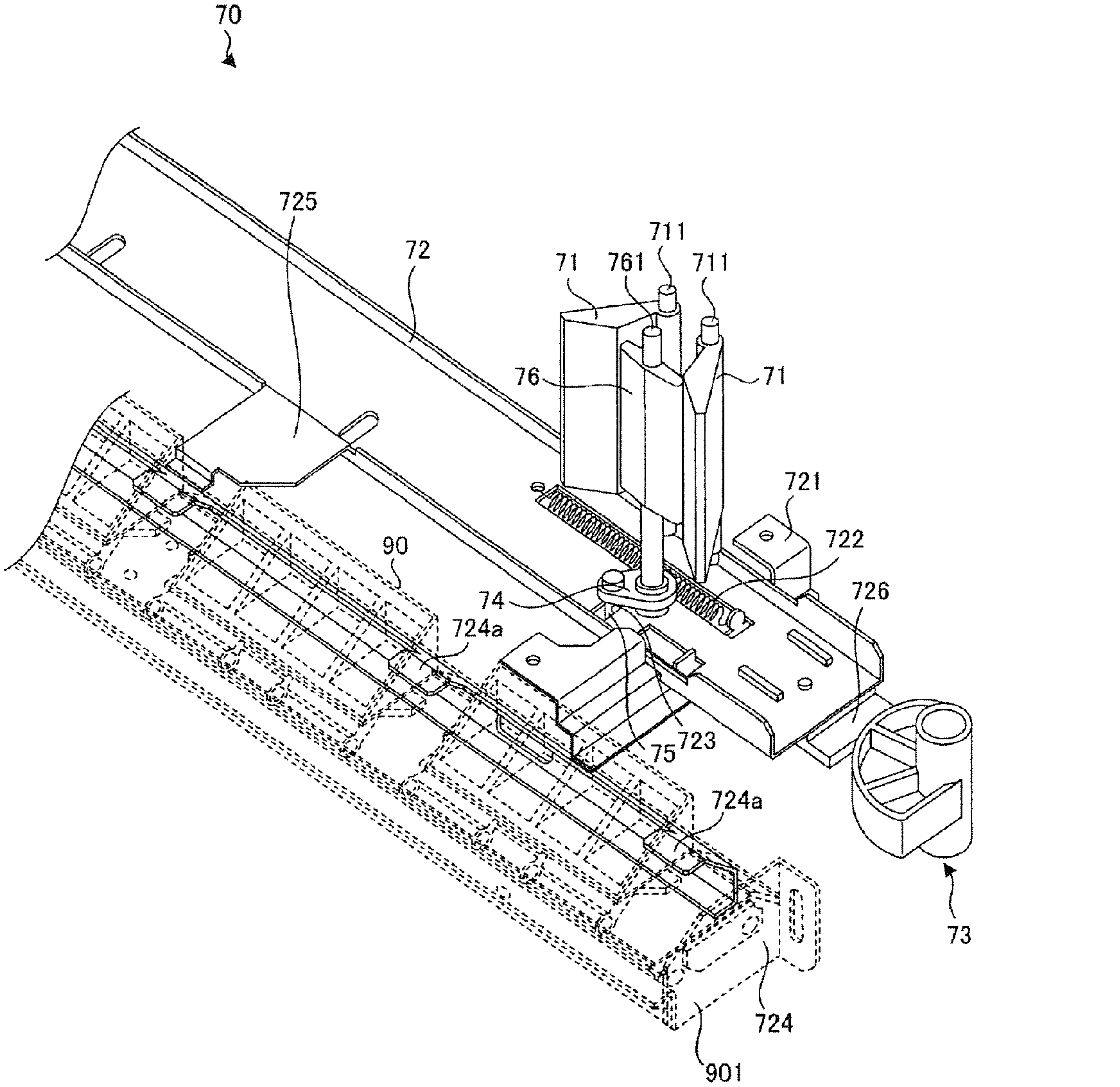
FIG. 55 is a perspective showing the operations of the flapper mechanism shown in FIG. 41, with some of the components omitted.
Figure 56:
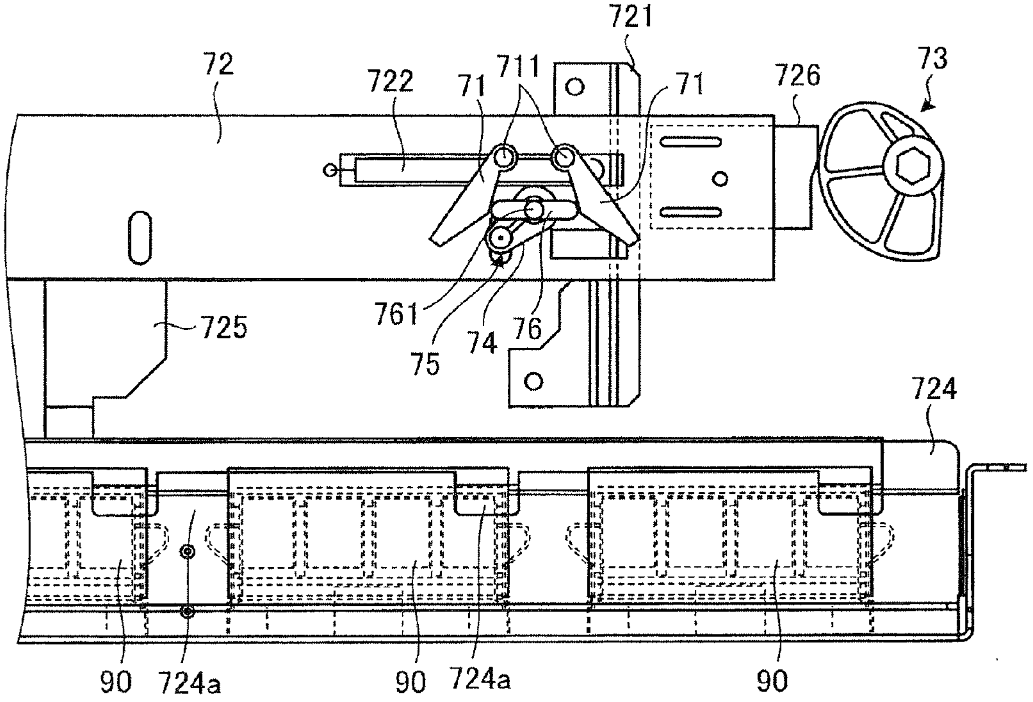
FIG. 56 is a plan view showing the operations of the flapper mechanism shown in FIG. 41, with some of the components omitted.
Figure 57:
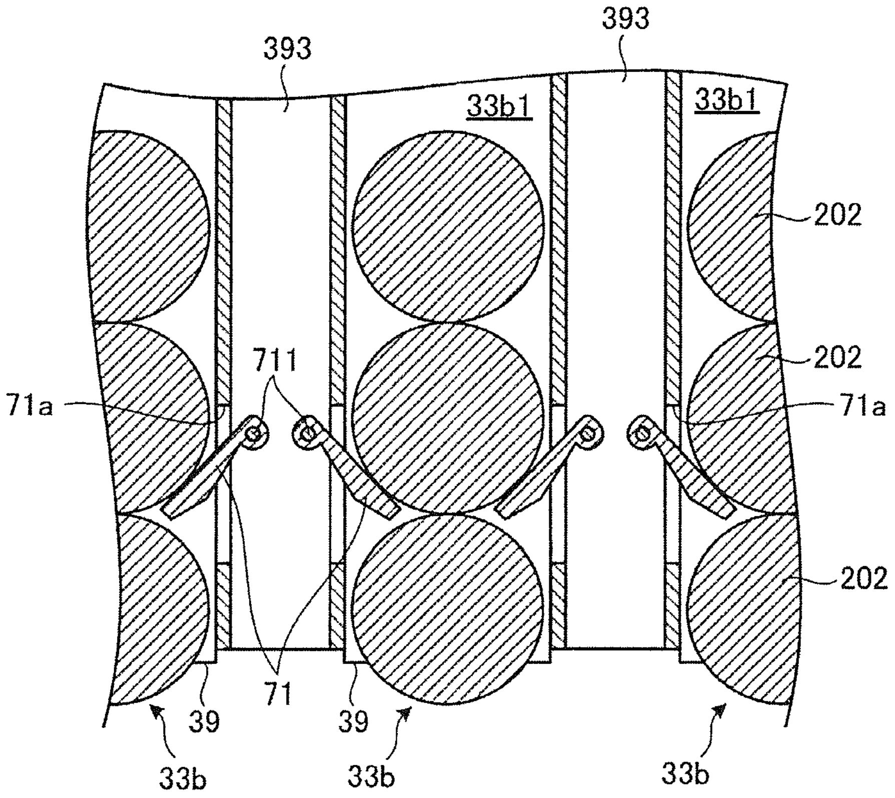
FIG. 57 is a plan view schematically showing a commodity storage passage of the bottled commodity rack.

Also, because the support rod 44 is rotated 120 degrees from the standby position, the flapper cam member 73 comes into abutment with the flapper slide abutting portion 726, causing the flapper slide plate 72 to move to the left against the biasing force of the flapper slide spring member 722, as shown in FIGS. 55 and 56. Once the flapper slide plate 72 moves to the left in this manner, the pin member 75 inserted through the long hole 723 of the flapper slide plate 72 moves to the left together with the flapper slide plate 72. As a result, the flapper guide plate 76 that is coupled to the pin member 75 by the coupling bracket 74 is rotated by, for example, 90 degrees about the central axis of the flapper guide shaft 761 together with the flapper guide shaft 761, and comes into abutment with the flapper members 71. As a result, the flapper members 71 enter the corresponding commodity storage passages 33*b*1 through the flapper openings 71*a*, as shown in FIG. 57. These flapper members 71 entering the commodity storage passages 33*b*1 and the flapper members 71 of the adjacent bottle partition plate 393 enter the respective commodity storage passages 33*b*1 to come into abutment with the lower parts of the second commodities 202, preventing the second commodities 202 from moving forward (toward the downstream side).

Moreover, moving the flapper slide plate 72 to the left moves the stopper restricting plate 724 to the left as well, the stopper restricting plate 724 being integrated with the flapper slide plate 72 by the coupling portion 725. When the stopper restricting plate 724 is moved to the left, the stopper pieces 724*a* enter the turning regions of the stopper members 90, as shown in FIGS. 55 and 56. This prevents the stopper members 90 from retreating from the commodity storage passages 33*b*1 against the biasing forces of the stopper spring members 903. In other words, the stopper members 90 are provided on the downstream side of the most downstream commodities 202 with respect to the commodity storage columns 33 of the target bottled commodity rack 30*b* in such a manner as to be able to enter and retreat from the commodity storage passages 33*b*1. In the normal state, the stopper members 90 enter the commodity storage passages 33*b*1 so as to be able to retreat therefrom. On the other hand, when extraction of the commodities in the commodity rack 30 is enabled, the stopper members 90 enter the commodity storage passages 33*b*1 while being prevented from retreating therefrom.

When the user executes an extraction operation of pulling forward the foremost commodity 202 stored in any of the commodity storage columns 33*b* of the bottled commodity rack 30*b*, the extraction mechanism 50 operate as follows. As shown in FIG. 58, the first gate member 51 is turned upward against the biasing force of the gate spring member 54 so that the first tip end portion 512 retreats from the corresponding commodity storage passage 33*b*1. In this case, the second gate member 52 is also turned downward together with the first gate member 51 so that the second tip end portion 522 enters the commodity storage passage 33*b*1. As a result, the second tip end portion 522 of the second gate member 52 is brought to the position between the foremost commodity 202 to be extracted and the second commodity 202.

Once the second gate member 52 is turned downward in this manner, the first gate member 51 is turned upward, and the lock member 43 is biased by the lock spring member 436 and moves to the right. Then, the protruding piece 431*a* of the lock member 43 is brought to the position above the second engaging piece 523 of the second gate member 52, whereby the second gate member 52 is kept at its downwardly turned state. This also keeps the first gate member 51 at its upwardly turned state.

Because the second gate member 52 is kept at its downwardly turned state, and the flapper members 71 enter the commodity storage passages 33*b*1, the commodity 202 stored behind the second commodity 202 cannot be moved forward, preventing the plurality of commodities from being extracted forward from the same commodity storage column 33.

In the first gate member 51 that is turned upward, the projection 512*b* of the first tip end portion 512 enters the accommodation region 61*a* of the guide member 61 configuring the restricting means 60. As a result, the first gate members 51 of the extraction mechanisms 50 disposed in the other commodity storage columns 33*b* of the bottled commodity rack 30*b* cannot be turned upward after all because the projections 512*b* thereof are inhibited from entering the accommodation region 61*a* of the guide member 61 due to the presence of the bridge members 62. Moreover, due to the presence of the stopper pieces 724*a* in the turning regions of the stopper members 90, the stopper members 90 are restricted from retreating from the commodity storage passages 33*b*1. This prevents the commodities of the other commodity storage columns 33 of the same commodity rack 30 from being extracted.

In this case, the foremost commodity is extracted in the following manner. As described above, due to the presence of the stopper pieces 724*a* in the turning regions of the stopper members 90, the stopper members 90 are restricted from retreating from the commodity storage passages 33*b*1. This allows the foremost commodities 202 to be extracted when tilted forward, instead of being extracted when upright.

Sales of the commodities stored in the plastic-bottled commodity rack 30*c* and the bottled commodity rack 30*b* was described. However, in the canned commodity rack 30*a* as well, the commodities stored behind the second commodities can be prevented from moving forward, and forward extraction of the plurality of commodities stored in a single commodity storage column 33*a* is restricted, by the same configuration as that of the bottled commodity rack 30*b* in which the flapper members 71 enter the commodity storage passages 33*a*1 and the second gate members 52 are kept at their downwardly turned states. Because the second gate members 52' are kept at their downwardly turned states as a result of the operation of extracting the forward commodities, forward extraction of the plurality of commodities stored in the same commodity storage column 33 can be restricted.

In the commodity storage device 20 according to Embodiment 1 of the present invention described above, when held in the commodity storage passages 33*a*1, 33*b*1 in the normal state, the first gate members 51 restrict extraction of the most downstream commodities (the foremost commodities)

located on the most downstream side. However, when released from the commodity storage passages 33*a*1, 33*b*1, the first gate members 51 retreat from the commodity storage passages 33*a*1, 33*b*1 as a result of an extraction operation on the most downstream commodities, to allow the most downstream commodities to be extracted. When the first gate members 51 are restricted in their state of entering the commodity storage passages 33*a*1, 33*b*1, the second gate members 52 (52') retreat from the commodity storage passages 33*a*1, 33*b*1. When the first gate members 51 retreat from the commodity storage passages 33*a*1, 33*b*1, the second gate members 52 (52') enter the commodity storage passages 33*a*1, 33*b*1 to restrict the second commodities adjacent to the upstream sides of the most downstream commodities from moving toward the downstream side. Furthermore, the flapper members 71, which are provided on the partition plates 373, 393 of the side walls of the commodity storage passages 33*a*1, 33*b*1 in such a manner as to be able to turn by entering and retreating from the commodity storage passages 33*a*1, 33*b*1, retreat from the commodity storage passages 33*a*1, 33*b*1 when the first gate members 51 are restricted in their state of entering the commodity storage passages 33*a*1, 33*b*1. On the other hand, when the state of the first gate members 51 of entering the commodity storage passages 33*a*1, 33*b*1 is cancelled, the flapper members 71 enter the commodity storage passages 33*a*1, 33*b*1 and come into abutment with the lower parts of the second commodities to restrict the second commodities from moving toward the downstream side. Such a configuration can prevent the commodities stored in the commodity storage columns 33 from being extracted when the first gate members 51 are kept in their state of entering the commodity storage passages 33*a*1, 33*b*1. Then, when the first gate members 51 retreat from the commodity storage passages 33*a*1, 33*b*1, the second gate members 52 (52') enter the commodity storage passages 33*a*1, 33*b*1 to restrict the second commodities from moving toward the downstream side, while the flapper members 71 enter the commodity storage passages 33*a*1, 33*b*1 and come into abutment with the lower parts of the second commodities to restrict the second commodities from moving toward the downstream side. This allows the most downstream commodities to be extracted while having the second commodities restricted from moving toward the downstream side. Letting the user to execute the commodity extraction operation in this manner can accomplish cost reduction without using the buckets or the bucket drive means of the conventional automatic vending machines. In addition, because the second gate members 52 (52') and the flapper members 71 enter the commodity storage passages 33*a*1, 33*b*1 when the first gate members 51 retreat from the commodity storage passages 33*a*1, 33*b*1, the commodities can be extracted one by one from the commodity storage columns 33.

Thus, according to the commodity storage device 20 described above, the commodities stored in the commodity storage columns 33 can securely be extracted one by one, while realizing cost reduction.

Furthermore, in this commodity storage device 20, the extraction mechanisms 50 provided for the respective commodity storage columns 33 restrict the commodities stored in the commodity storage columns 33 from being extracted during the normal state, but allow only the foremost commodities to be extracted in response to the foremost commodity extraction operations when extraction of the commodities in the corresponding commodity rack 30 is enabled. Then, the restricting means 60 provided in the corresponding commodity rack 30 allows any one of the extraction mechanisms 50 to be operated, and restricts the other extraction mechanisms 50 of the commodity rack 30 from being operated. Moreover, the stopper members 90 are provided on the downstream side of the foremost commodities of the respective commodity storage columns 33 of the target commodity rack 30 in such a manner as to be able to enter and retreat from the respective commodity storage passages 33*b*1. In the normal state, the stopper members 90 enter the respective commodity storage passages 33*b*1 so as to be able to retreat therefrom. When, on the other hand, extraction of the commodities of the commodity rack 30 is allowed, the stopper members 90 enter the commodity storage passages 33*b*1 while being restricted from retreating therefrom. Without using the bucket drive means of the conventional commodity storage devices, such a configuration can prevent the plurality of commodities from being extracted in a single extraction operation by the user. Therefore, this configuration can prevent a plurality of commodities from being extracted form a single commodity rack in a single extraction operation, while realizing cost reduction.

The commodity storage device 20 brings about the following effects.

The commodity storage columns 33*a* are each configured in such a manner that the distance between the can guide member 36 and the can stand portion 37 can be adjusted arbitrarily. Therefore, the size of each commodity storage passage 33*a*1 can be adjusted depending on the size of a canned beverage commodity to be stored, which provides excellent versatility.

Each of the cover members 395 mounted on the front end surfaces of the bottle partition plates 393 has the depressed portion 395*a* formed in a part corresponding to the upper part of the body portion 2022 of the target commodity (bottled beverage commodity) 202 stored in the corresponding commodity storage passage 33*b* 1. This depressed portion 395*a* can function as a guide that holds the body portion 2022 of the commodity 202, enabling easy extraction of the commodity 202. The depressed portion 395*a* also prevents the entire commodity from being clutched, preventing a plurality of commodities from being instantly pulled out in a malicious manner.

The attachment members 383*a* mounted on the bottle pusher members 383 can increase the areas pressed by the bottle pusher members 383 and stabilize the upright postures of the long commodities (e.g., bottled beverage commodities, etc.). Thus, while making the pusher members themselves made common to the other commodity racks, the attachment members 383*a* can be provided in accordance with the shape of the commodities. Standardization of the pusher members, therefore, can realize reduction in manufacturing cost.

<Embodiment 2>

Figure 59:
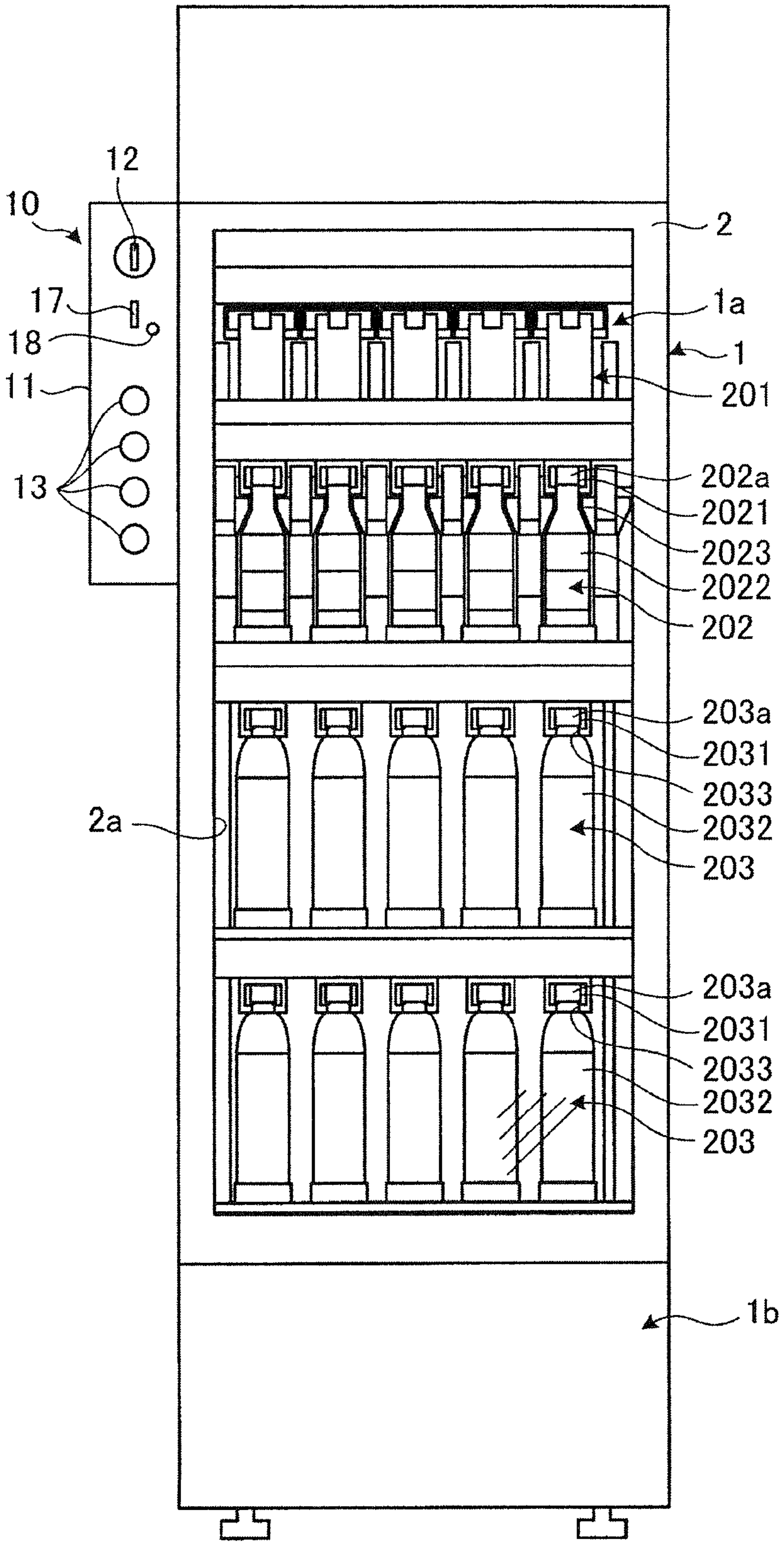
FIG. 59 is a front view showing an automatic vending machine to which a commodity storage device according to Embodiment 2 of the present invention is applied.
Figure 60:
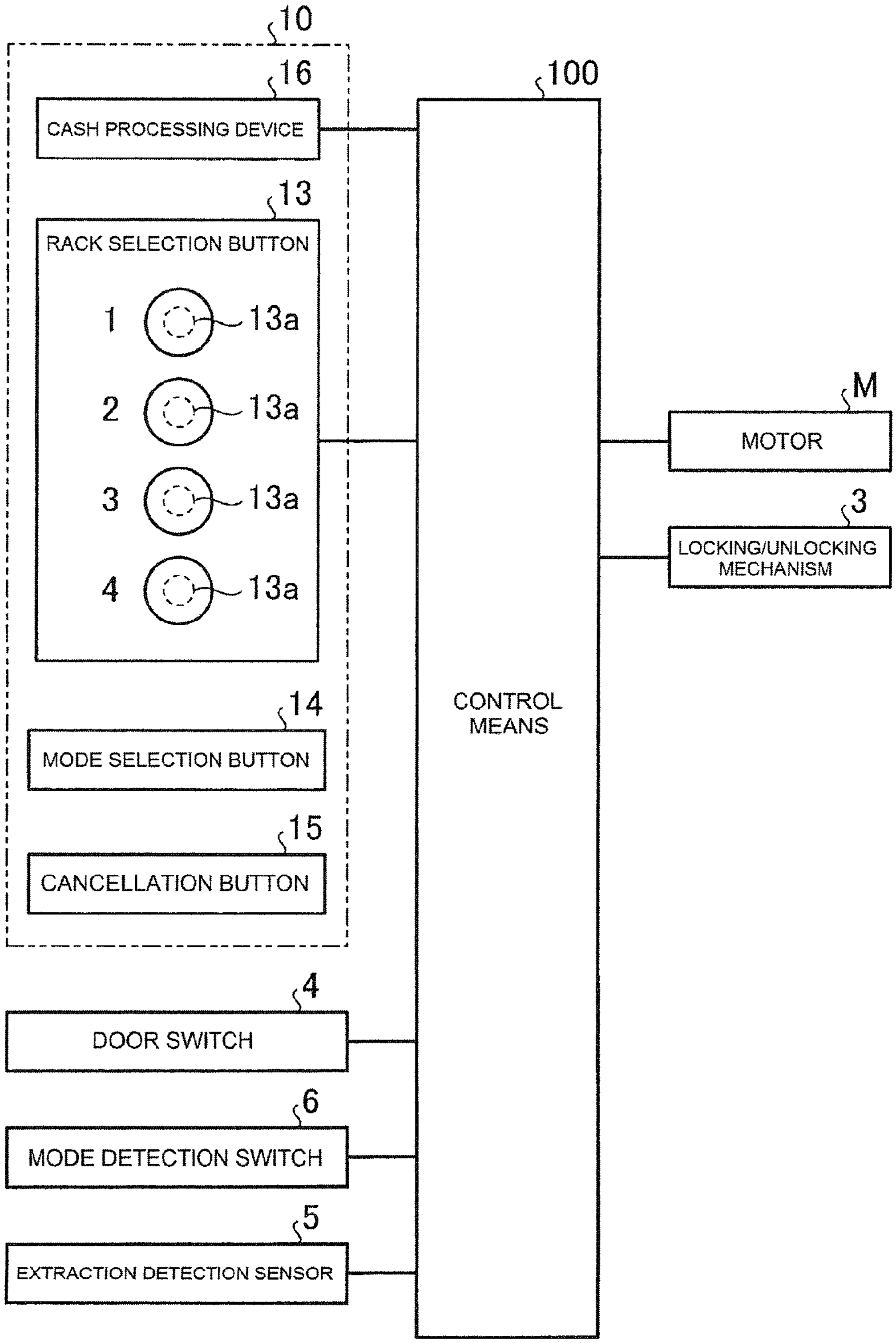
FIG. 60 is a block diagram showing a control system of the automatic vending machine to which the commodity storage device according to Embodiment 2 of the present invention is applied.

FIGS. 59 and 60 each show an automatic vending machine to which a commodity storage device according to Embodiment 2 of the present invention is applied, FIG. 59 being a front view and FIG. 60 a block diagram showing a control system. In the following description of the commodity storage device according to Embodiment 2, the parts with the same configurations as those of the commodity storage device of Embodiment 1 are denoted the same reference numerals, and the overlapping descriptions are omitted accordingly.

The automatic vending machine illustrated here sells cooled or heated commodities such as canned beverages, bottled beverages, and plastic-bottled beverages, and has a main cabinet 1.

Figure 61:
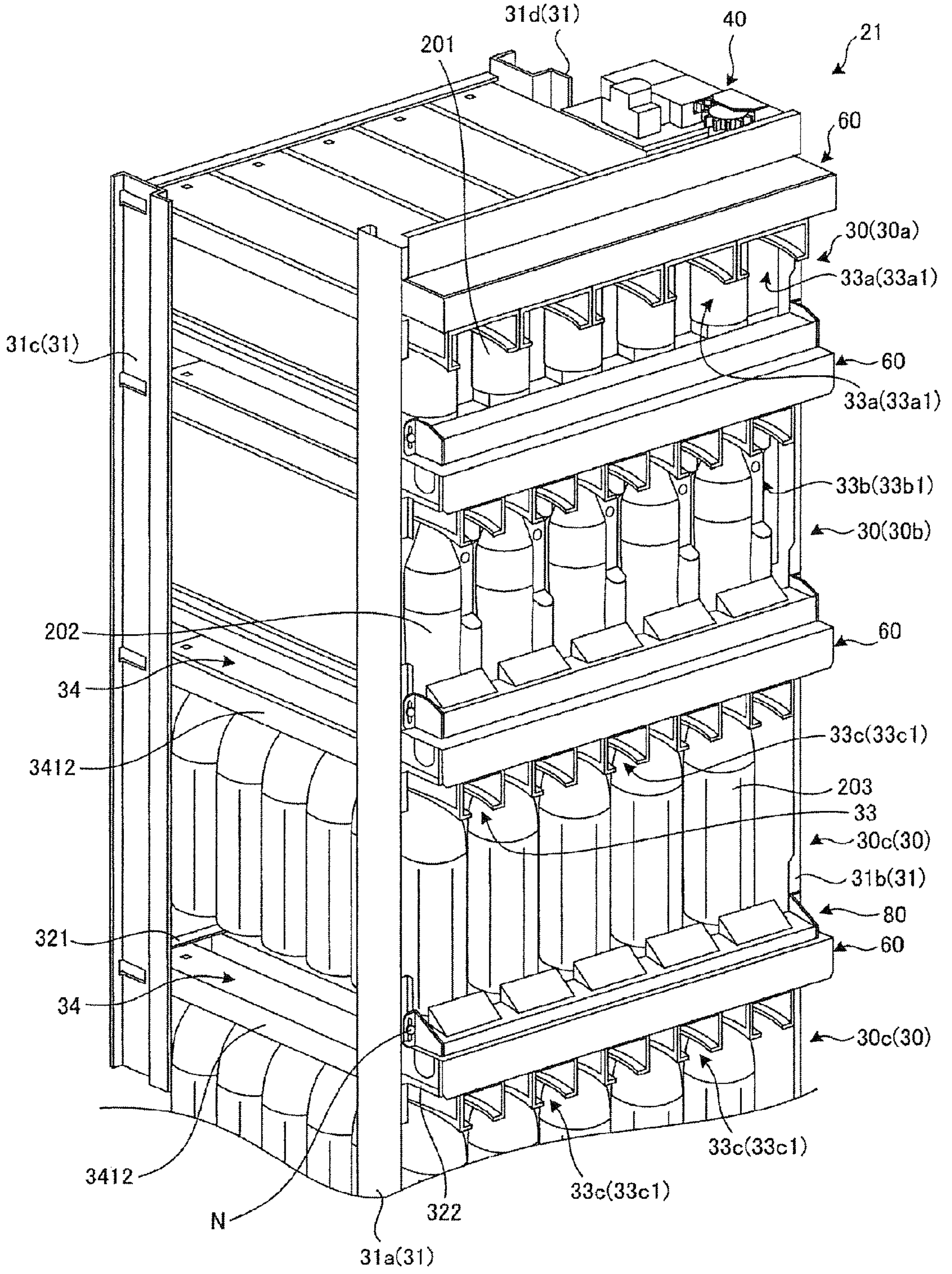
FIG. 61 is a perspective view showing an enlargement of the commodity storage device shown in FIG. 59, with some of the components omitted.

A storage room 1*a* of the main cabinet 1 is provided with a commodity storage device 21. FIG. 61 is a perspective view showing the commodity storage device 21 of the automatic vending machine shown in FIG. 59, with some of the components omitted.

As shown in FIG. 61 as well, the commodity storage device 21 is configured by commodity racks 30, a rack selection mechanism 40, extraction mechanisms 50, restricting means 60, and a posture restricting mechanism 80.

There are a plurality of commodity racks 30 (four, in the illustrated example) provided in the commodity storage device 21. The top commodity rack 30 is for storing canned beverage commodities, the second commodity rack 30 from the top for bottled beverage commodities, and both the third commodity rack 30 from the top and the bottom commodity rack 30 for plastic-bottled beverage commodities.

Figure 62:
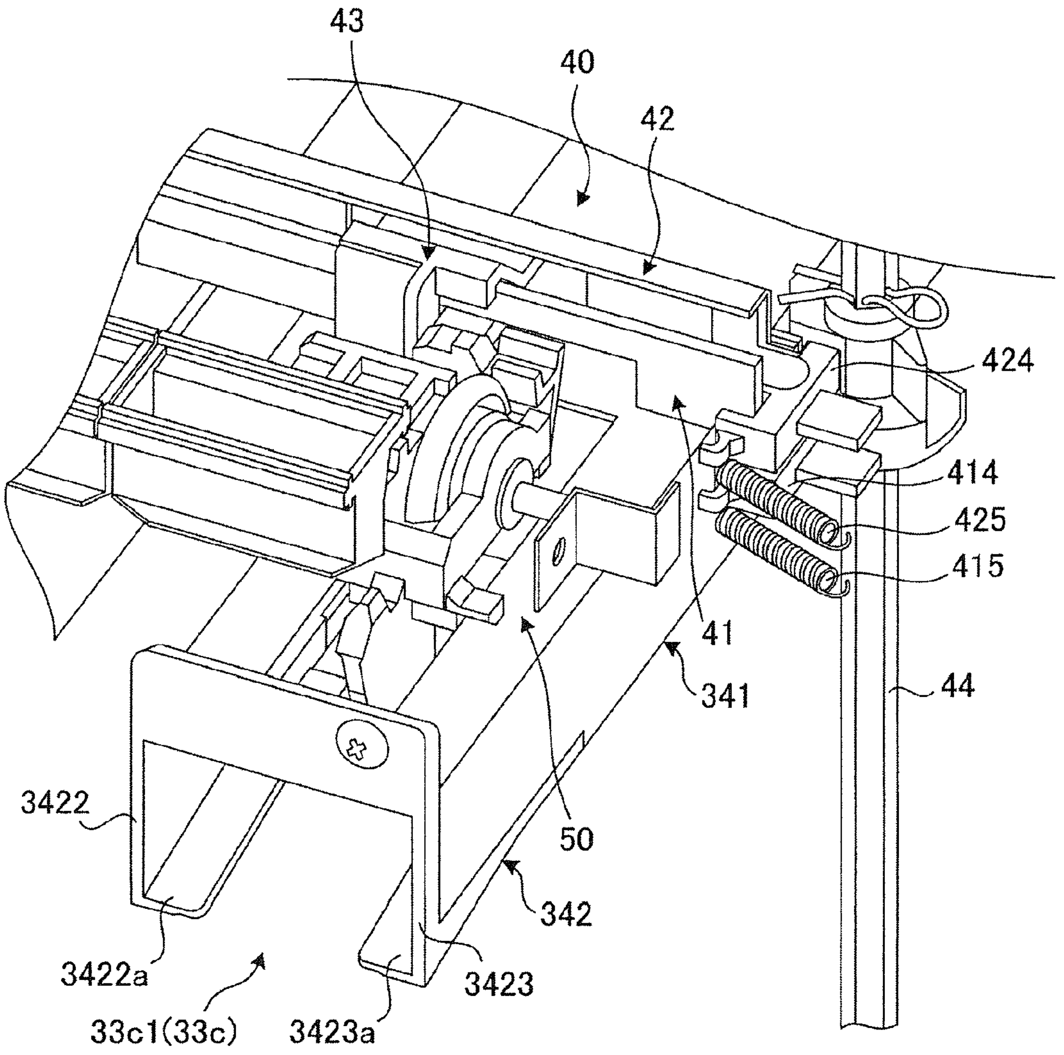
FIG. 62 is a perspective view showing an enlargement of the substantial portions of a circumferential structure of a third commodity rack from the top shown in FIG. 61, with some of the components omitted.

FIG. 62 is a perspective view showing an enlargement of the substantial portions of a circumferential structure of the third commodity rack 30 from the top (the plastic-bottled commodity rack 30*c*) shown in FIG. 61, with some of the components omitted. As shown in FIG. 62 as well, the rack selection mechanism 40 is configured by a first slide plate 41, a second slide plate 42, a lock member 43, and a support rod 44. Although the circumferential structure of the plastic-bottled commodity rack 30*c* is shown here, the rack selection mechanism 40 has the same configuration throughout the commodity racks 30.

Figure 63:
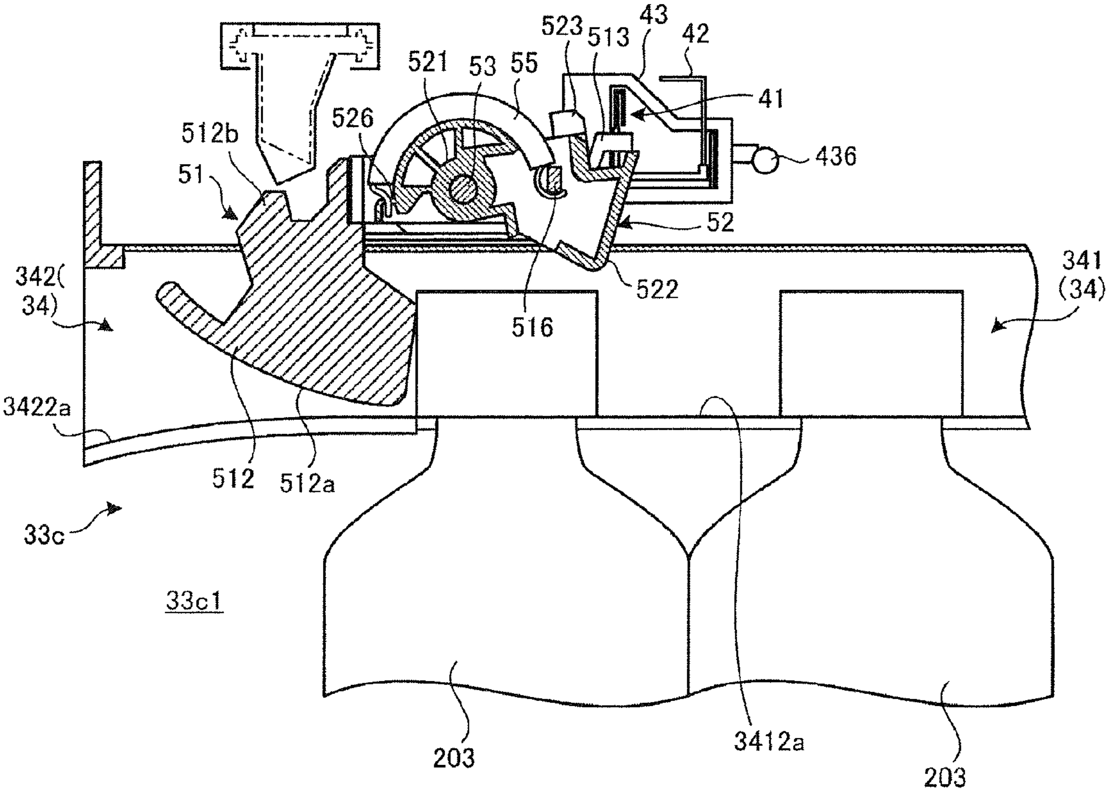
FIG. 63 is a schematic longitudinal cross-sectional diagram of a commodity storage column configuring the third commodity rack from the top, viewed from the right side.

FIG. 63 is a schematic longitudinal cross-sectional diagram of a commodity storage column 33*c* configuring the plastic-bottled commodity rack 30*c*, viewed from the right side. As shown in FIG. 63 as well, the extraction mechanisms 50 are each provided in a commodity storage column 33*c*. Each of the extraction mechanisms 50 is configured by a first gate member 51 and a second gate member 52.

Figure 64:
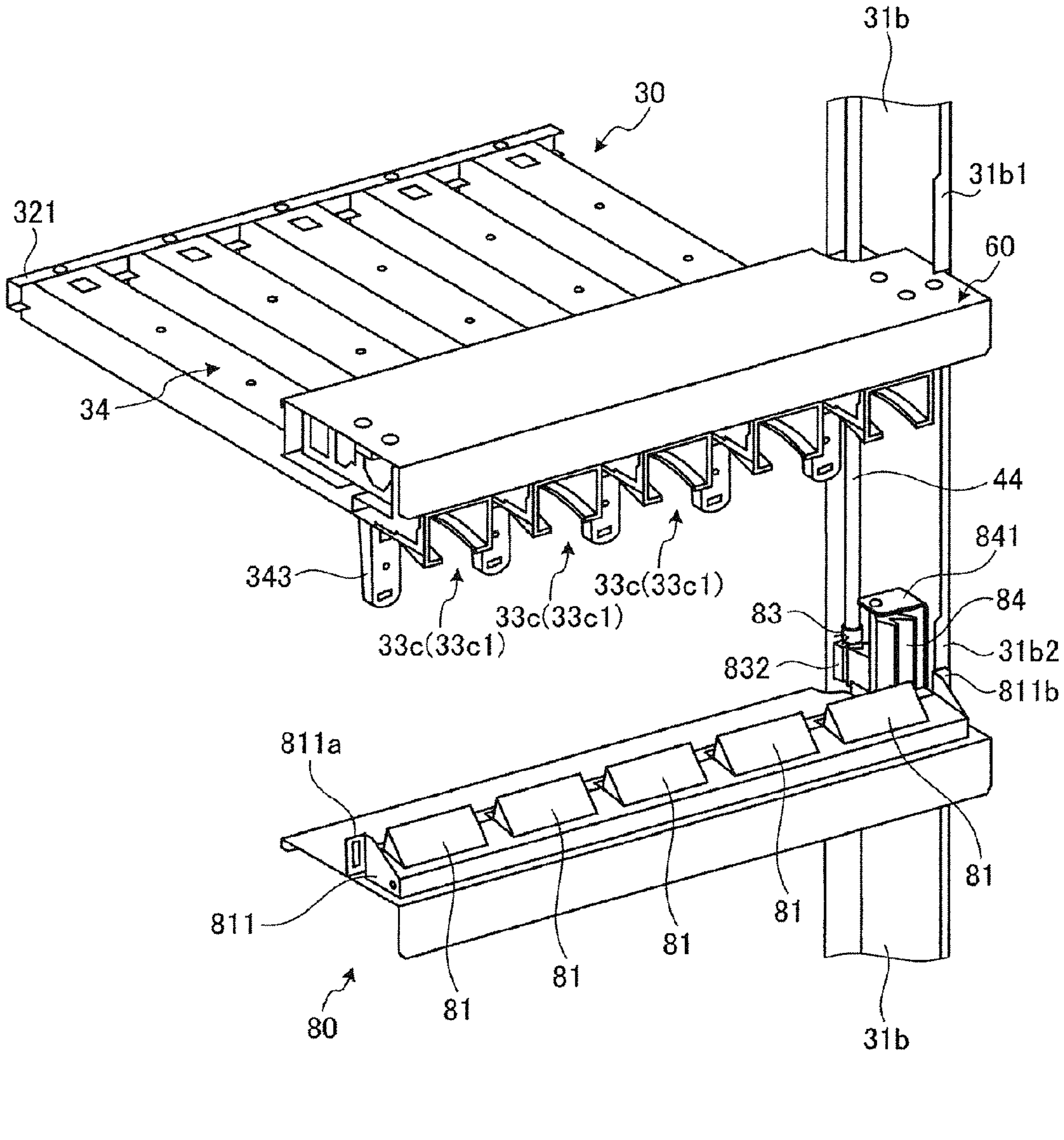
FIG. 64 is a perspective view showing the principal portions of the third commodity rack from the top.
Figure 65:
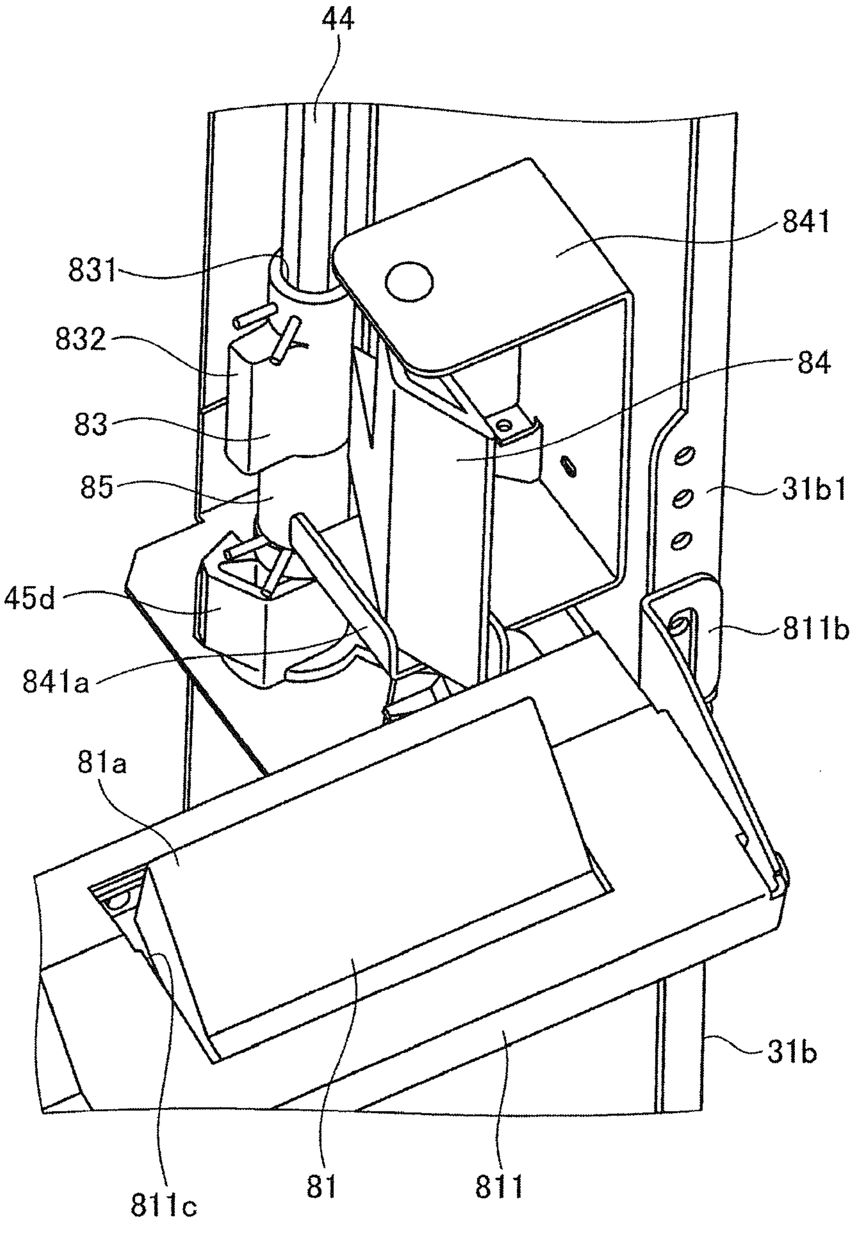
FIG. 65 is a perspective view showing, from above, an enlargement of the substantial portions of the commodity rack shown in FIG. 64.
Figure 66:
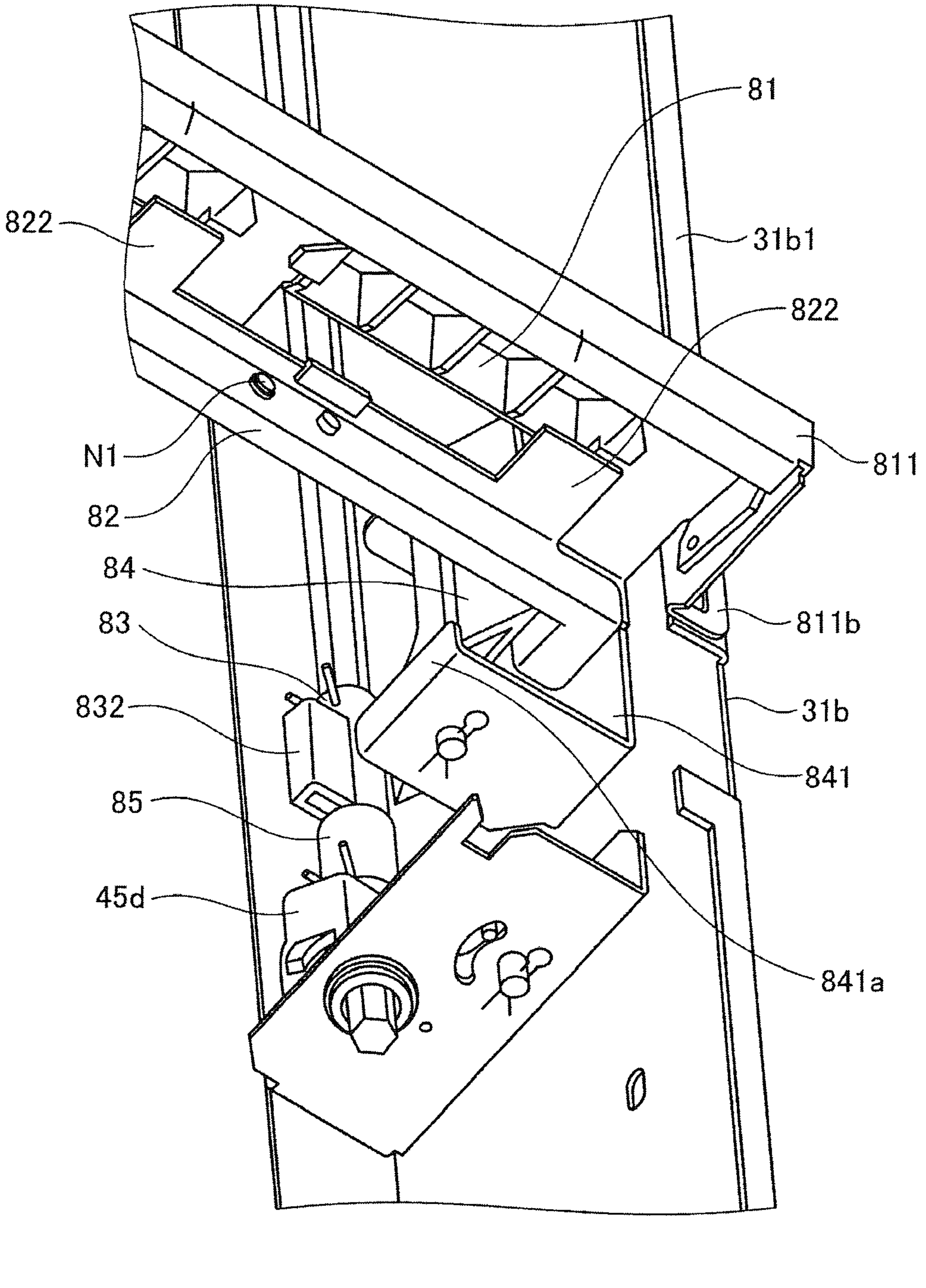
FIG. 66 is a perspective view showing, from below, an enlargement of the substantial portions of the commodity rack shown in FIG. 64.

FIG. 64 is a perspective view showing the principal portions of the third commodity rack 30 from the top (the plastic-bottled commodity rack 30*c*). FIG. 65 is a perspective view showing, from above, an enlargement of the substantial portions of the commodity rack 30 shown in FIG. 64. FIG. 66 is a perspective view showing, from above, an enlargement of the substantial portions of the commodity rack 30 shown in FIG. 64.

The posture restricting mechanism 80 illustrated here is configured by a restricting member 81, a restricting lock member 82, a lock cam member 83, and a link member 84. The posture restricting mechanism 80 of the third commodity rack 30 from the top is now described; however, the posture restricting mechanism 80 of the same configuration is provided in the bottom commodity rack 30 as well. Thus, the description of the posture restricting mechanism provided in the bottom commodity rack 30 is omitted. Only the posture restricting mechanism 80 provided in the third commodity rack 30 from the top is now described.

The restricting member 81 is provided to correspond to each of the commodity storage columns 33*c*. The restricting member 81 is made of, for example, resin and is provided at a front end portion (downstream-side end portion) of a commodity storage passage 33*c*1 of each commodity storage column 33*c*, i.e., a front-side section (downstream-side section) in front of the foremost commodity (the most downstream commodity). The restricting member 81 is described hereinafter in detail.

The restricting member 81 is supported turnably by a restricting base member 811 formed from a steel plate. The restricting base member 811 is a long object whose crosswise direction is the longitudinal direction, and is mounted by fastening its left and right end portions 811*a*, 811*b* onto front surfaces 31*a*1, 31*b*1 of a left front rack support side plate 31*a* and a right front rack support side plate 31*b* with fastening members. A rod-like restricting shaft portion 812 extends in the crosswise direction across the restricting base member 811, wherein the restricting shaft portion 812 is inserted through the restricting member 81. This restricting member 81 is capable of turning about the central axis of the restricting shaft portion 812, and is biased by a restricting spring member (biasing means) 813 so that a rear end portion 81*a* thereof, in the normal state, enters the corresponding commodity storage passage 33*c*1 through a restricting opening 811*c* of the restricting base member 811.

When the restricting member 81 is biased by the restricting spring member 813 and consequently the rear end portion 81*a* enters the commodity storage passage 33*c*1, an upper surface of the restricting member 81 forms an inclination surface that is inclined gradually downward toward the front, as shown in FIGS. 64 and 65. In such a state in which the rear end portion 81*a* enters the commodity storage passage 33*c*1, the restricting member 81 restricts the foremost commodity 203 from being extracted forward when upright.

Figure 67:
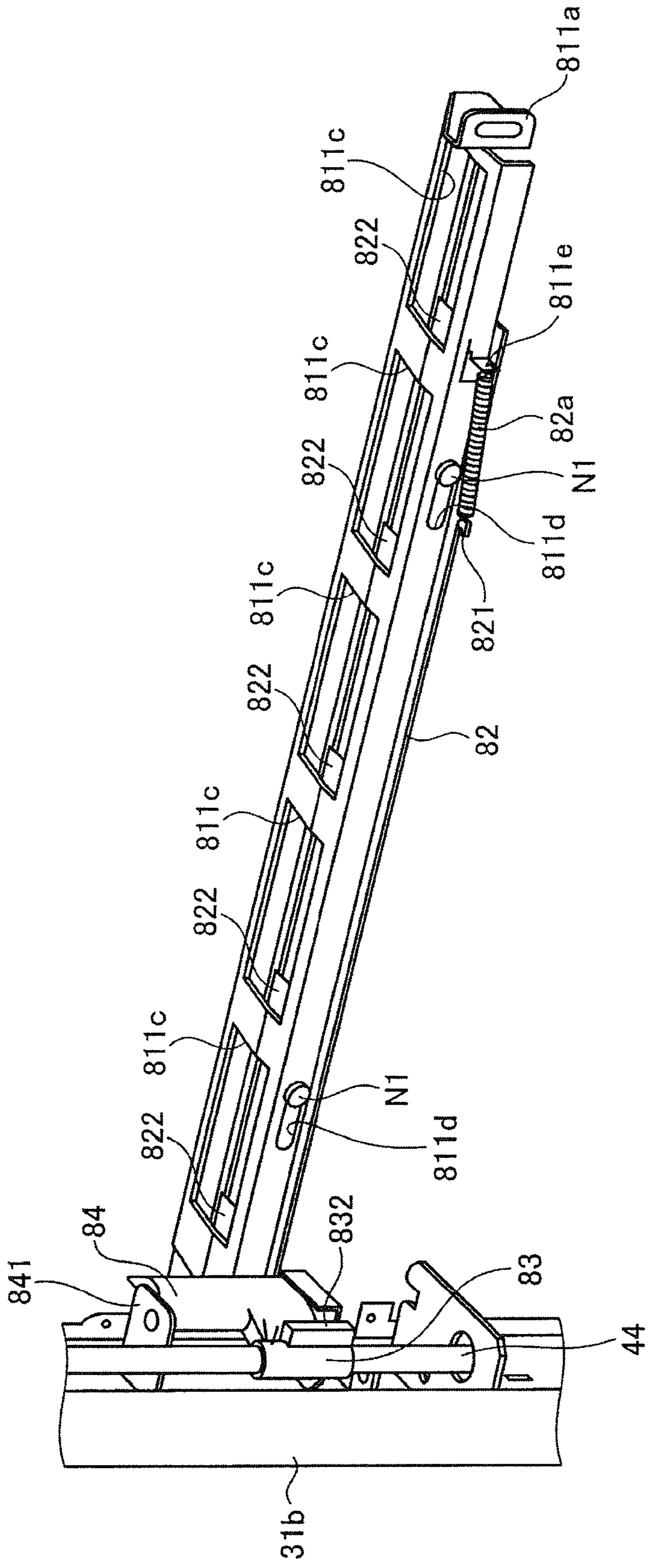
FIG. 67 is a perspective view showing, from behind, the substantial portions of a posture restricting mechanism shown in FIG. 64.

The restricting lock member 82 is configured by bending, for example, a steel plate or the like into a long object whose crosswise direction is the longitudinal direction. As shown in FIG. 67, the restricting lock member 82 is disposed in such a manner as to be able to slide along the crosswise direction in the restricting base member 811, by inserting screw (stepped screw) members N1 provided on the restricting lock member 82 through long holes 811*d* of the restricting base member 811.

A restricting lock spring member 82*a* has its one end engaged with a spring engaging piece 811*e* of the restricting base member 811 and has the other end engaged with an engaging piece 821 of the restricting lock member 82 that projects rearward. Due to this configuration, the restricting lock member 82 is constantly biased to the left by the restricting lock spring member 82*a*. When only the biasing force of the restricting lock spring member 82*a* acts, a lock piece 822 formed in the restricting lock member 82 is placed in the left end position facing the restricting opening 811*c* from below. In addition, an abutting piece 823 that projects upward is provided at a right end of the restricting lock member 82.

The lock cam member 83 is mounted on the support rod 44 onto which the switching cam members 45 are mounted. More specifically, the lock cam member 83 is mounted in such a manner that the support rod 44 passes through a hexagonal through-hole 831 of the lock cam member 83. This lock cam member 83, which is the lock cam member 83 configuring the posture restricting mechanism 80 of the third commodity rack 30 from the top, is disposed above the fourth switching cam member 45*d*, with a spacer 85 therebetween. Note that the lock cam member configuring the posture restricting mechanism of the bottom commodity rack 30 is disposed at a predetermined level below the fourth switching cam member 45*d*. A cam protruding piece 832 that protrudes radially outward is formed in the lock cam member 83.

The link member 84, formed from, for example, a resin material, is supported by a link base member 841 and provided in such a manner as to be able to rotate about the central axis of its own shaft-like portion 842. The link base member 841 here is formed by appropriately bending a steel plate and is mounted on the right front rack support side plate 31*b* with a screw or the like.

When viewed from above, the link member 84 is biased clockwise by the link spring member 843 interposed between the link member 84 and the link base member 841, and is located at a reference position where the link member 84 abuts with an upper extension piece 841*a* of the link base member 841.

Figure 68:
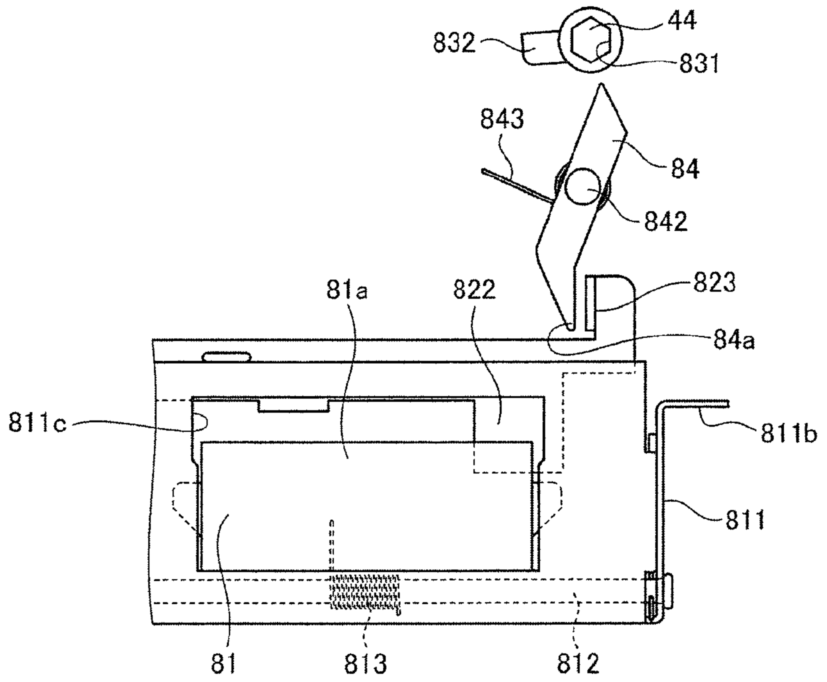
FIG. 68 is an explanation drawing of an enlargement of the substantial portions of the posture restricting mechanism, viewed from above, showing a positional relationship obtained when a mode detection switch detects "standby position."
Figure 69:
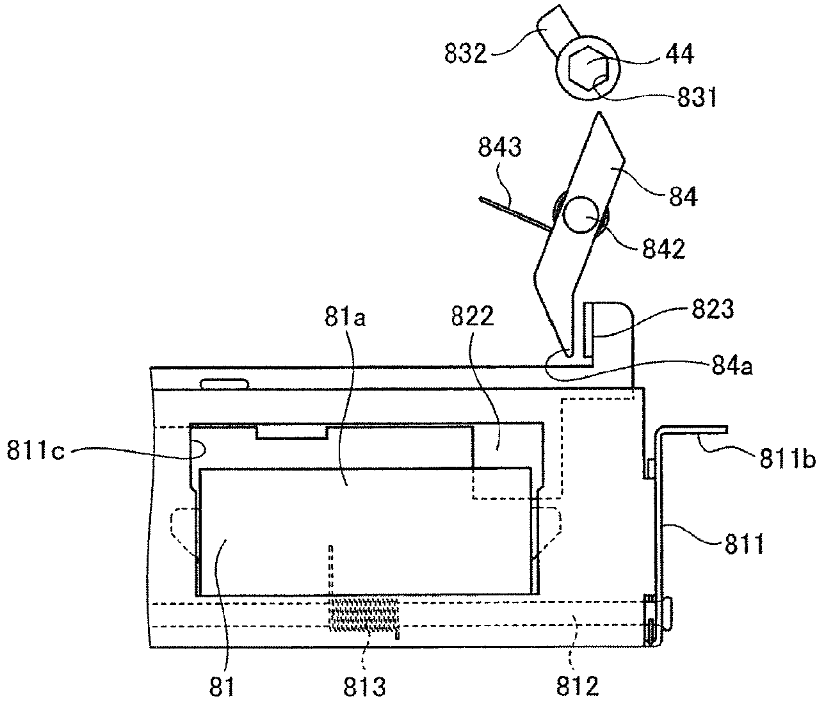
FIG. 69 is an explanation drawing showing, from above, an enlargement of the substantial portions of the posture restricting mechanism, showing a positional relationship obtained when the mode detection switch detects "60-degree rotated position."
Figure 70:
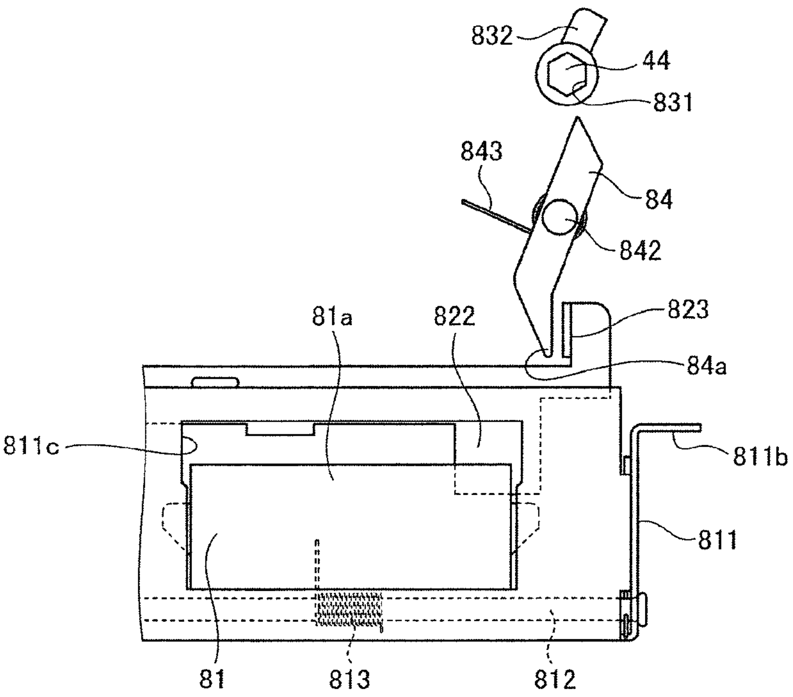
FIG. 70 is an explanation drawing showing, from above, an enlargement of the top of the substantial portions of the posture restricting mechanism, showing a positional relationship obtained when the mode detection switch detects "120-degree rotated position."
Figure 71:
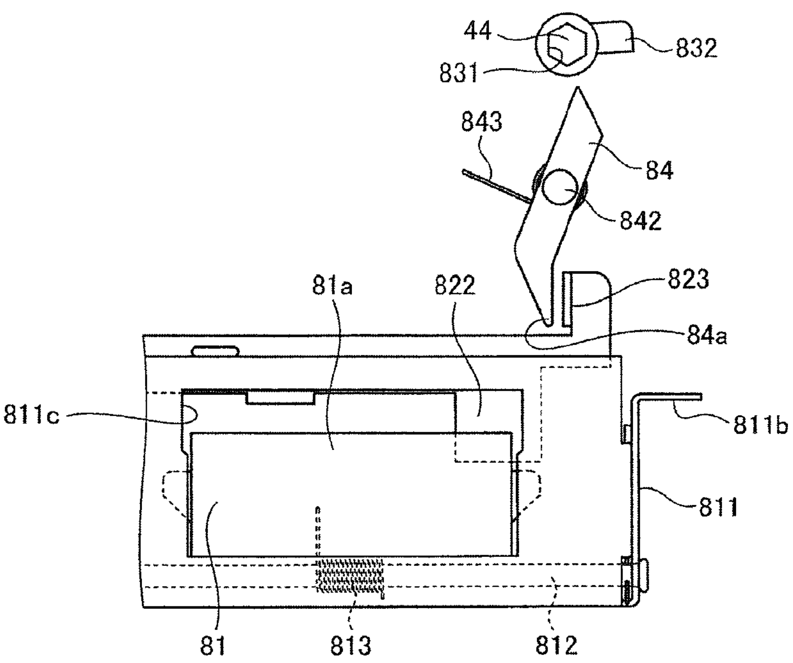
FIG. 71 is an explanation drawing showing, from above, an enlargement of the top of the substantial portions of the posture restricting mechanism, showing a positional relationship obtained when the mode detection switch detects "180-degree rotated position."
Figure 72:
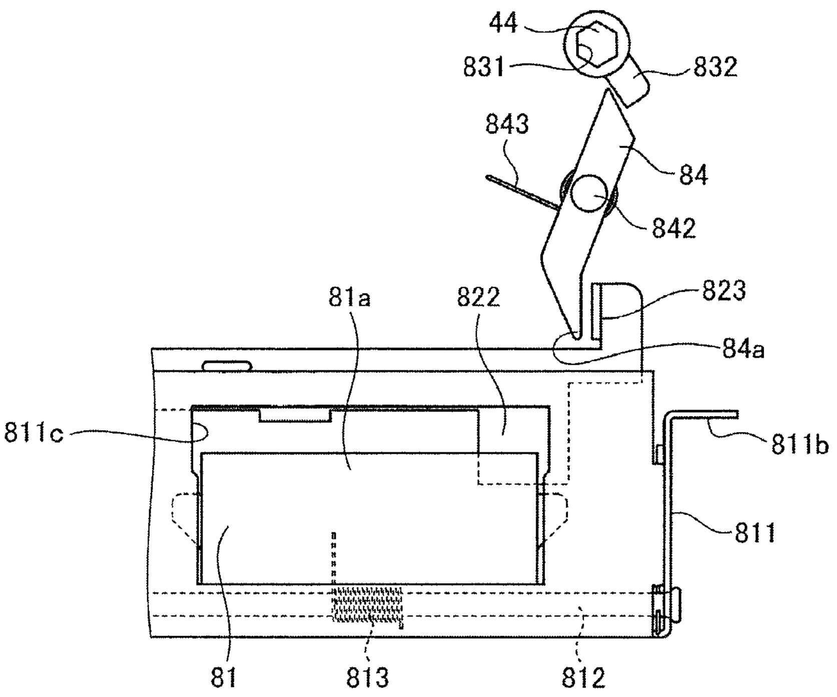
FIG. 72 is an explanation drawing showing, from above, an enlargement of the top of the substantial portions of the posture restricting mechanism, showing a positional relationship obtained when the mode detection switch detects "240-degree rotated position."
Figure 73:
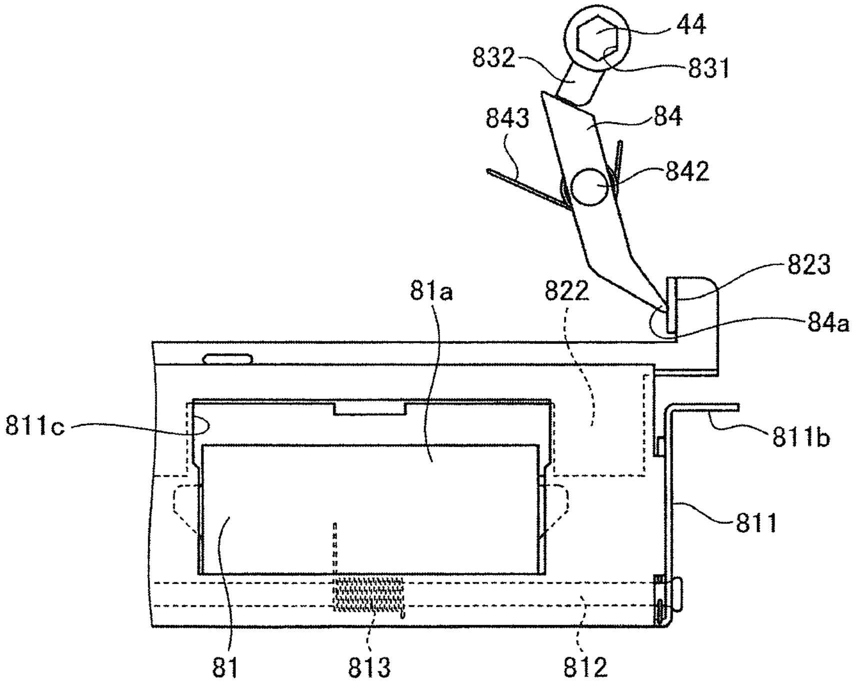
FIG. 73 is an explanation drawing showing, from above, an enlargement of the top of the substantial portions of the posture restricting mechanism, showing a positional relationship obtained when the mode detection switch detects "300-degree rotated position."

Next is described a positional relationship among the restricting lock member 82, the lock cam member 83, and the link member 84. FIGS. 68 to 73 are each an explanation drawing showing, from above, an enlargement of the substantial portions of the posture restricting mechanism 80. FIG. 68 shows a positional relationship obtained when the mode detection switch 6 detects a "standby position." FIG. 69 shows a positional relationship obtained when the mode detection switch 6 detects a "60-degree rotated position." FIG. 70 shows a positional relationship obtained when the mode detection switch 6 detects a "120-degree rotated position." FIG. 71 shows a positional relationship obtained when the mode detection switch 6 detects a "180-degree rotated position." FIG. 72 shows a positional relationship obtained when the mode detection switch 6 detects a "240-degree rotated position." FIG. 73 shows a positional relationship obtained when the mode detection switch 6 detects a "300-degree rotated position."

Figure 74:
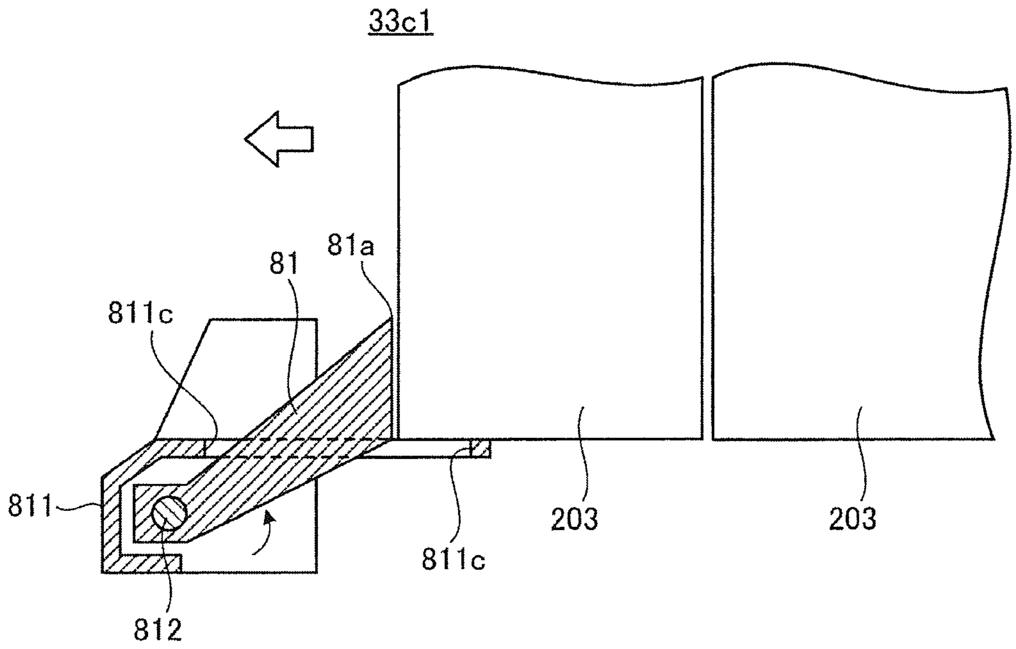
FIG. 74 is a cross-sectional side view for explaining the operations of a restricting member.

As shown in FIGS. 68 to 72, in any of the positions between the "standby position" and the "240-degree rotated position," the cam protruding piece 832 of the lock cam member 83 is not in abutment with the link member 84. Therefore, the link member 84 is located at the reference position, and the restricting lock member 82 is located at the left end position. Because the restricting lock member 82 is located at the left end position, the lock piece 822 faces the restricting opening 811*c* from below. Consequently, pushed from above, the restricting member 81 is brought into abutment with the lock piece 822 and is therefore restricted from turning downward about the central axis of the restricting shaft portion 812 against the biasing force of the restricting spring member 813. As a result, the rear end portion 81*a* of the restricting member 81 is restricted from retreating from the corresponding commodity storage passage 33*c*1, as shown in FIG. 74.

Figure 75:
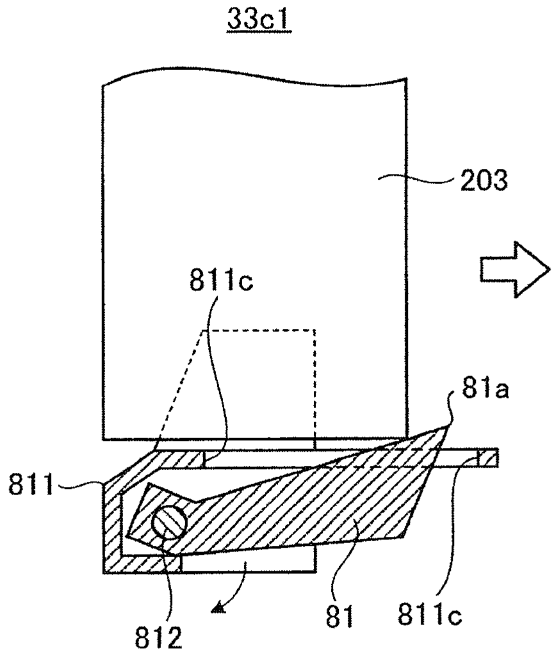
FIG. 75 is a cross-sectional side view for explaining the operations of the restricting member.

In the "300-degree rotated position" obtained as a result of rotating the support rod 44, the cam protruding piece 832 of the lock cam member 83 comes into abutment with the link member 84, rotating the link member 84 counterclockwise against the biasing force of the link spring member 843, as shown in FIG. 73. Consequently, an action end portion 84*a* comes into abutment with the abutting piece 823 of the restricting lock member 82, moving the restricting lock member 82 to the right against the biasing force of the restricting lock spring member 82*a*. As a result, the lock piece 822 of the restricting lock member 82 is released from a lower region of the restricting opening 811*c*, and the restricting member 81 is pushed from above so as to be able to turn downward about the central axis of the restricting shaft portion 812 against the biasing force of the restricting spring member 813. As a result, the rear end portion 81*a* of the restricting member 81 is allowed to retreat from the commodity storage passage 33*c*1, as shown in FIG. 75.

Figure 76:
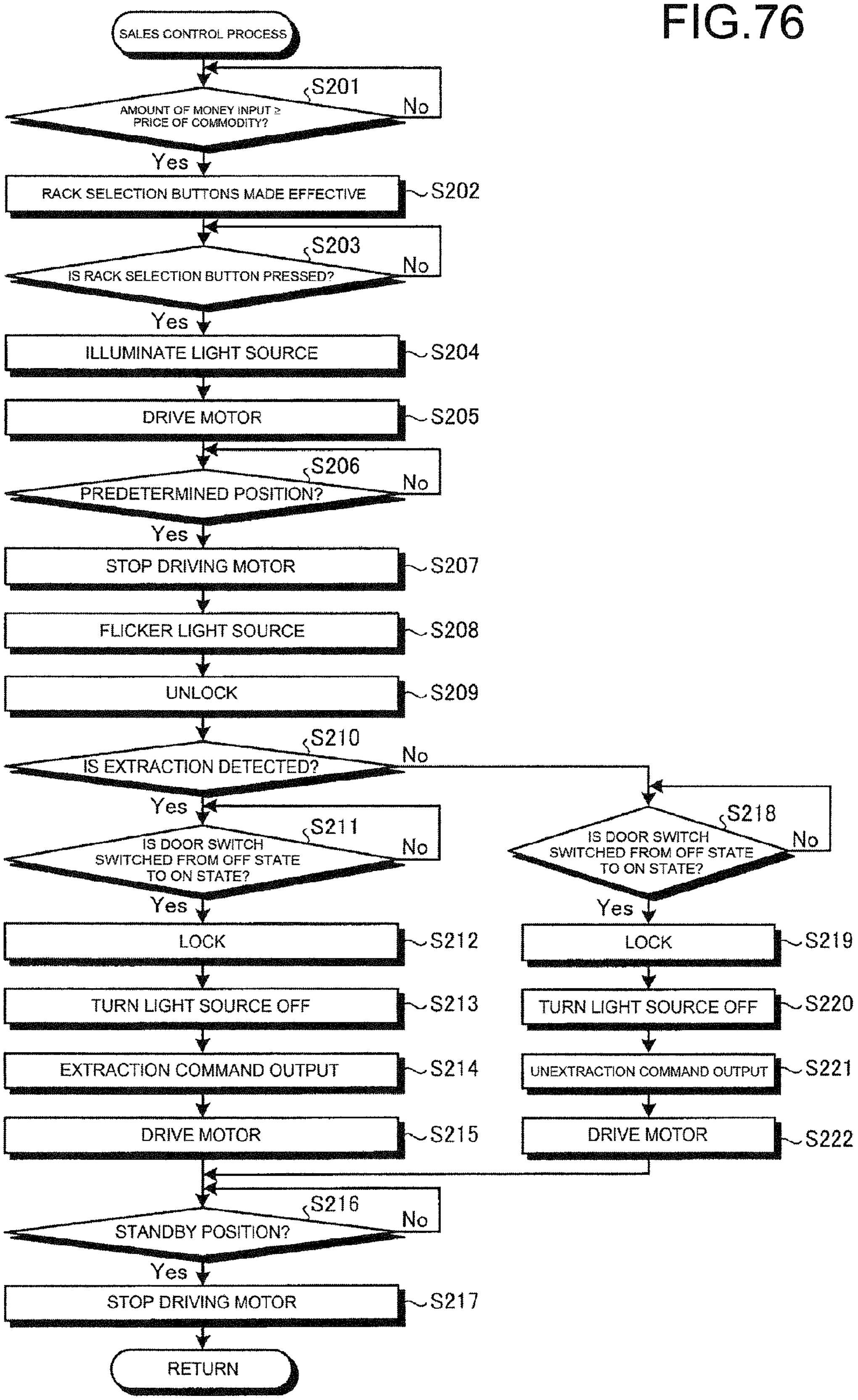
FIG. 76 is a flowchart showing the main content of a sales control process executed by control means shown in FIG. 60.

FIG. 76 is a flowchart showing the main content of a sales control process executed by control means 100 shown in FIG. 60. The following illustrates the operations of the automatic vending machine with the commodity storage device 21 therein while describing the sales control process. The following description assumes that the third commodity rack 30 from the top (the plastic-bottled commodity rack 30*c*) is selected.

In this sales control process, when the amount of money (monetary information) that is input from the cash processing device 16 is equal to or greater than the price of a commodity (step S201: Yes), the control means 100 determines that the relevant rack selection buttons 13 are effective (step S202).

When the rack selection button 13 associated with the third plastic-bottled commodity rack 30*c* from the top is selected out of the effective rack selection buttons 13 and pressed (step S203: Yes), the control means 100 illuminates the light source 13*a* embedded in the pressed rack selection button 13 in accordance with a predetermined pattern (step S204). In this step S204, the light source 13*a* is illuminated at all times. After executing step S204, the control means 100 then drives the motor M based on the assumption that a sales command is input (step S205).

When the "180-degree rotated position" is detected by the mode detection switch 6 (step S206: Yes), the control means 100 stops driving the motor M, and, for example, flickers the light source 13*a* according to a predetermined pattern, the light source 13*a* being illuminated constantly in step S204 (step S207, step S208).

After executing step S208, the control means 100 drives the locking/unlocking mechanism 3 into the unlocked state (step S209). This allows a user to open the outer door 2.

Figure 77:
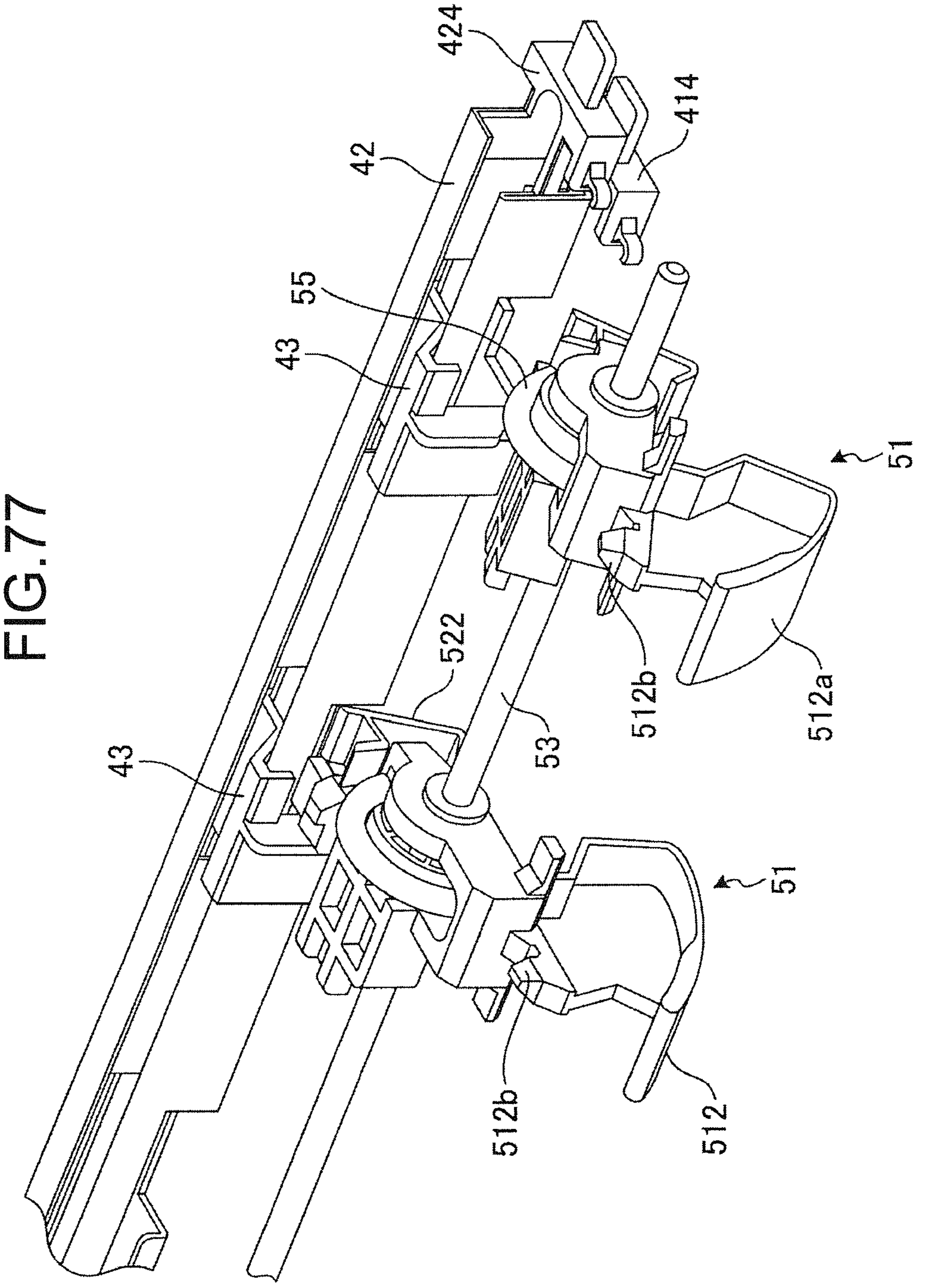
FIG. 77 is a perspective view showing the operations of an extraction mechanism in a state in which the first slide plate is moved from a reference position to the left.

Since the cam mechanism is stopped at the "180-degree rotated position," the support rod 44 is rotated clockwise by 180 degrees from the "standby position," bringing the first projecting piece 45*c*1 of the third switching cam member 45*c* into abutment with the first slide abutting portion 414 of the first slide plate 41. As a result, the first slide plate 41 moves to the left against the biasing force of the first slide spring member 415, as shown in FIG. 77.

When the first slide plate 41 moves to the left in this manner, the restricting piece 411*b* of the first slide plate 41 moves away from the lower region of the first engaging piece 513 of the first gate member 51 so that the cutout portions 412*a* are in place, opening the lower region of the first engaging piece 513. As a result, the first gate member 51 of each of the extraction mechanisms 50 in the third commodity rack 30*c* from the top is biased by the gate spring member 54 but enters its free state so as to be able to turn upward.

Incidentally, in the commodity racks 30 other than the third commodity rack 30*c* from the top, the switching cam members 45 (the first switching cam member 45*a*, the second switching cam member 45*b*, the fourth switching cam member 45*d*) that are mounted at the same levels as the respective commodity racks 30 are not in abutment with the first slide abutting portions 414. Therefore, in each of the commodity racks 30 other than the third commodity rack from the top, the first gate member 51 of the extraction mechanism 50 disposed in each commodity storage column 33*c* is restricted by the first slide plate 41. In these commodity racks 30, therefore, extraction of the commodities stored in each commodity storage column 33*c* is prevented.

As described above, the rack selection mechanism 40 restricts extraction of the commodities stored in all the commodity racks 30 in the standby state, but allows the commodities of only a designated commodity rack 30 to be extracted when a sales command is input.

In addition, while the support rod 44 is rotated 180 degrees, the lock cam member 83 and the link member 84 are not in abutment with each other, which brings the restricting lock member 82 to the left end position, as shown in FIG. 71. By bringing the restricting lock member 82 to the left end position, the lock piece 822 faces the restricting opening 811*c* from below. This limits the turning motion of the restricting member 81, restricting the rear end portion 81*a* of the restricting member 81 from retreating from the corresponding commodity storage passage 33*c*1.

Figure 78:
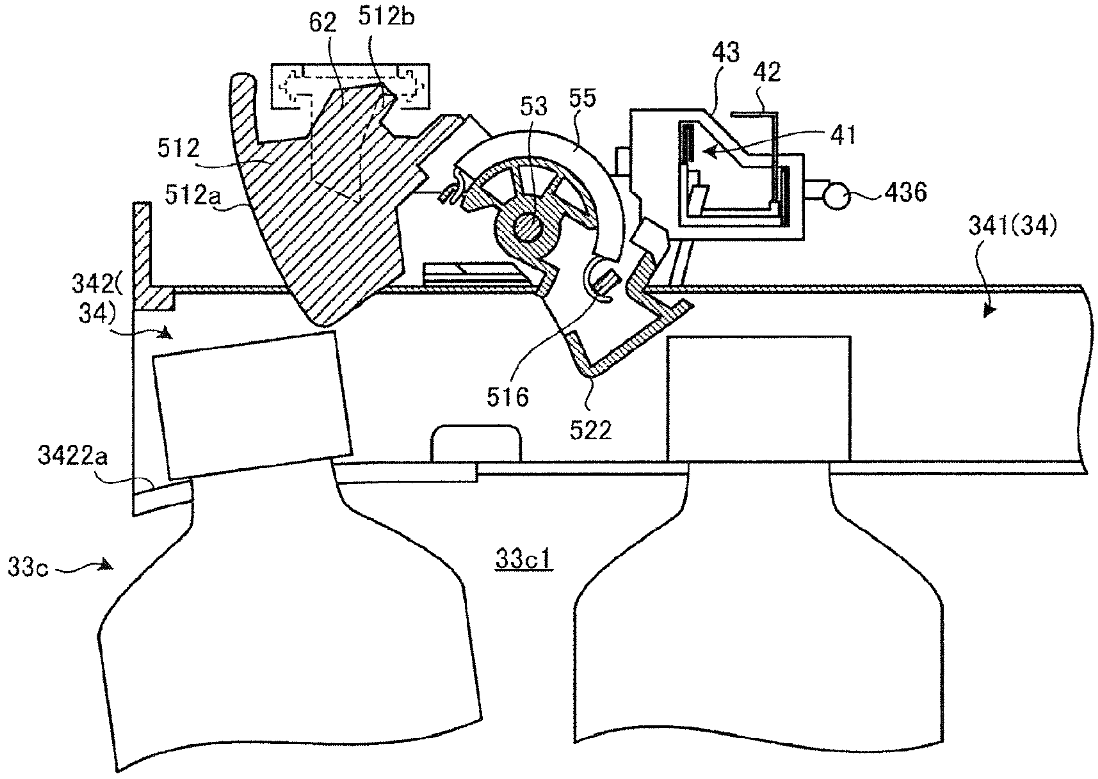
FIG. 78 is a longitudinal cross-sectional view of a commodity storage column configuring the third commodity rack from the top, viewed from the right side.

When the user executes an extraction operation of pulling forward the foremost commodity 203 stored any of the commodity storage columns 33*c* of the corresponding commodity rack 30, the extraction mechanism 50 operates as follows. As shown in FIG. 78, the first gate member 51 is turned upward against the biasing force of the gate spring member 54 so that the first tip end portion 512 retreats from the corresponding commodity storage passage 33c1. In this case, the second gate member 52 also is turned downward together with the first gate member 51 so that the second tip end portion 522 enters the commodity storage passage 33c1. As a result, the second tip end portion 522 of the second gate member 52 is brought to the position between the foremost commodity to be extracted and the second commodity from the front.

Figure 79:
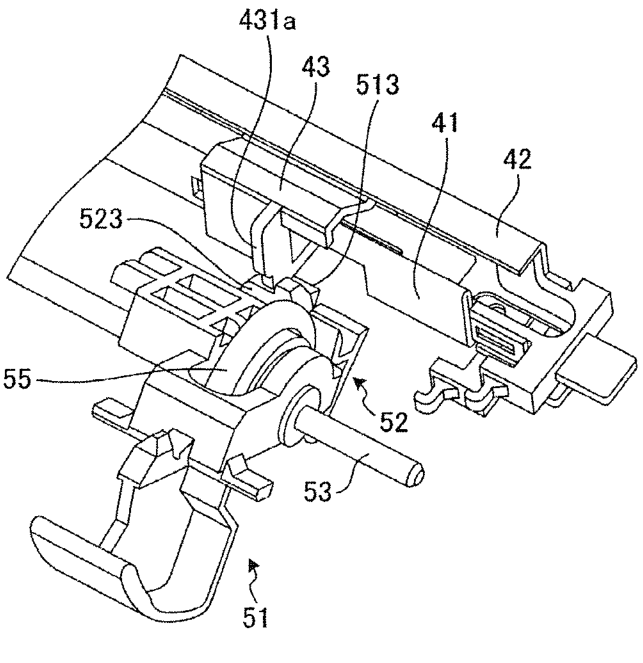
FIG. 79 is a perspective view showing the operations of the extraction mechanism in a state in which the first slide plate is moved from the reference position to the left.

Once the second gate member 52 is turned downward in this manner, the first gate member 51 is turned upward, and consequently the lock member 43 is biased by the lock spring member 436 and moves to the right, as shown in FIG. 79. Furthermore, the protruding piece 431a of the lock member 43 is brought to the position above the second engaging piece 523 of the second gate member 52, whereby the second gate member 52 is kept at its downwardly turned state. This also keeps the first gate member 51 at its upwardly turned state. According to such a configuration, because the commodity stored behind the second commodity that is located second from the front cannot be moved forward, forward extraction of the plurality of commodities in the same commodity storage column 33c can be restricted.

Moreover, the first gate member 51 that is turned upward allows the projection 512b of the first tip end portion 512 to enter the accommodation region 61a of the guide member 61 configuring the restricting means 60. As a result, the first gate members 51 of the extraction mechanisms 50 disposed in the other commodity storage columns 33c of the plastic-bottled commodity rack 30c cannot be turned upward after all because the projections 512b thereof are inhibited from entering the accommodation region 61a of the guide member 61 due to the presence of the bridge members 62. Thus, extraction of the commodities from the other commodity storage columns 33c of the same commodity rack 30 can be prevented.

The foremost commodity 203 is extracted in the following posture. As described above, each rail member 34 is curved in which the front end portion (downstream-side end portion) is gradually inclined downward. In addition, the rear end portion 81a of the restricting member 81 is restricted from retreating from the corresponding commodity storage passage 33c1. Due to this configuration, the foremost commodity 203 is kept in its upright posture without being extracted, but is extracted when tilted forward, as shown in FIG. 78. In other words, the restricting member 81 is provided in the lower region of the commodity storage passage 33c1, in front of the foremost commodity 203, restricts the upright foremost commodity 203 from being extracted as it is, and allows it to be extracted when tilted forward.

Once the user extracts the foremost commodity 203 from a predetermined commodity storage column 33c, the extraction detection sensor 5 disposed in this commodity storage column 33c detects this extraction, and sends a detection signal to the control means 100.

When the control means 100 receives the detection signal from the extraction detection sensor 5 and thereafter the outer door 2 is closed, switching the door switch 4 from the OFF state to the ON state (step S210: Yes, step S211: Yes), the control means 100 can recognize that the front surface opening of the main cabinet 1 is closed after the commodity is extracted.

The control means 100 that has recognized that the front surface opening is closed, then drives the locking/unlocking mechanism 3 into the locked state, and switches off the flickering light source 13a (step S212, step S213). The control means 100 then sends an extraction command output to the cash processing device 16, and sends a cancellation command to the motor M to drive the motor M (step S214, step S215).

In response to the extraction command output from the control means 100, the cash processing device 16 inputs the change to the coin return slot 17 if there is any, and sorts and accommodates the cash equivalent to the price of the commodity, with respect to the types of money.

Furthermore, the support rod 44 is rotated clockwise to the "standby position," which is a predetermined stop position, by driving the motor M.

As a result of rotating the support rod 44, in the third switching cam member 45c the second projecting piece 45c2 connected to the first projecting piece 45c1 comes into abutment with the second slide abutting portion 424 of the second slide plate 42 as well. As a result, the second slide plate 42 moves to the left against the biasing force of the second slide spring member 425. Following the leftward movement of the second slide plate 42, the lock member 43 also moves to the left against the biasing force of the lock spring member 436 and is released from above the second gate member 52. Consequently, the upper region of the second gate member 52 is opened. Biased by the gate spring member 54, the first gate member 51 is turned downward and the second gate member 52 is turned upward. Then, the first tip end portion 512 of the first gate member 51 enters the corresponding commodity storage passage 33c1, while the second tip end portion 522 of the second gate member 52 retreats from the commodity storage passage 33c1. The commodities stored in the commodity storage passage 33c1 are then pushed forward by the pusher member 343.

Subsequently, the abutment between the second projecting piece 45c2 of the third switching cam member 45c and the first and second slide abutting portions 414 and 424 is cancelled by the rotation of the support rod 44. Consequently, the first slide plate 41 and the second slide plate 42 are biased by the first slide spring member 415 and the second slide spring member 425 and move to the right to return to the original states. The restricting piece 411b of the first slide plate 41 is then brought to below the first engaging piece 513 of the first gate member 51. For this reason, the first gate member 51 cannot be turned upward.

In a case where the mode detection switch 6 detects a predetermined position, i.e., the "standby position" (step S216: Yes), the control means 100 stops driving the motor M (step S217) and then returns the procedure to end this process. This can result in selling one commodity selected by the user.

On the other hand, in step S210, when the door switch 4 is switched from the OFF state to the ON state without the detection signal from the extraction detection sensor 5 (step S210: No, step S218: Yes), the control means 100 can recognize that the front surface opening of the main cabinet 1 is closed without having any commodity extracted.

The control means 100 that has recognized this then drives the locking/unlocking mechanism 3 into the locked state, and switches off the flickering light source 13a (step S219, step S220). Subsequently, the control means 100 sends an unextraction command output to the cash processing device 16 (step S221). In response to the unextraction command output from the control means 100, the cash processing device 16 repays the input coins into the coin return slot 17.

The control means 100 that has sent the unextraction command output then sends a cancellation command, drives the motor M (step S222), executes steps S216 and S217 described above, returns the procedure, and ends this process.

Figure 80:
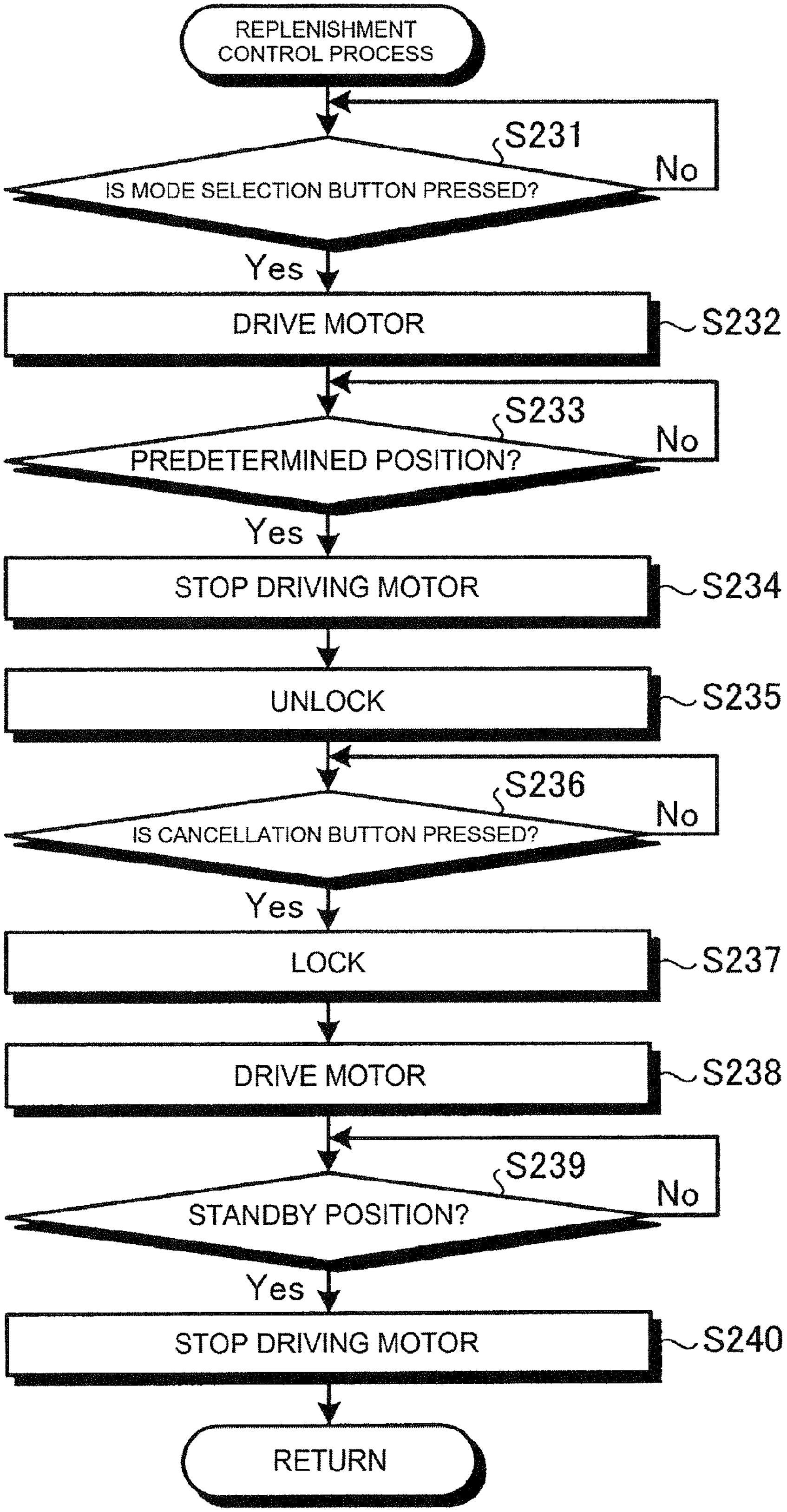
FIG. 80 is a flowchart showing the main content of a replenishment control process executed by the control means shown in FIG. 60.

Next is described how the automatic vending machine is replenished with commodities. FIG. 80 is a flowchart showing the main content of a replenishment control process executed by the control means 100 shown in FIG. 60. The following illustrates how the automatic vending machine with the commodity storage device 21 is replenished with commodities, while describing the replenishment control process.

In the replenishment control process, when the mode selection button 14 is pressed by the manager (step S231: Yes) the control means 100 drives the motor M based on the assumption that a replenishment command is input (step S232).

In a case where the mode detection switch 6 detects the "300-degree rotated position" as a predetermined position (step S233: Yes), the control means 100 stops driving the motor M and drives the locking/unlocking mechanism 3 into the unlocked state (step S234, step S235). This allows the manager to open the outer door 2.

At this "300-degree rotated position," the third projecting pieces 45*a*3, 45*b*3, 45*c*3, 45*d*3 of all the switching cam members 45 come into abutment with the first slide abutting portions 414 of the first slide plates 41 and the second slide abutting portions 424 of the second slide plates 42 in the commodity racks 30 respectively, moving these first and second slide plates 41 and 42 to the left. Thereafter, the tip end sections 462 of the auxiliary cam members 46 that are turned to the engagement posture come into abutment with the first slide projections 414*a* of the first slide abutting portions 414 and the second slide projections 424*a* of the second slide abutting portions 424, moving the first slide plates 41 and the second slide plates 42 from the reference positions to the left, at which the first slide plates 41 and the second slide plates 42 are held.

Because the first slide plates 41 and the second slide plates 42 are moved from the reference positions to the left and held there, the first gate members 51 of the extraction mechanisms 50 can be turned upward.

At the "300-degree rotated position," as shown in FIG. 73, the cam protruding piece 832 of the lock cam member 83 comes into abutment with the link member 84 which is then rotated clockwise against the biasing force of the link spring member 843, whereby the action end portion 84*a* comes into abutment with the abutting piece 823 of the restricting lock member 82, causing the restricting lock member 82 to slide to the right against the biasing force of the restricting lock spring member 82*a*. As a result, the lock piece 822 of the restricting lock member 82 is released from the lower region of the restricting opening 811*c*, while the restricting member 81, when pressed from above, can turn downward about the central axis of the restricting shaft portion 812 against the biasing force of the restricting spring member 813, allowing the rear end portion 81*a* of the restricting member 81 to retreat from the corresponding commodity storage passage 33*c*1.

Figure 81:
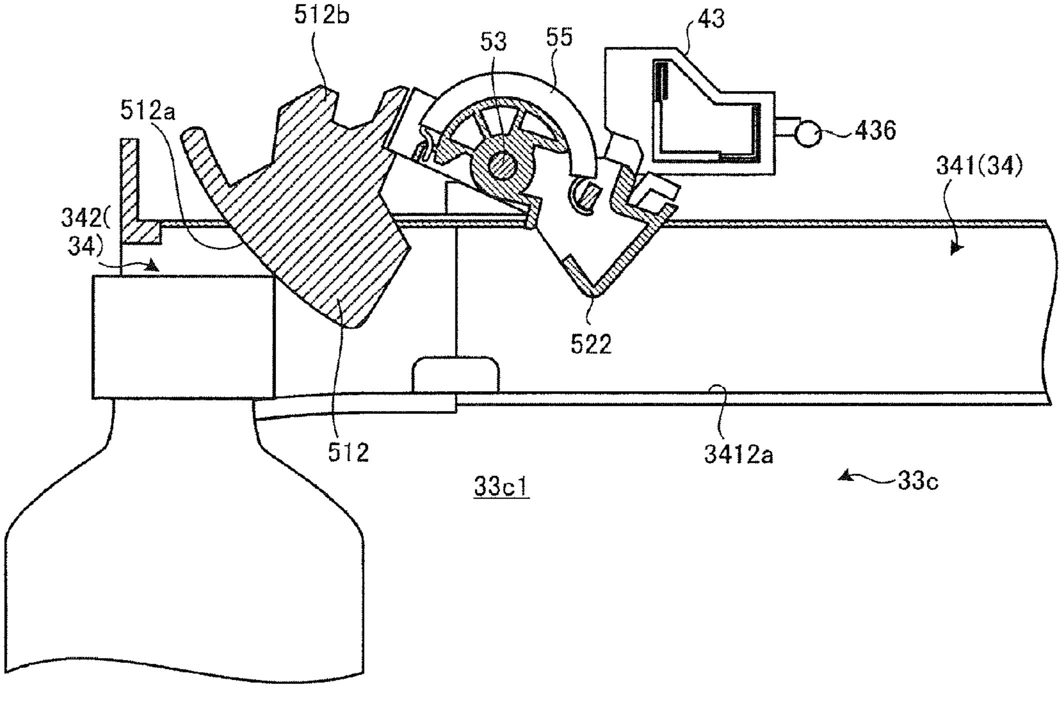
FIG. 81 is a longitudinal cross-sectional view of a commodity storage column configuring a commodity rack, viewed from the right side.

Then, as shown in FIG. 81, a replenishing commodity is placed into the commodity storage passage 33*c*1 from the front. As was described with reference to FIG. 75, when pressed by the commodity entering from the front, the restricting member 81 turns downward about the central axis of the restricting shaft portion 812 against the biasing force of the restricting spring member 813, causing the rear end portion 81*a* to retreat from the corresponding commodity storage passage 33*c*1. Therefore, the replenishing commodity, in an upright posture, can be made enter the commodity storage passage 33*c*1.

As the upright replenishing commodity enters the commodity storage passage 33*c*1, the cap 203*a* of this replenishing commodity comes into abutment with the sliding portion 512*a* of the first tip end portion 512 of the first gate member 51 and slides. In this case, because the sliding portion 512*a* of the first gate member 51 is in the shape of a curved surface, the first gate member 51 turns upward as being pushed by the replenishing commodity. Consequently, the second gate member 52 turns downward in response to the turning motion of the first gate member 51.

Figure 82:
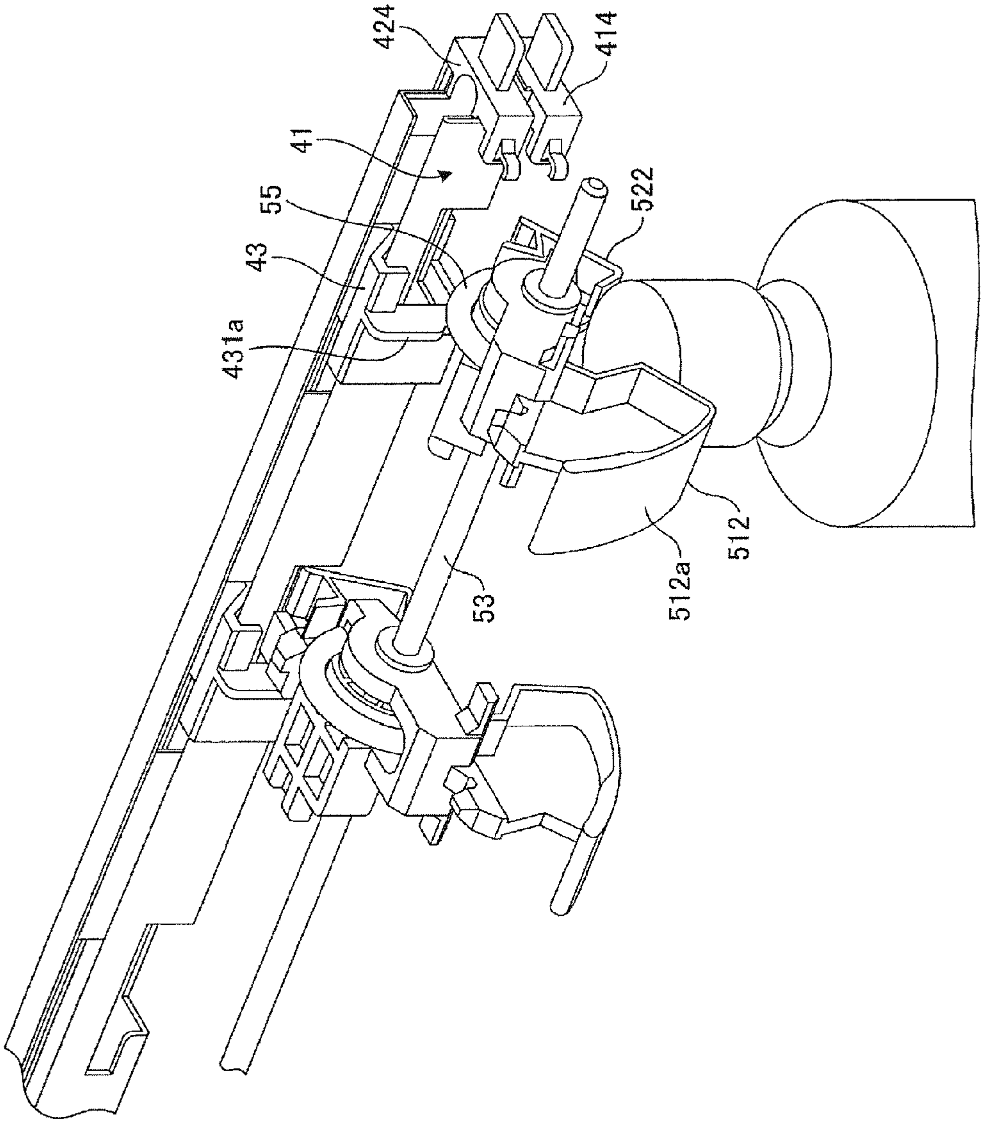
FIG. 82 is a perspective view showing the operations of the extraction mechanism in a state in which the first and second slide plates are moved from the reference positions to the left.
Figure 83:
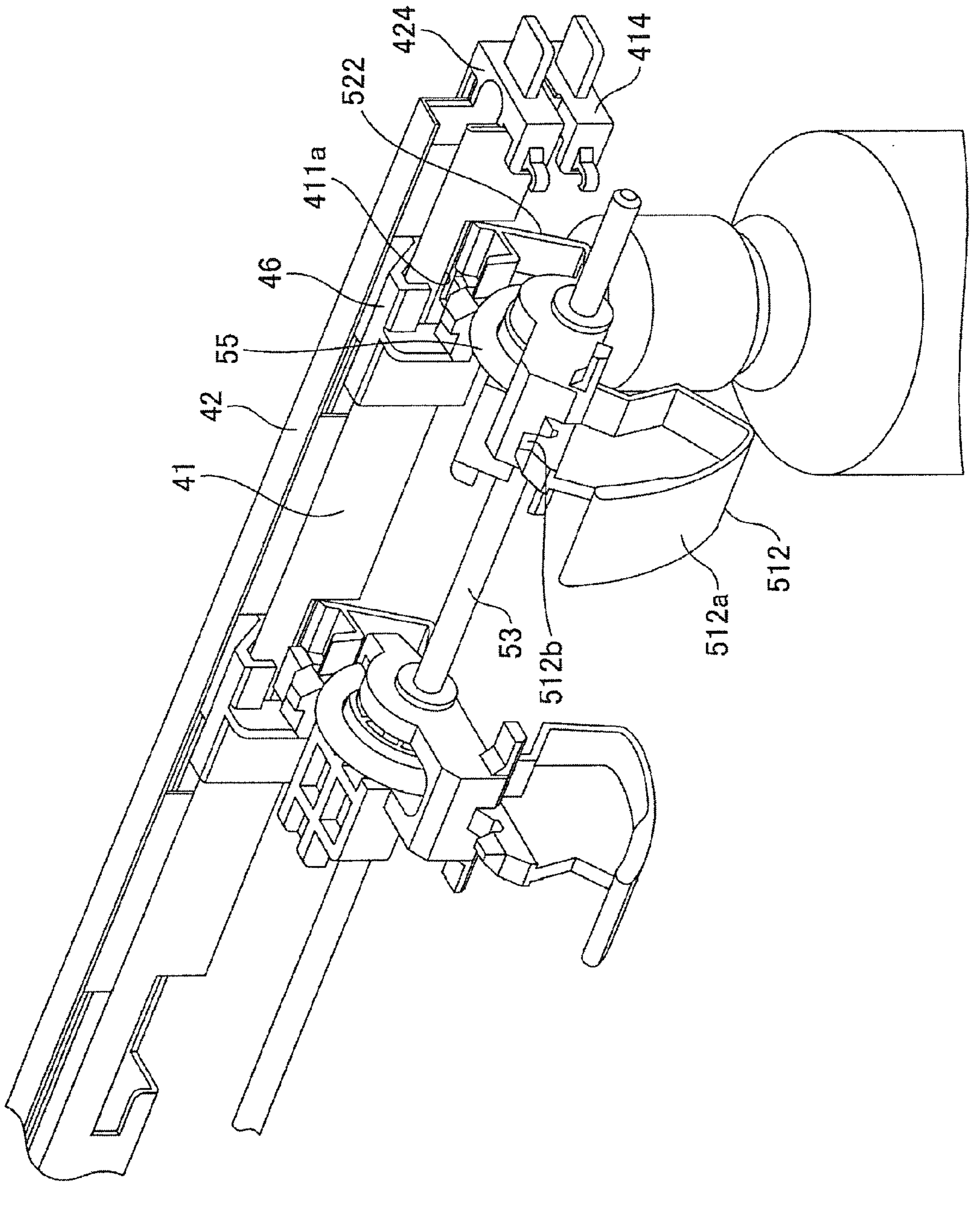
FIG. 83 is a perspective view showing the operations of the extraction mechanism in a state in which the first and second slide plates are moved from the reference positions to the left.

The commodity that has entered therefore comes into abutment with the second tip end portion 522 of the second gate member 52, as shown in FIG. 82. However, since the lock member 43 does not restrict the second gate member 52 from turning, the second gate member 52 turns upward against the biasing force of the coil spring member 55, and the second tip end portion 522 retreats from the commodity storage passage 33*c*1, as shown in FIG. 83. This allows replenishment of a predetermined number of commodities by making them to enter from the front region of the commodity storage column 33*c*.

In a case where the manager presses the cancellation button 15 after replenishing the commodity storage passage with a predetermined number of commodities (step S236: Yes), the control means 100 drives the locking/unlocking mechanism 3 into the locked state, and sends a cancellation command to the motor M to drive the motor M (step S237, step S238).

In a case where the mode detection switch 6 detects a predetermined position, i.e., the "standby position" (step S239: Yes), the control means 100 stops driving the motor M (step S240) and then returns the procedure to end this process.

In the commodity storage device 21 according to Embodiment 2 of the present invention described above, the first slide plate 41 is located at the reference position during the normal state, to restrict the first gate member 51 from retreating from the corresponding commodity storage passage 33*c*1, preventing the commodities stored in the corresponding commodity storage column 33*c* from being extracted. Moreover, the first gate member 51 and the second gate member 52 can be brought into the free state by causing the corresponding switching cam member 45 to move the first slide plate 41 from the reference position. In this case, when the user extracts the foremost commodity from the commodity storage passage 33*c*1, the first gate member 51 retreats from the commodity storage passage 33*c*1, while the second gate member 52 enters the commodity storage passage 33*c*1. Once the second gate member 52 enters the commodity storage passage 33*c*1, the lock member 43 moves to above the second engaging piece 523 of the second gate member 52, keeping the second gate member 52 in the commodity storage passage 33*c*1. This restricts the second commodity from moving forward. Furthermore, because the switching cam member 45 moves not only the first slide plate 41 but also the second slide plate 42 from the reference positions, the lock member 43 can be released from above the second engaging piece 523 of the second gate member 52, allowing the first gate member 51 to enter the commodity storage passage 33*c*1 and the second gate member 52 to retreat from the commodity storage passage 33*c*1. Letting the user to execute the commodity extraction operation in this manner can accomplish cost reduction without using the buckets or bucket drive means of the conventional automatic vending machines. In addition, because the second gate member 52 enters the commodity storage passage 33*c*1 even when the first gate member 51 retreats therefrom, the commodities can be extracted one by one from the corresponding commodity storage column 33*c*. Thus, while realizing cost reduction, the commodities stored in the commodity storage column 33*c* can securely be extracted one by one.

In a case where the restricting member 81 of the commodity storage device 21 is biased by the restricting spring member 813 and enters the corresponding commodity storage passage 33*c*1, extraction of the upright commodity placed at the most downstream part is restricted, but it can be extracted when tilted forward, and, during the normal state, the restricting lock member 82 restricts the restricting member 81 from retreating from the commodity storage passage 33_c_1 against the biasing force of the restricting spring member 813. However, when a commodity replenishment command is input (when the 300-degree rotated position is detected), the restricting lock member 82 allows the restricting member 81 to retreat from the commodity storage passage 33_c_1 against the biasing force of the restricting spring member 813. Therefore, the restricting member 81 is allowed to restrict from the commodity storage passage 33_c_1 when a commodity replenishment command is input, but the restricting member 81 is restricted from retreating from the commodity storage passage 33_c_1 in other cases. Other than when replenishing commodities, the restricting member 81 restricts extraction of the most downstream commodity when it is placed upright, but allows the most downstream commodity to be extracted when tilted forward, reliably controlling the posture in which the commodity is extracted. This can not only inhibit the user from extracting a commodity placed in any posture, but also prevent failure of the automatic vending machine that is induced by extraction of a commodity placed in any posture. Especially because the front end portion 431 (the downstream-side end portion) of each rail member 34 is gradually curved downward, a commodity that is stored in such a manner as to be suspended by the rail member 34 can also be securely extracted when tilted forward.

In the commodity storage device 21, the rail member 34 configuring each commodity storage column 33_c_ suspends a commodity upright by supporting the cap mount portion 2031 thereof in the corresponding commodity storage passage 33_c_1. Owing to such a configuration, any commodities contained in containers in irregular shapes, such as containers with flat body portions, can be stored favorably without causing a commodity jam.

In the commodity storage device 21, when the projection 512_b_ of one first gate member 51 enters the accommodation region 61_a_ as a result of upward turning motion of the first gate member 51 in response to a commodity extraction operation, the restricting means 60 inhibits the projections 512_b_ of the first gate members 51 of the other extraction mechanisms 50 from entering the accommodation region 61_a_, and restricts the first gate members 51 of the other extraction mechanisms 50 from retreating. This can securely prevent a plurality of commodities from being extracted from a single commodity rack 30.

In the commodity storage device 21, the commodities are stored upright in each commodity storage passage 33_c_1. Therefore, unlike the prior art described in, for example, Japanese Examined Patent Publication S50-27749 where commodities are stored sideways so their caps 203_a_ side is visible, the commodity storage device of the present invention not only allows the user to view the entire commodities, but also allows the user to directly see and touch the commodity he/she wishes to purchase, which brings the user a sense of reassurance.

The first gate member 51 and the second gate member 52 of each extraction mechanism 50 in the commodity storage device 21 are capable of turning about the central axis of the common gate shaft portion 53. The gate shaft portion 53 is provided in the upper region of the foremost commodity 203. The distance between the first tip end portion 512 of the first gate member 51 and the gate shaft portion 53 and the distance between the second tip end portion 522 of the second gate member 52 and the gate shaft portion 53 can be reduced, ensuring sufficient turning distances of the first gate member 51 and the second gate member 52. In a case where the state of the first gate member 51 of entering the corresponding commodity storage passage 33_c_1 is cancelled, when the sliding portion 512_a_ of the first gate member 51 is pressed while sliding on the commodity moving from the front side of the commodity storage passage 33_c_1, while the first gate member 51 is in the commodity storage passage 33_c_1, the first gate member 51 then retreats from the commodity storage passage 33_c_1 to allow the commodity to enter. Therefore, the manager can replenish commodities with one hand, improving the work efficiency.

Favorable Embodiments 1 and 2 of the present invention were described above, but the present invention is not limited thereto, and various changes can be made.

In Embodiment 1, the can stand portion 37 and the bottle stand portion 39 are configured by disposing a plurality of roller members in a rotatable manner. However, in the present invention, the stand portions may be configured to place the canned beverage commodities and the bottled beverage commodities thereon, and may also be configured by bead bases.

In Embodiment 1, the can guide member 36 and the bottle guide member 38 configuring the canned commodity rack 30_a_ and the bottled commodity rack 30_b_ respectively have the left-side edge portion 3812_a_ and the right-side edge portion. However, the present invention does not have to be configured to suspend the target commodities, and therefore does not have to be provided with the left-side edge portion or the right-side edge portion.

In Embodiments 1 and 2, the automatic vending machines each have one input processing unit 10 mounted in one main cabinet 1. However, the present invention may configure an automatic vending machine by communicably connecting one input processing unit to a plurality of main cabinets that do not have input processes. Such a configuration can not only sell one commodity that a user wishes to purchase, but also sell a great variety of commodities to the user.

The commodities stored in one commodity rack 30 may be at the same price, although the present invention is not limited thereto. Different prices may be set for the commodities with respect to each commodity storage column 33_c_ in a single commodity rack 30. Such a configuration can allow a single commodity rack to sell commodities at a plurality of prices, resulting in an automatic vending machine that is not only compact but also capable of selling a variety of commodities.

According to Embodiments 1 and 2 described above, the inside of the main cabinet 1 can be seen through the window portion 2_a_ of the outer door 2. In the present invention, however, not only the door body (outer door 2) but also the automatic vending machine main body (main cabinet) may be formed from a transparent heat insulating material to configure a window portion in the automatic vending machine main body. Such a configuration can allow the inside of the automatic vending machine main body to be viewed through the door body and the window portion of the automatic vending machine main body.

EXPLANATION OF REFERENCE NUMERALS

1 Main cabinet
1_a_ Storage room
2 Outer door
2_a_ Window portion
3 Locking/unlocking mechanism
4 Door switch
10 Input processing unit
11 Unit main body
12 Coin slot

13 Rack selection button
14 Mode selection button
15 Cancellation button
16 Cash processing device
20 Commodity storage device
21 Commodity storage device
30*a* Commodity rack
30*b* Commodity rack
30*c* Commodity rack
31 Rack support side plate
33*a* Commodity storage column
33*b* Commodity storage column
33*c* Commodity storage column
33*a*1 Commodity storage passage
33*b*1 Commodity storage passage
33*c*1 Commodity storage passage
34 Rail member
343 Pusher member
35 Restricting member
36 Can guide member
37 Can stand portion
38 Bottle guide member
39 Bottle stand portion
40 Rack selection mechanism
41 First slide plate
42 Second slide plate
43 Lock member
44 Support rod
45 Switching cam member
46 Auxiliary cam member
50 Extraction mechanism
51 First gate member
52 Second gate member
60 Restricting means
61 Guide member
62 Bridge member
70 Flapper mechanism
71 Flapper member
72 Flapper slide plate
73 Flapper cam member
80 Posture restricting mechanism
81 Restricting member
81*a* Rear end portion
811 Restricting base member
812 Restricting shaft portion
813 Restricting spring member (biasing means)
811*c* Restricting opening
82 Restricting lock member
82*a* Restricting lock spring member
822 Lock piece
823 Abutting piece
83 Lock cam member
832 Cam protruding piece
84 Link member
841 Link base member
841*a* Upper extension piece
842 Shaft-like portion
843 Link spring member
90 Stopper member
100 Control means

The invention claimed is:

1. A commodity storage device that has commodity storage columns defining respective commodity storage passages in each of which commodities are stored upright in a line, the commodity storage device comprising:

first gate members, each of which is provided turnably in such a manner as to enter and retreat from the corresponding commodity storage passage, restricts extraction of a most downstream commodity on a most downstream side when held in a state of entering the commodity storage passage during a normal state, but retreats from the commodity storage passage to allow the most downstream commodity to be extracted in response to an extraction operation on the most downstream commodity when the state of entering the commodity storage passage is cancelled;

second gate members, each of which is provided so as to be able to turn in conjunction with the corresponding first gate member in such a manner as to enter and retreat from the corresponding commodity storage passage, retreats from the commodity storage passage when the first gate member is restricted to the state of entering the commodity storage passage, but enters the commodity storage passage and comes into abutment with an upper portion of a second commodity adjacent to an upstream-side part of the most downstream commodity, to restrict the second commodity from moving to a downstream side when the first gate member retreats from the commodity storage passage; and flapper members, each of which is provided turnably on a side wall forming the corresponding commodity storage passage in such a manner as to enter and retreat from the commodity storage passage, retreats from the commodity storage passage when the first gate member is restricted to the state of entering the commodity storage passage, but enters the commodity storage passage and comes into abutment with a lower portion of the second commodity to restrict the second commodity from moving to the downstream side when the state of the first gate member of entering the commodity storage passage is cancelled.

2. The commodity storage device according to claim 1, further comprising:

slide members, which are located at reference positions to keep the flapper members retreated from the commodity storage passages during the normal state, but cause the flapper members to enter the commodity storage passages when moving from the reference positions; and cam members, which are in non-abutment with the slide members located at the reference positions when in a standby state, and come into abutment with the slide members to move the slide members from the reference positions when a sales command is input.

3. The commodity storage device according to claim 1, wherein the commodity storage columns have:

guide members in a reversed C-shape, which extend in a front-back direction and allow upper parts of the commodities to enter the commodity storage columns; and stand portions that extend in the front-back direction and hold the commodities upright, and wherein a distance between the guide members and the stand portions can be adjusted arbitrarily.

4. The commodity storage device according to claim 1, further comprising:

commodity racks, in each of which the commodity storage columns are arranged in parallel;

restricting means that is provided in each of the commodity racks, allows any one of the first gate members to be operated, and restricts the other first gate members of the same commodity rack from being operated; and stopper members, each of which is provided on the downstream side of the most downstream commodity in each of the commodity storage columns in such a manner as to be able to enter and retreat from the corresponding commodity storage passage, enters the commodity storage passage in such a manner as to be able to retreat therefrom during the normal state, but enters the commodity storage passage while being restricted from retreating therefrom when extraction of the commodities from the same commodity rack is allowed.

5. The commodity storage device according to claim 4, wherein the restricting means has a plurality of bridge members accommodated in an accommodation region of a guide member extending in a direction of parallel arrangement of the commodity storage columns, such that the bridge members can slide along a direction of extension of the guide member, and, when a part of the first gate members operated in response to the extraction operation on the commodity enters the accommodation region, the restricting means inhibits a part of other first gate members from entering the accommodation region to restrict operation of the other first gate members.

6. The commodity storage device according to claim 1, further comprising a pusher member that is provided in each of the commodity storage columns and pushes the commodities stored in the commodity storage column toward the downstream side.

7. The commodity storage device according to claim 6, wherein the pusher members each abut with and press the commodities by means of an attachment member that is provided as necessary.

8. The commodity storage device according to claim 1, wherein the commodities are each in the shape of a tube with closed upper and lower surfaces, and the second gate members each have a protruding portion that enters a space between the most downstream commodity extracted through the extraction operation and the second commodity in partial abutment with the most downstream commodity, to come into abutment with the second commodity when the second gate member enters the corresponding commodity storage passage.

9. The commodity storage device according to claim 1, wherein the commodities each have a shape in which an outer diameter thereof gradually increases from a lid mount portion onto which a lid body is mounted detachably toward a body portion, the commodity storage device further comprising a cover member that is mounted on a front end surface of the side wall and has a depressed portion formed at a part corresponding to the body portion of the most downstream commodity.

* * * * *